US007746377B2

(12) United States Patent
Ito et al.

(10) Patent No.: US 7,746,377 B2
(45) Date of Patent: Jun. 29, 2010

(54) THREE-DIMENSIONAL IMAGE DISPLAY APPARATUS AND METHOD

(75) Inventors: Tadayuki Ito, Tokyo (JP); Hitoshi Otani, Tokyo (JP); Nobuo Kochi, Tokyo (JP)

(73) Assignee: Topcon Corporation, Tokyo (JP)

( * ) Notice: Subject to any disclaimer, the term of this patent is extended or adjusted under 35 U.S.C. 154(b) by 1097 days.

(21) Appl. No.: 10/995,524

(22) Filed: Nov. 24, 2004

(65) Prior Publication Data

US 2005/0151839 A1 Jul. 14, 2005

(30) Foreign Application Priority Data

Nov. 28, 2003 (JP) ............................. 2003-400754
Nov. 28, 2003 (JP) ............................. 2003-400914
Dec. 12, 2003 (JP) ............................. 2003-415807

(51) Int. Cl.
*H04N 13/00* (2006.01)

(52) U.S. Cl. ........................................................ 348/43

(58) Field of Classification Search .................. 348/42, 348/43
See application file for complete search history.

(56) References Cited

U.S. PATENT DOCUMENTS 6,621,491 B1 * 9/2003 Baumrind et al. ........... 345/419
7,149,345 B2 12/2006 Fujiwara
2003/0076321 A1 * 4/2003 Clavadetscher ............. 345/427
2005/0177350 A1 8/2005 Kishikawa

FOREIGN PATENT DOCUMENTS

EP 1 426 904 A1 6/2004
JP 9-210649 A 8/1997
JP 10-149435 A 6/1998
JP 11-175762 A 7/1999
JP 2002-202124 A 7/2002
JP 2002-245438 A 8/2002
JP 2002-352224 A 12/2002
JP 2003-50110 A 2/2003
JP 2003-65737 A 3/2003
JP 2003-115042 A 4/2003

(Continued)

OTHER PUBLICATIONS

M. Pollefeys, "Tutorial on 3D Modeling from Images," Lecture Notes, Jun. 26, 2000, pp. 1-124.

*Primary Examiner*—Y. Lee
*Assistant Examiner*—Richard Torrente
(74) *Attorney, Agent, or Firm*—Foley & Lardner LLP

(57) ABSTRACT

A three-dimensional image display apparatus is provided that can integrate and visualize 3D measurement data obtained from a stereo image with an image of a measuring object to which stereoscopic texture is applied. The apparatus includes: an orientation section for finding relationship as to corresponding points in a stereo image of a measuring object; a three-dimensional coordinate data section for obtaining three-dimensional coordinate data on the corresponding points of the measuring object; a model forming section for forming a model of the measuring object based on the three-dimensional coordinate data on the corresponding points; an image correlating section for correlating the stereo image of the measuring object stored in the stereo image data storage section and the model formed by the model forming section; and a model display section for displaying an image of the measuring object to which stereoscopic texture is applied.

32 Claims, 28 Drawing Sheets

FOREIGN PATENT DOCUMENTS

| | | | |
|---|---|---|---|
| JP | 2003-256804 | A | 9/2003 |
| JP | 2003-284098 | A | 10/2003 |
| WO | WO 94/16406 | A1 | 7/1994 |
| WO | WO 97/03517 | A1 | 1/1997 |
| WO | WO 00/04506 | A1 | 1/2000 |
| WO | WO 03/001460 | A1 | 1/2003 |

* cited by examiner

102: RESULT LIST
104: PASS POINT
106: ORIENTATION POINT
108: CALCULATED COORDINATES
110: PHOTOGRAPHING CONDITION AND GROUND RESOLUTION
120: STEREO IMAGE PHOTOGRAPHING CONDITION AND GROUND RESOLUTION
121: PAIR NAME
122: BASE LENGTH B [m]
123: PHOTOGRAPHING DISTANCE H[m]
124: B/H RATIO
125: IN-PLANE RESOLUTION [m]
126: DEPTH RESOLUTION [m]
130: CAMERA POSITION AND TILT
131: IMAGE NAME

THICK LINES REPRESENT REGION DESIGNATION, AND NETS OF THIN LINES REPRESENT CREATED SURFACES

WIREFRAME DISPLAY EXAMPLE

RETRO TARGET

FORMATION OF SURFACES

306: ORIENTATION POINT MEASUREMENT
308: POINT NAME
310: IMAGE COORDINATES
312: REFERENCE POINT COORDINATES
314: MEASUREMENT
316: ORIENTATION CALCULATION (C)
318: EXIT
320: CENTER DETECTION
322: CORNER DETECTION

300: SCREEN
303: SINGLE PHOTOGRAPHIC IMAGE
305: ORIENTATION POINT ENLARGED VIEW
324: ORIENTATION RESULT DIAGRAM
306: ORIENTATION POINT MEASUREMENT DIAGRAM
326: REFERENCE POINT LAYER
328: ORIENTATION RESULT LIST
330: ORIENTATION WORK START COMMAND
332: RECALCULATION COMMAND
334: CLOSE
336: COORDINATE RESIDUAL
338: MESSAGE

THREE-DIMENSIONAL IMAGE DISPLAY APPARATUS AND METHOD

This application claims priority to Japan Priority Applications 2003-400754 and 2003-400914, both filed Nov. 28, 2003, and Japan Priority Application 2003-415807, filed Dec. 12, 2003.

BACKGROUND OF THE INVENTION

1. Technical Field

The present invention relates to a three-dimensional image display apparatus and method for directly correlating 3D data (three-dimensional shape data) measured on a measuring object and an image (single photographic image or stereo image) of the measuring object, and concurrently displaying the measurement data and the image of the measuring object.

2. Related Art

Methods for obtaining 3D data on a working object or a manufacturing object include an approach of obtaining data with a three-dimensional measurement apparatus (total station), and a stereo image measurement approach of obtaining 3D data by stereo measurement of a stereo image photographed using a measuring object and a comparative calibrated body. The approach using a three-dimensional measurement apparatus is superior in accuracy of obtained 3D coordinates and therefore used to measure reference positions in affixing an image. In particular, recent motor-driven total stations have become capable of obtaining a relatively large number (about several tens, for example, for each measuring object) of three-dimensional coordinates. In the stereo image measurement approach, several thousands—several tens of thousands of three-dimensional coordinates can be obtained relatively conveniently by performing work called orientation in affixing 3D data and an image.

However, 3D data obtained with a three-dimensional position measurement apparatus is basically constituted of three-dimensional coordinate data including distance data. Therefore, problems have become apparent that it is difficult to correlate 3D data obtained with the three-dimensional position measurement apparatus and the site conditions, and that it is difficult to decide which part of a measuring object is measured in tying the 3D data with image information on the measuring object.

On the other hand, in the stereo image measurement approach, 3D measurement is performed on a stereo image to display the image in stereo, so that 3D data and the stereo image can be compared. However, a stereoscopic monitor or deflector glasses are required to compare the 3D data and the stereo image. In addition, some people can achieve stereoscopic vision well while others cannot. That is, there has been a problem that not everyone can always make recognition easily. Also, in the stereo measurement of the measuring object or the tying work between the 3D data and the stereo image, correlation need be established between the image information and the 3D data or between the images, to perform orientation work. The orientation work involves great differences among individuals and thus cannot be performed with ease and accuracy, which has been another problem.

Further, there has been a demand from customers for a stereoscopic display of a measuring object even in cases of a single photographic image, which is a single photograph representing the measuring object.

A first object of the present invention, which has been made to solve the foregoing problems, is to provide a three-dimensional image display apparatus and method for integrating and visualizing 3D measurement data obtained from a stereo image with an image of a measuring object to which stereoscopic texture is applied.

Also, a second object of the present invention, which has been made to solve the foregoing problems, is to provide a three-dimensional image display apparatus and method for conveniently extracting a characteristic point included in a stereo image, to conveniently integrate 3D measurement data obtained from the stereo image with an image of a measuring object to which stereoscopic texture is applied.

A third object of the present invention, which has been made to solve the foregoing problems, is to provide a three-dimensional image display apparatus and method for using an image of a measuring object and separately obtained 3D measurement data, to conveniently create a stereoscopic two-dimensional image of the measuring object. A fourth object is to provide a three-dimensional image display apparatus and method for using a stereo image of a measuring object and separately obtained 3D measurement data, to create a stereoscopic two-dimensional image of the measuring object with accuracy. A fifth object is to provide a three-dimensional image display apparatus and method for simplifying photographing work of a measuring object.

SUMMARY OF THE INVENTION

One aspect of the invention, as shown in FIG. 1 for example, relates to a three-dimensional image display apparatus comprising a stereo image data storage section 12 for storing stereo images of a measuring object 1, an orientation section 24 for finding relationship as to corresponding points in the stereo images based on a position and a tilt at which the stereo images are photographed, a three-dimensional coordinate data section 31 for obtaining three-dimensional coordinate data on the corresponding points of the measuring object 1 based on the relationship as to the corresponding points found by the orientation section 24, a model forming section 32 for forming a model of the measuring object 1 based on the three-dimensional coordinate data on the corresponding points, an image correlating section 34 for correlating the stereo images of the measuring object 1 stored in the stereo image data storage section 12 and the model formed by the model forming section 32, using the relationship as to the corresponding points found by the orientation section 24, and a model display section 35 for displaying an image of the measuring object 1 to which stereoscopic texture is applied, using the stereo image correlated with the model by the image correlating section 34.

With this configuration, the orientation section 24 determines relative orientation of the stereo images of the measuring object 1 stored in the stereo image data storage section 12, to find relationship as to corresponding points in the stereo images. Then, the three-dimensional coordinate data section 31 obtains three-dimensional coordinate data on the corresponding points of the measuring object 1 based on the relationship as to the corresponding points found by the orientation section 24, so that the model forming section 32 creates a model of the measuring object 1. The image correlating section 34 correlates the stereo image and the model of the measuring object, using the relationship as to the corresponding points found by the orientation section 24. The model display section 35 displays an image of the measuring object 1 to which stereoscopic texture is applied, using the stereo images correlated with the model. The image to which stereoscopic texture is applied represents the measuring object 1 in the form of a two-dimensional image. The image represents projections and depressions on its surface with shades, to provide a stereoscopic representation in a pseudo manner.

Preferably, the three-dimensional image display apparatus of this invention further comprises a posture designating section 36 for designating a posture of the model of the measuring object 1, and a coordinate transformation section 37 for transforming coordinates of the corresponding points depending on the posture designated to the model, wherein the model display section 35 is configured to display an image of the measuring object 1 to which stereoscopic texture is applied in accordance with the posture designated by the posture designating section 36.

When the posture designating section 36 designates a posture of the model of the measuring object 1, the coordinate transformation section 37 transforms coordinates so that the model display section 35 displays an image of the measuring object 1 to which stereoscopic texture is applied in accordance with the designated posture. That is, an image of the measuring object 1 to which stereoscopic texture is applied as viewed from an arbitrary direction can be obtained.

Preferably, in the three-dimensional image display apparatus according of this invention, the image correlating section 34 is configured to cover the stereo image with unit image areas formed with a plurality of the corresponding points, to correlate the model and the stereo image using the unit image areas.

The stereo image and the model of the measuring object can be easily correlated by covering the stereo image with unit image areas. The unit image areas may selectably be, for example, triangular areas using three adjacent corresponding points or rectangular areas using four adjacent corresponding points.

Preferably, the three-dimensional image display apparatus of this invention further comprises a corresponding point designating section 22 for designating a corresponding point to be used by the orientation section 24, wherein the corresponding point designating section 22 is configured to indicate a characteristic point in a vicinity of a designated position on the measuring object 1 displayed on a display device for displaying the stereo images.

The characteristic point in the vicinity of the designated position may be, for example, a center position, a gravity center position and a corner position of the measuring object 1, and the like. When a corresponding point is designated through the corresponding point designating section 22, a characteristic point intended by an operator can be pulled in, without the operator exactly designating the characteristic point, facilitating orientation work through the orientation section.

Another aspect of the invention, as shown in FIG. 2 for example, relates to a three-dimensional image display method implemented on a computer, comprising the steps of allowing an orientation section 24 to find relationship as to corresponding points in stereo images of a measuring object 1 based on a position and a tilt at which the stereo image is photographed (S30), allowing a three-dimensional coordinate data section 31 to obtain three-dimensional coordinate data on the corresponding points of the measuring object 1 based on the relationship as to the corresponding points found by the orientation section 24 (S40, S50), allowing a model forming section 32 to form a model of the measuring object 1 based on the three-dimensional coordinate data on the corresponding points (S60), allowing an image correlating section 34 to correlate the stereo images of the measuring object 1 and the formed model, using the relationship as to the corresponding points found by the orientation section 24 (S72) and allowing a model display section 35 to display an image of the measuring object 1 to which stereoscopic texture is applied, using the stereo images correlated with the model (S80).

Another aspect of the invention, as shown in FIG. 20 for example, relates to a three-dimensional image display apparatus comprising a stereo image data storage section 12 for storing a stereo image of a measuring object 1, a reference point setting section 21 for searching for a point appropriate as a characteristic point in a vicinity of a designated point on one image of stereo images, and setting the point appropriate as the characteristic point as a reference point, a corresponding point search section 23 for determining a reference point corresponding point corresponding to the reference point set by the reference point setting section 21, on the other image of the stereo images, an orientation section 24 for finding relationship as to corresponding points in the stereo images based on a position and a tilt at which the stereo image is photographed, using the reference point set by the reference point setting section 21 and the reference point corresponding point determined by the corresponding point search section 23, a three-dimensional coordinate data section 31 for obtaining three-dimensional coordinate data on the corresponding points of the measuring object 1 based on the relationship as to the corresponding points found by the orientation section 24, a model forming section 32 for forming a model of the measuring object 1 based on the three-dimensional coordinate data on the corresponding points, an image correlating section 34 for correlating the stereo images of the measuring object stored in the stereo image data storage section 12 and the model formed by the model forming section 32, using the relationship as to the corresponding points found by the orientation section 24, and a model display section 35 for displaying an image of the measuring object 1 to which stereoscopic texture is applied, using the stereo images correlated with the model by the image correlating section 34.

With this configuration, the reference point setting section 21 searches for a point appropriate as a characteristic point in the vicinity of a designated point on one image of the stereo images, and sets the point appropriate as the characteristic point as a reference point. The corresponding point search section 23 determines a point (reference point corresponding point) that corresponds to the reference point set by the reference point setting section 21 on the other image of the stereo images. The orientation section 24 determines relative orientation of the stereo images of the measuring object 1 stored in the stereo image data storage section 12, using the reference point set by the reference point setting section 21 and the reference point corresponding point determined by the corresponding point search section 23, to find relationship as to corresponding points in the stereo image. Then, the three-dimensional coordinate data section 31 obtains three-dimensional coordinate data on the corresponding points of the measuring object 1 based on the relationship as to the corresponding points found by the orientation section 24, so that the model forming section 32 forms a model of the measuring object 1. The image correlating section 34 correlates the stereo images and the model of the measuring object, using the relationship as to the corresponding points found by the orientation section 24. The model display section 35 displays an image of the measuring object 1 to which stereoscopic texture is applied, using the stereo images correlated with the model. The image to which stereoscopic texture is applied represents the measuring object 1 in the form of a two-dimensional image. The image represents projections and depressions on its surface with shades, to provide a stereoscopic representation in a pseudo manner.

Preferably, in the three-dimensional image display apparatus of this invention, as shown in FIG. 12 for example, the characteristic point searched by the reference point setting section 21 is a reference target image including at least two similar portions of different contrast. Such a configuration is effective for a characteristic point required to be exactly positioned, such as a gravity center position, for example. Preferably, the measuring object 1 may be given a mark in advance including the reference target image. Thus, in the stereo images stored in the stereo image data storage section 12, a position of the characteristic point can be determined uniquely and accurately on the measuring object 1. When a point is designated through the reference point setting section 21, a characteristic point intended by the operator can be pulled in (snapped at), without the operator exactly designating the characteristic point.

Preferably, in the three-dimensional image display apparatus according to the present invention, the characteristic point searched for by the reference point setting section 21 may be an intersection point of plural generally linear components included in the image. Such a configuration is suitable for applications where a specific portion of the measuring object 1, such as a corner of a building structure, for example, is determined easily and uniquely. When a point is designated through the reference point setting section 21, a corner characteristic point intended by the operator can be pulled in, without the operator exactly designating the characteristic point. Such a configuration is effective for a characteristic point required.

Preferably, the three-dimensional image display apparatus according to this invention further comprises a posture designating section 36 for designating a posture of the model of the measuring object 1 and a coordinate transformation section 37 for transforming coordinates of the corresponding points depending on the posture designated to the model, wherein the model display section 35 is configured to display an image of the measuring object 1 to which stereoscopic texture is applied in accordance with the posture designated by the posture designating section 36.

Preferably, in the three-dimensional image display apparatus according to this invention the image correlating section 34 is configured to cover the stereo image with unit image areas formed with a plurality the corresponding points, to correlate the model and the stereo image, using the unit image areas.

The stereo image and the model of the measuring object can be easily correlated by covering the stereo image with unit image areas. The unit image areas may selectably be, for example, triangular areas using three adjacent corresponding points or rectangular areas using four adjacent corresponding points.

Another aspect of the invention, as shown in FIG. 21 for example, relates to a three-dimensional image display method implemented on a computer, comprising the steps of allowing a reference point setting section 21 to search for a point appropriate as a characteristic point in a vicinity of a designated point on one image of stereo images, and set the point appropriate as the characteristic point as a reference point (S26), allowing a corresponding point search section 23 to determine a reference point corresponding point corresponding to the reference point, on the other image of the stereo images (S28), allowing an orientation section 24 to find relationship as to corresponding points in the stereo images of a measuring object 1 based on a position and a tilt at which the stereo image is photographed, using the reference point and the reference point corresponding point (S30), allowing a three-dimensional coordinate data section 31 to obtain three-dimensional coordinate data on the corresponding points of the measuring object 1 based on the relationship as to the corresponding points found by the orientation section 24 (S40, S50), allowing a model forming section 32 to form a model of the measuring object 1 based on the three-dimensional coordinate data on the corresponding points (S60), allowing an image correlating section 34 to correlate the stereo images of the measuring object 1 and the formed model, using the relationship as to the corresponding points found by the orientation section 24 (S72), and allowing a model display section 35 to display an image of the measuring object 1 to which stereoscopic texture is applied, using the stereo images correlated with the model (S80).

Preferably, the three-dimensional image display method according to this invention further comprises the steps of allowing a posture designating section 36 to designate a posture of the model of the measuring object 1 (S90), and allowing a coordinate transformation section 37 to transform coordinates of the corresponding points depending on the posture designated to the model (S92), wherein the model display section 35 is configured to display an image of the measuring object 1 to which stereoscopic texture is applied in accordance with the posture designated to the model.

One aspect of the invention to attain the third object, as shown in FIG. 22 for example, relates to a three-dimensional image display apparatus comprising a measuring object positional data storage section 17 for storing three-dimensional positional data on the measuring object 1, a measuring object image data storage section 13 for storing a two-dimensional image of the measuring object 1, a correlating section 40 for correlating the three-dimensional positional data and the two-dimensional image of the measuring object 1 and a display image forming section 50 for generating two-dimensional images of the measuring object 1 from plural directions based on the three-dimensional positional data and the two-dimensional image of the measuring object 1. Preferably, a two-dimensional image may include three-dimensional data related to at least six points, in case that the two-dimensional image stored in the measuring object image data storage section 13 is a single photographic image.

With this configuration, the measuring object positional data storage section 17 stores three-dimensional positional data on the measuring object. The measuring object image data storage section 13 stores a two-dimensional image of the measuring object 1. If each two-dimensional image includes pixel dots having three-dimensional positional data at six or more points, orientation of the two-dimensional image can be determined by correlating the three-dimensional positional data and the two-dimensional image of the measuring object 1 through the correlating section 40. The display image forming section 50 creates a two-dimensional image of the measuring object 1 from plural directions based on the three-dimensional positional data and the two-dimensional image of the measuring object 1. Therefore, the operator can perceive an image like a three-dimensional image of the measuring object 1 by viewing the two-dimensional image.

Another aspect of the invention to attain the fourth object, as shown in FIG. 4-FIG. 6 for example, relates to the three-dimensional image display apparatus wherein the two-dimensional image stored in the measuring object image data storage section 13 is stereo images of the measuring object 1. Further as shown FIG. 22 for example, the correlating section 40 includes a reference point setting section 41 for searching for a point appropriate as a characteristic point in a vicinity of a designated point on one image of the stereo images, and setting the point appropriate as the characteristic point as a reference point, a corresponding point search section 43 for determining a reference point corresponding point corresponding to the reference point set by the reference point setting section 41, on the other image of the stereo images and an orientation section 44 for finding relationship as to corresponding points in the stereo images based on a position and a tilt at which the stereo image is photographed, using the reference point set by the reference point setting section 41 and the reference point corresponding point determined by the corresponding point search section 43. With this configuration, the reference point setting section 41 searches for a point appropriate as a characteristic point in the vicinity of a designated point on one image (reference image) of the stereo images, and sets the point appropriate as the characteristic point as a reference point. The corresponding point search section 43 determines a reference point corresponding point corresponding to the reference point set by the reference point setting section 41 on the other image (search image) of the stereo images. The orientation section 44 determines relative orientation of the stereo images of the measuring object 1 stored in the measuring object image data storage section 13, using the reference point set by the reference point setting section 41 and the reference point corresponding point determined by the corresponding point search section 43, to find relationship as to corresponding points in the stereo images.

As shown for example in FIG. 12, in the three-dimensional image display apparatus according to the present invention, the characteristic point searched for by the reference point setting section 41 may be a reference target image including at least two similar portions of different contrast. Such a configuration is effective for a characteristic point required to be exactly positioned, such as a gravity center position, for example. Preferably, the measuring object 1 may be given in advance a mark including the reference target image in the stereo image stored in the measuring object image data storage section 13, in which case a position of the characteristic point can be determined uniquely and accurately on the measuring object 1. When a point is designated through the reference point setting section 41, a characteristic point intended by the operator can be pulled in, without the operator exactly designating the characteristic point. Preferably, in the three-dimensional image display apparatus according to the present invention, the characteristic point searched for by the reference point setting section 41 may be an intersection point of plural generally linear components included in the image. Such a configuration is suitable for applications where a specific portion of the measuring object 1, such as a corner of a building structure, for example, is determined easily and uniquely. When a point is designated through the reference point setting section 41, a corner characteristic point intended by the operator can be pulled in, without the operator exactly designating the characteristic point.

Preferably, in the three-dimensional image display apparatus according to this invention, as shown in FIG. 22 for example, the correlating section 40 further includes a corresponding point designating section 45 for designating a corresponding point to be used by the orientation section 44, and the corresponding point designating section 45 is configured to indicate a characteristic point in a vicinity of a designated position on the measuring object 1 displayed on a display device 60 for displaying the stereo images.

Another aspect of the invention to attain the fourth object, as shown in FIG. 4-FIG. 6 for example, relates to the three-dimensional image display apparatus wherein the two-dimensional image stored in the measuring object image data storage section 13 is stereo images of the measuring object 1. Further, as shown in FIG. 22 for example, the display image forming section 50 includes a model forming section 54 for forming a model of the measuring object 1 based on three-dimensional coordinate data on the measuring object 1, an image correlating section 56 for correlating the two-dimensional display images of the measuring object 1 based on the positional relationship as to the corresponding points in the stereo images and a model display section 57 for correlating the model with the two-dimensional display images correlated by the image correlating section 56, and displaying the model having the image. With this configuration, the model forming section 54 forms a model of the measuring object 1. The image correlating section 56 correlates the stereo images and the model of the measuring object, using the relationship as to the corresponding points found by the orientation section 44. The model display section 57 displays a model having an image of the measuring object 1, using the stereo images correlated with the model.

Another aspect of the invention to attain the fourth object, as shown in FIG. 4-FIG. 6 for example, relates to the three-dimensional image display apparatus wherein the two-dimensional image stored in the measuring object image data storage section 13 is stereo images of the measuring object 1. Further, as shown in FIG. 22 for example, the display image forming section 50 includes a model forming section 54 for forming a model of the measuring object 1 based on three-dimensional coordinate data on the measuring object 1, an image correlating section 56 for correlating the stereo images of the measuring object 1 stored in the measuring object image data storage section 13 and the model formed by the model forming section 54, using the relationship as to the corresponding points found by the orientation section 44, and a model display section 57 for displaying an image of the measuring object 1 to which stereoscopic texture is applied, using the stereo images correlated with the model by the image correlating section 56. With this configuration, the model forming section 54 forms a model of the measuring object 1. The image correlating section 56 correlates the stereo images and the model of the measuring object, using the relationship as to the corresponding points found by the orientation section 44. The model display section 57 displays an image of the measuring object 1 to which stereoscopic texture is applied, using the stereo images correlated with the model. The image to which stereoscopic texture is applied represents the measuring object 1 in the form of a two-dimensional image. The image represents projections and depressions on its surface with shades, to provide a stereoscopic representation in a pseudo manner.

Preferably, in the three-dimensional image display apparatus according to this invention, the display image forming section further includes a unit image area calculation section 52 for correlating the model and the stereo images using a plurality of unit image areas formed with the corresponding points of the stereo images; and the model display section 57 is configured to cover the stereo image with the unit image areas.

The stereo image and the model of the measuring object 1 can be easily correlated, by correlating the model and the stereo image with unit image areas through the unit image area calculation section 52 and covering the stereo image through the image correlating section 56. The unit image areas may selectably be, for example, triangular areas using three adjacent corresponding points or rectangular areas using four adjacent corresponding points.

Another aspect of the invention to attain the fifth object, as shown in FIG. 27 and FIG. 28 for example, relates to the three-dimensional image display apparatus wherein the two-dimensional image stored in the measuring object image data storage section 13 is a single photographic image of the measuring object 1. Use of a single photographic image of the measuring object simplifies photographing work.

Preferably, as shown in FIG. 22 for example, in the three-dimensional image display apparatus according to this invention, the display image forming section includes a posture designating section 58 for designating a posture of the model of the measuring object 1, and a coordinate transformation section 59 for transforming coordinates of the corresponding points depending on the posture designated to the model, and a display direction of the two-dimensional image of the measuring object 1 is determined depending on the posture designated by the posture designating section 58.

Another aspect of the invention to attain the third object, as shown in FIG. 23 for example, relates to a three-dimensional image display method implemented on a computer, comprising the steps of allowing a correlating section 40 to correlate three-dimensional positional data on a measuring object 1 and a two-dimensional image of the measuring object 1, using the three-dimensional positional data and the two-dimensional image (S30, S40), allowing a model forming section 54 to form a model of the measuring object 1, using correlation between the three-dimensional positional data and the two-dimensional image (S60), allowing an image correlating section 56 to correlate the two-dimensional image of the measuring object 1 and the model formed by the model forming section 54, using the correlation between the three-dimensional positional data and the two-dimensional image (S72) and allowing a model display section 57 to display the model having the image of the measuring object 1 using the two-dimensional image correlated with the model (S80).

Another aspect of the invention to attain the fourth object, provides the three-dimensional image display method wherein the two-dimensional image of the measuring object is stereo images of the measuring object 1, in the step of allowing a correlating section 40 to correlate three-dimensional positional data on a measuring object and a two-dimensional image of the measuring object 1, using the three-dimensional positional data and the two-dimensional image. Further it includes the steps of allowing a reference point setting section to search for a point appropriate as a characteristic point in a vicinity of a designated point on one image of stereo images, and set the point appropriate as the characteristic point as a reference point (S18), allowing a corresponding point search section 43 to determine a reference point corresponding point corresponding to the reference point on the other image of the stereo images (S19) and allowing an orientation section 44 to find relationship as to corresponding points in the stereo images of the measuring object based on a position and a tilt at which the stereo images are photographed, using the reference point and the reference point corresponding point (S30). Such a configuration allows orientation work to be smoothly performed in cases where the two-dimensional image is stereo images of the measuring object 1.

Preferably, the three-dimensional image display method according to this invention further including the steps of allowing a posture designating section 58 to designate a posture of the model of the measuring object 1 (S90) and allowing a coordinate transformation section 59 to transform coordinates of the corresponding points depending on the posture designated to the model (S92), wherein the model display section 57 displays the model image provided with the image of the measuring object 1 in accordance with the posture designated to the model.

In a first three-dimensional image display apparatus according to the present invention, the image correlating section 34 correlates a stereo image of a measuring object 1 and a model formed by the model forming section 32, using relationship as to corresponding points found by the orientation section 24, and the model display section 35 displays an image of the measuring object 1 to which stereoscopic texture is applied, using the stereo image correlated with the model. With this configuration, 3D data measured in stereo and an image of the measuring object 1 can be easily recognized without viewing the 3D data using a stereoscopic system.

In a second three-dimensional image display apparatus according to the present invention, the orientation section 24 determines relative orientation of a stereo image of a measuring object 1, using a reference point set by the reference point setting section 21 and a reference point corresponding point determined by the corresponding point search section 23, to find relationship as to corresponding points in the stereo image. With this configuration, positional correspondence in the stereo image can be easily determined. Also, the image correlating section 34 correlates the stereo image of the measuring object 1 and a model formed by the model forming section 32, using the relationship as to the corresponding points found by the orientation section 24, and the model display section 35 displays an image of the measuring object 1 to which stereoscopic texture is applied, using the stereo image correlated with the model. With this configuration, 3D data measured in stereo and image of the measuring object 1 can be easily recognized without viewing the 3D data using a stereoscopic system. In addition, when the posture designating section 36 designates a posture of the model of the measuring object 1, the coordinate transformation section 37 transforms coordinates so that the model display section 35 displays an image of the measuring object 1 to which stereoscopic texture is applied in accordance with the designated posture. That is, an image of the measuring object 1 to which stereoscopic texture is applied as viewed from an arbitrary direction can be obtained.

In a three-dimensional image display apparatus according to the present invention that achieves the third object above, the display image forming section creates a two-dimensional image of a measuring object 1 from plural directions based on three-dimensional positional data and a two-dimensional image (single photographic image or stereo image) of the measuring object 1. Therefore, an operator can perceive a three-dimensional image of the measuring object 1 by viewing the two-dimensional image. In cases where a stereo image is used as the two-dimensional image stored in the measuring object image data storage section 13, a stereoscopic two-dimensional image of the measuring object can be generated with accuracy compared to cases of a single photographic image. Meanwhile, in cases where a single photographic image is used as the two-dimensional image stored in the measuring object image data storage section 13, photographing work can be simplified compared to cases of a stereo image.

This application is based on the Patent Applications No. 2003-400754 filed on Nov. 28, 2003, No. 2003-400914 filed on Nov. 28, 2003 and 2003-415807 filed on Dec. 12, 2003 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms “a” and “an” and “the” and similar referents in the context of describing the invention (especially in the context of the following claims) are to be construed to cover both the singular and the plural, unless otherwise indicated herein or clearly contradicted by context. The use of any and all examples, or exemplary language (e.g., “such as”) provided herein, is intended merely to better illuminate the invention and does not pose a limitation on the scope of the invention unless otherwise claimed.

DETAILED DESCRIPTION OF THE PREFERRED EMBODIMENT

The present invention is described below with reference to the figures. A three-dimensional image display apparatus of the present invention calculates a three-dimensional shape of a measuring object 1 based on plural, at least two, photographed images, with two, left and right, images constituting a stereo image as one unit. The apparatus also uses 3D data obtained externally or through 3D measurement of an entirety of the measuring object 1, to apply texture that produces a stereoscopic effect to a two-dimensional image of the measuring object 1. Here, texture is a term used in the graphics field and so on, representing what is drawn to illustrate a feel of mass or a pattern on a surface of a figure.

Figure 1:
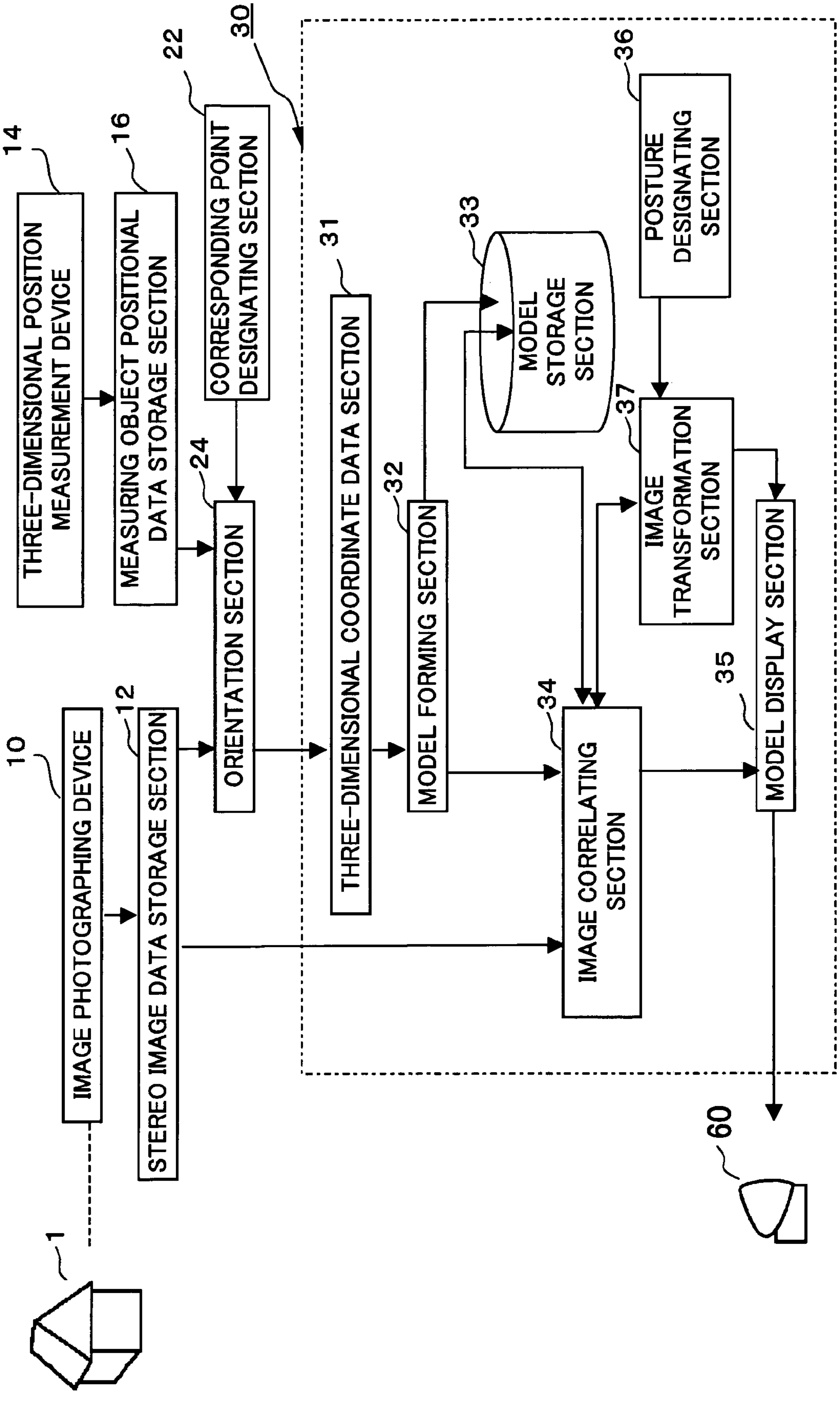
FIG. 1 is a general constitutional block diagram of a first embodiment of the present invention.

FIG. 1 is a general constitutional block diagram of a first embodiment of the present invention. The present invention includes a stereo image data storage section 12, a measuring object positional data storage section 16, a corresponding point designating section 22, an orientation section 24, a display image forming section 30, and a display device 60, and may be implemented by, for example, a computer and a display device. The measuring object 1 is a tangible substance such as a working object or a manufacturing object. The measuring object 1 may be, for example, a workpiece of various kinds such as architecture, a person, or a landscape. An image photographing device 10 may be, for example, a stereo camera, or a combined device of a general-purpose digital camera and a device for compensating lens aberration between left and right images of the measuring object 1 photographed with the digital camera.

A three-dimensional position measurement device 14 is an instrument for automatically measuring gauge positions using a laser or the like, and may be a total station, a three-dimensional (3D) scanner, or the like. Here, a three-dimensional scanner is a device that irradiates a laser beam to the measuring object 1 and receives a reflected beam with a CCD camera within the device, to obtain distance data from the received beam with the aid of trigonometric distance measurement and to convert the distance data into three-dimensional data. Three-dimensional scanners are used in various applications such as industrial design, databasing of 3D images, three-dimensional CG in video production, and the like. One scanning with a laser beam running from top to bottom of the measuring object 1 can make an input of a distance image of 640×480 dots, for example, corresponding to an entire image irradiated.

The stereo image data storage section 12 stores a stereo image of the measuring object 1. It stores, for example, left and right images of the measuring object 1 photographed by the image photographing device 10. The measuring object positional data storage section 16 stores positional data on the measuring object 1 at three or more reference points, which is required for absolute orientation. It stores, for example, positional data on reference points measured by the three-dimensional position measurement device 14. In applications where absolute orientation is not necessary, i.e., relative orientation using a model coordinate system is sufficient, the measuring object positional data storage section 16 may be dispensed with.

The corresponding point designating section 22 designates corresponding points to be used by the orientation section 24, and is preferably configured to indicate a characteristic point in the vicinity of a designated position on the measuring object 1 displayed on the display device 60. The characteristic point in the vicinity of the designated position may be, for example, a center position, a gravity center position and a corner position of the measuring object 1, and the like. When a corresponding point is designated through the corresponding point designating section 22, the point is pulled in the characteristic point intended by an operator, without the operator exactly designating the characteristic point, facilitating orientation work through the orientation section 24. The orientation section 24 finds relationship as to corresponding points in the stereo image based on the photographing position and tilt relative to the stereo image. The corresponding point designating section 22 and the orientation section 24 will be detailed later.

The display image forming section 30 includes a three-dimensional coordinate data section 31, a model forming section 32, a model storage section 33, an image correlating section 34, a model display section 35, a posture designating section 36, and a coordinate transformation section 37. The three-dimensional coordinate data section 31 obtains three-dimensional coordinate data on the corresponding points of the measuring object 1 based on the relationship as to the corresponding points found by the orientation section 24. The model forming section 32 forms a model of the measuring object 1 based on the three-dimensional coordinate data on the corresponding points. The model storage section 33 stores the model of the measuring object 1 formed by the model forming section 32. The image correlating section 34 correlates the stereo image of the measuring object stored in the stereo image data storage section 12 and the model formed by the model forming section 32, using the relationship as to the corresponding points found by the orientation section 24. The model display section 35 displays a stereoscopic two-dimensional image of the measuring object 1 on the display device 60, using the stereo image correlated with the model by the image correlating section 34 and using an image to which stereoscopic texture such as bird's-eye view image is applied.

The posture designating section 36 designates a posture of the model of the measuring object 1. For example, the operator operates a cursor input device such as a mouse to designate the posture of the measuring object 1 displayed on the display device 60. The coordinate transformation section 37 transforms coordinates of the corresponding points depending on the posture designated to the model. The model display section 35 displays an image of the measuring object 1 to which stereoscopic texture is applied in accordance with the posture designated by the posture designating section 36. The display device 60 may be an image display device such as a liquid crystal display, a CRT, or the like.

Figure 2:
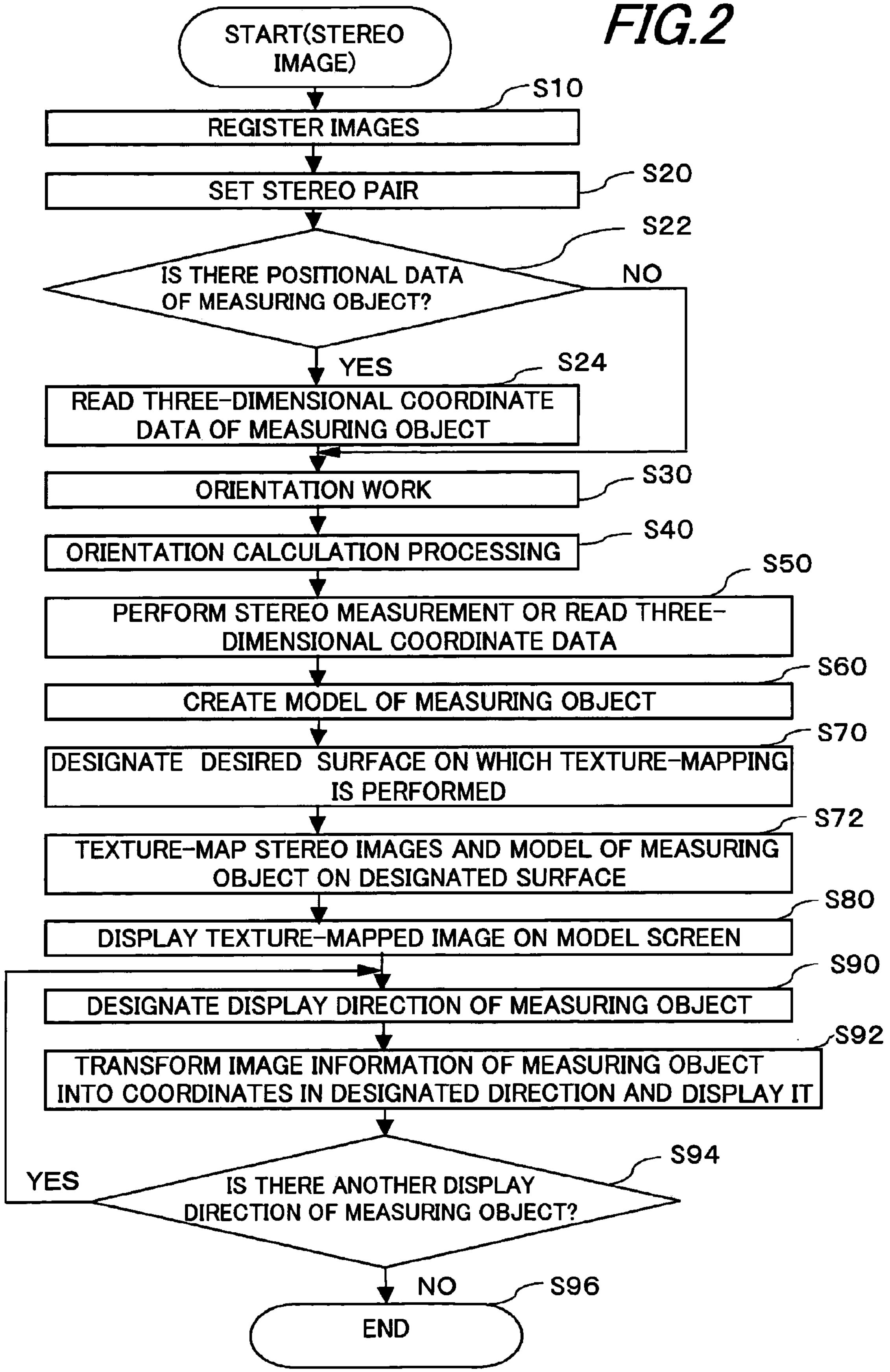
FIG. 2 is a flowchart for explaining operation of a three-dimensional image display apparatus shown in FIG. 1.

Now, with reference to FIG. 2, a description is made of operation of the thus configured three-dimensional image display apparatus according to the present invention. FIG. 2 is a flowchart for explaining operation of the three-dimensional image display apparatus shown in FIG. 1. First, two or more images of the measuring object 1 photographed using the image photographing device 10 such as a digital camera are registered in the stereo image data storage section 12 (step S10). Then, of the images registered in the stereo image data storage section 12, a pair of left and right images is set as a stereo pair (step S20). In step S20, all the images registered in the stereo image data storage section 12 may not necessarily be set as a stereo pair. That is, the images may be set as a stereo pair forming a stereo image, in order from a stereo image most desired to be measured or a stereo image to which stereoscopic texture is most desired to be applied.

Then, it is determined whether or not there are three-dimensional coordinates of the measuring object 1 which were obtained using the three-dimensional position measurement device 14, or 3D scanner (step S22). If YES in step S22, positional data represented by the three-dimensional coordinates of the measuring object 1 is read into the measuring object positional data storage section 16 (step S24). If NO in step S22, the processing can be performed with the relative coordinate system and thus step S24 can be skipped. The positional data represented by the three-dimensional coordinates of the measuring object 1 are not necessarily read after step S20. For example, the three-dimensional coordinates may be read after step S80, so that the processing can be performed with the relative coordinate system up to step S80 and with the absolute coordinate system thereafter. Calculation and measurement with the absolute coordinate system can be performed when at least three three-dimensional coordinates as the reference points exist over an entire image region desired to be measured or to which stereoscopic texture is desired to be applied.

Then, the orientation section 24 performs orientation work, i.e., determines relative orientation of the stereo image of the measuring object 1 stored in the stereo image data storage section 12, to find relationship as to corresponding points in the stereo image (step S30). There are three modes of performing the orientation work, namely manual, semi-automatic, and full-automatic modes, which will be detailed later. Here, the orientation work includes designating respective corresponding points (identical points) in two or more images through the corresponding point designating section 22 with a mouse cursor or the like, and reading their coordinates in the images. Six or more corresponding points are normally required for each image. In step S24, if the coordinates of the reference points are stored in the measuring object positional data storage section 16, the coordinates of the reference points and the images are correlated to perform absolute orientation.

Using the coordinates of the corresponding points obtained as a result of the orientation work, the orientation section 24 performs orientation calculation processing (step S40). The orientation calculation processing allows calculation of the position and the tilt of the camera that photographed the images, positions of the corresponding points, and measurement accuracy (see FIG. 3). If there are coordinates of the reference points, they are read from the measuring object positional data storage section 16 so that absolute orientation calculation processing is also performed. If there are no coordinates of the reference points, relative (model) coordinates are used for calculation. In the orientation calculation processing, relative orientation is performed to correlate a stereo model, while bundle adjustment is performed to determine orientation between entire images. Relative orientation will be detailed later.

Figure 3:
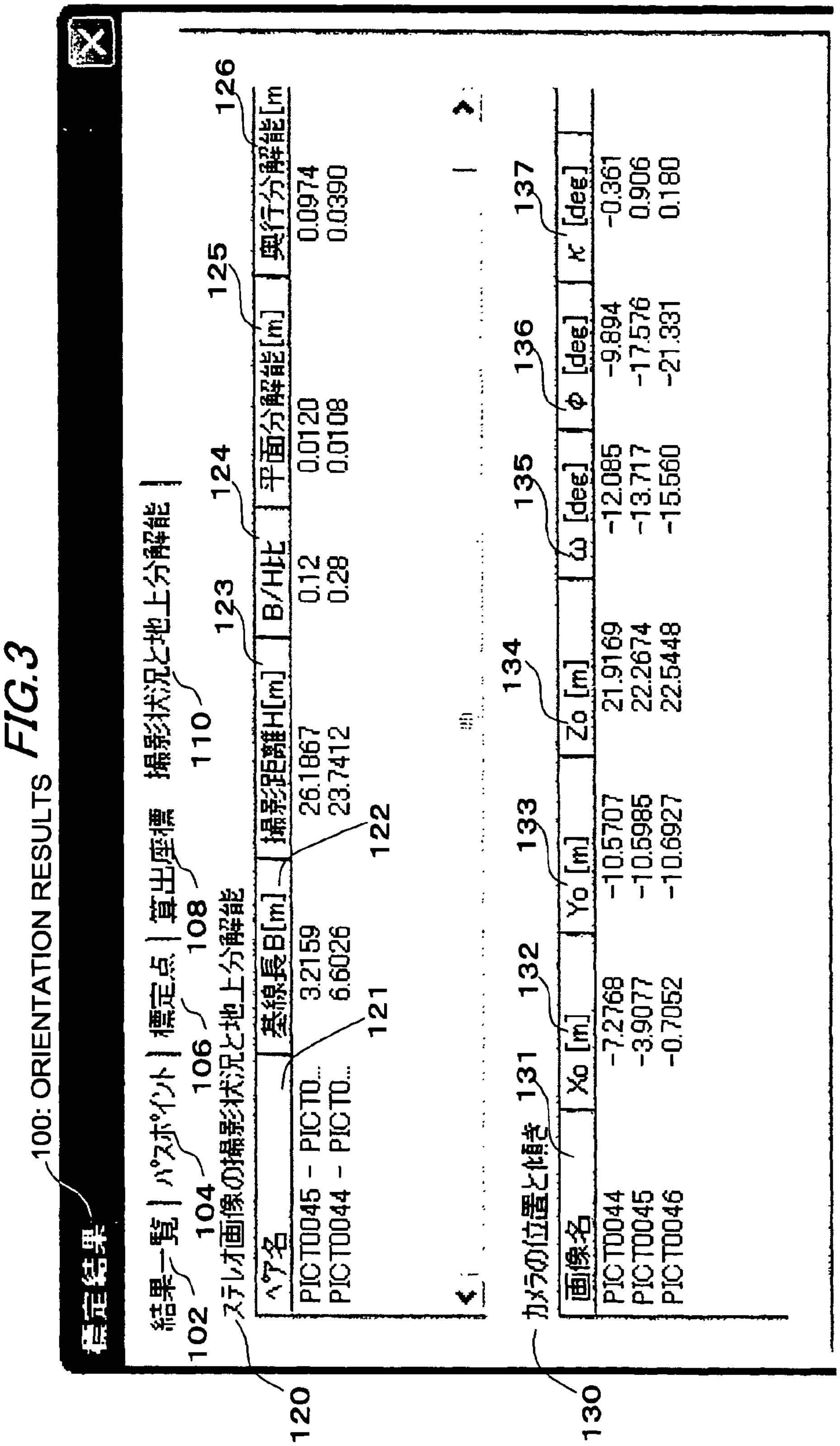
FIG. 3 is a screen view for explaining an example of orientation results from orientation calculation processing.

FIG. 3 is a screen view for explaining an example of orientation results of the orientation calculation processing. An orientation result screen view 100 includes a result list screen 102, a pass point screen 104, an orientation point screen 106, a calculated coordinate screen 108, and a photographing condition and ground resolution screen 110. The photographing condition and ground resolution screen 110 includes a stereo image photographing condition and ground resolution display area 120, and a camera position and tilt display area 130. The stereo image photographing condition and ground resolution display area 120 includes a pair name column 121, a base length B column 122, a photographing distance H column 123, a B/H ratio column 124, an in-plane resolution column 125, and a depth resolution column 126, representing data on two images as a stereo pair. The camera position and tilt display area 130 includes: an ω image name column 131; an ϕ column 132, a κ column 133, and a Zo column 134, representing three-dimensional coordinates of an origin of an image; and an ω column 135, a ϕ column 136, and a κ column 137, representing a tilt angle of an image with respect to the reference coordinate system.

Returning to FIG. 2, stereo measurement is performed in the three-dimensional coordinate data section 31, to obtain three-dimensional coordinates of the measuring object 1 (step S50). In cases where the stereo measurement is not performed, if three-dimensional coordinates of the corresponding points in the stereo image are read into the measuring object positional data storage section 16 in advance, the three-dimensional coordinate data section 31 reads the three-dimensional coordinates of the corresponding points from the measuring object positional data storage section 16. There are various modes of stereo measurement, namely manual, semi-automatic, and automatic measurement modes, as disclosed in JP-A-2003-284098 by the present inventors, for example. In the stereo measurement, stereo (left and right) images that can be viewed stereoscopically are created and displayed according to the orientation calculation processing results in step S40, and three-dimensional coordinates of the corresponding points are obtained utilizing the above modes. In the automatic measurement mode, a measuring region is designated before automatic measurement is performed. In the manual and semi-automatic measurement modes, measurement is performed while determining corresponding points on the left and right images, semi-automatically or manually with a mouse, and observing left and right stereo screens.

Figure 4:
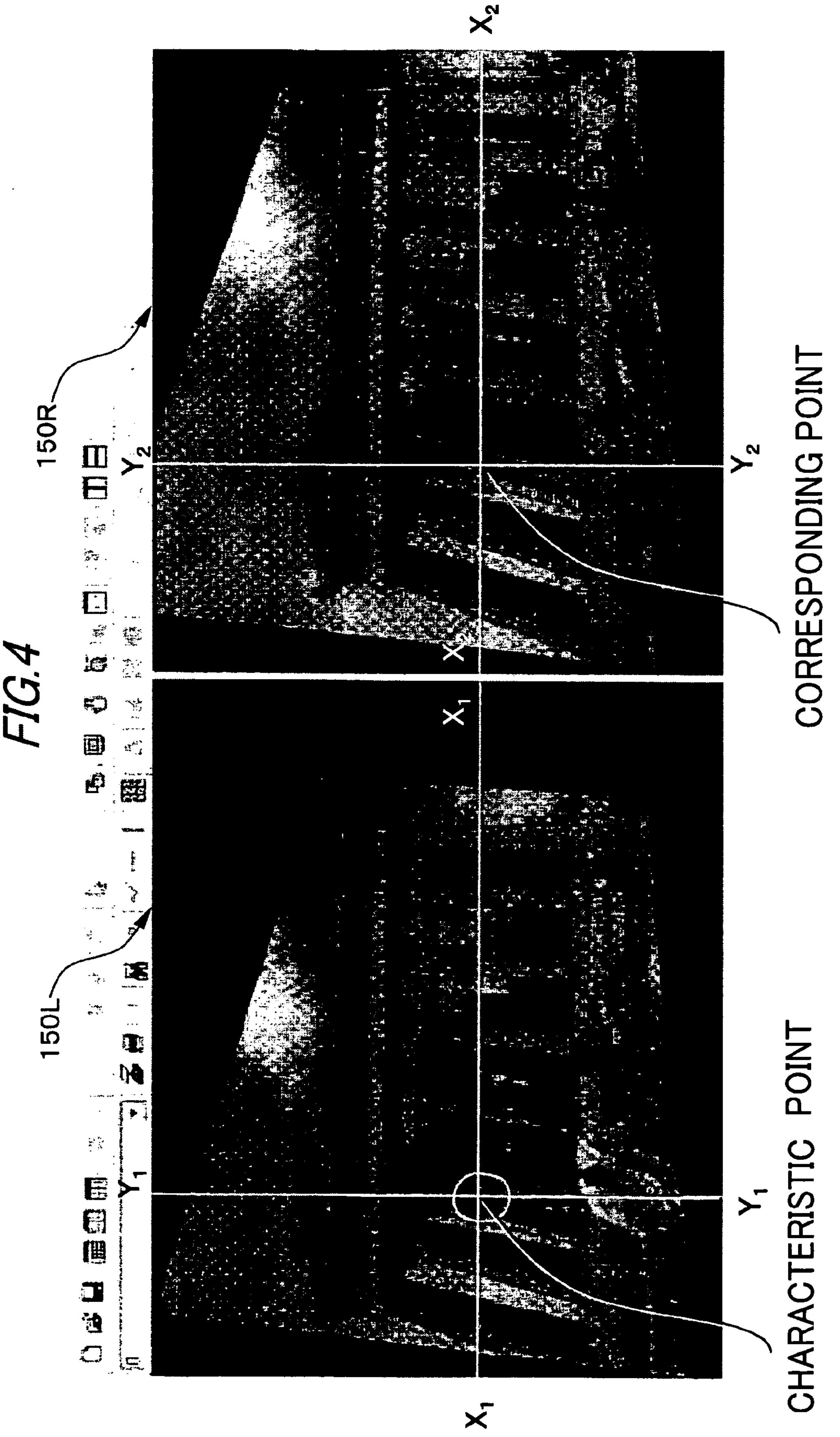
FIG. 4 is a view for explaining an example of stereo measurement performed on a stereo image.

FIG. 4 is a view for explaining an example of stereo measurement performed on a stereo image. Here, ruins of a temple are taken as the measuring object 1 as an exemplary stereo image 150, for which a left image 150L and a right image 150R are used as a stereo pair. The left image 150L is treated as a reference image, and coordinates of a characteristic point in the left image 150L are represented as $(X_1, Y_1)$. Accordingly, the three-dimensional coordinate data section 31 treats the right image 150R as a search image, and coordinates of a point in the right image 150R corresponding to the characteristic point in the left image 150L are represented as $(X_2, Y_2)$.

Figure 5:
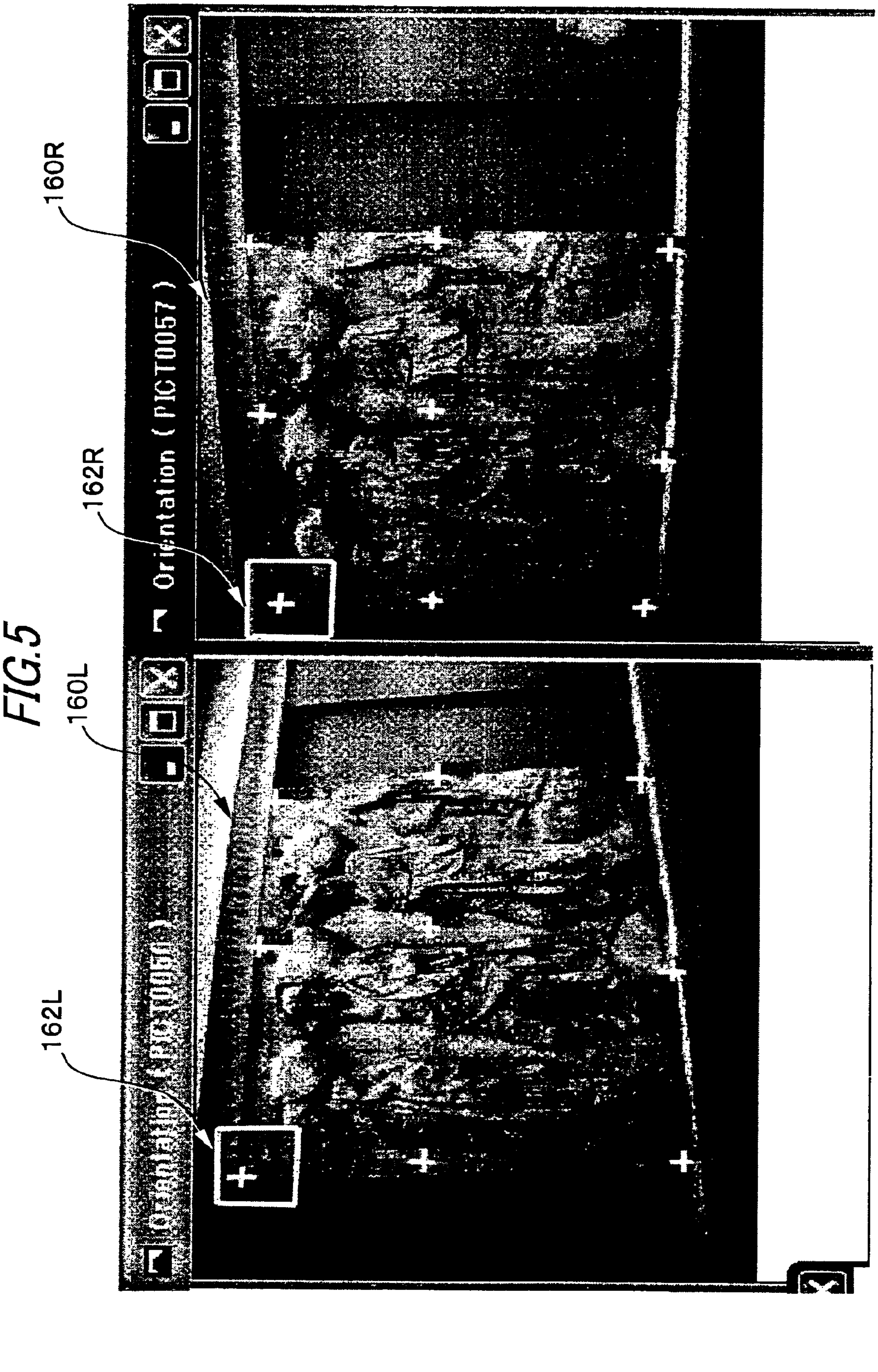
FIG. 5 is a view for explaining another example of the stereo measurement performed on a stereo image.

FIG. 5 is a view for explaining another example of the stereo measurement performed on a stereo image. Here, a relief of water bottle carriage formed on a wall surface in ruins of a temple is adopted as the measuring object 1. A left image 160L and a right image 160R of the water bottle carriage relief are used as a stereo pair for a stereo image 160 of the measuring object 1. The three-dimensional coordinate data section 31 treats the left image 160L as a reference image, and the right image 160R as a search image. An image region 162L in the vicinity of a characteristic point in the left image 160L and an image region 162R in the vicinity of a corresponding point in the right image 160R are extracted, and displayed as enlarged in FIG. 6.

Figure 6:
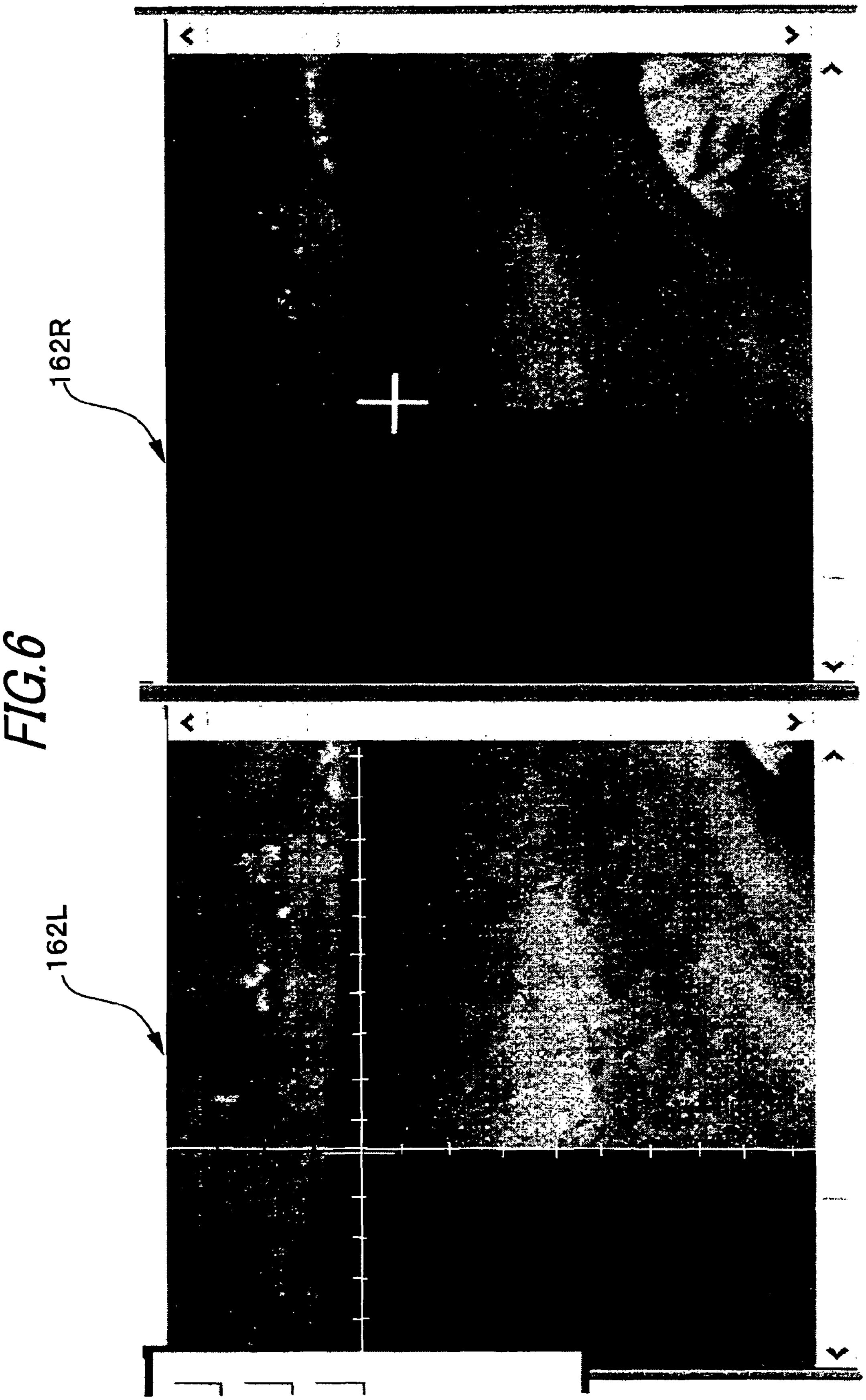
FIG. 6 is an enlarged view of an image region 162L in the vicinity of a characteristic point and an image region 162R in the vicinity of a corresponding point.

FIG. 6 is an enlarged view of the image region 162L in the vicinity of the characteristic point and the image region 162R in the vicinity of the corresponding point. When a characteristic point in the left image 160L (reference image) is designated by the operator, a corresponding point in the vicinity of the designated position in the right image 160R (search image) is pulled in by the corresponding point designating section 22. Here, a corner position of the water bottle carriage relief is used as the characteristic point in the vicinity of the designated position.

Figure 7:
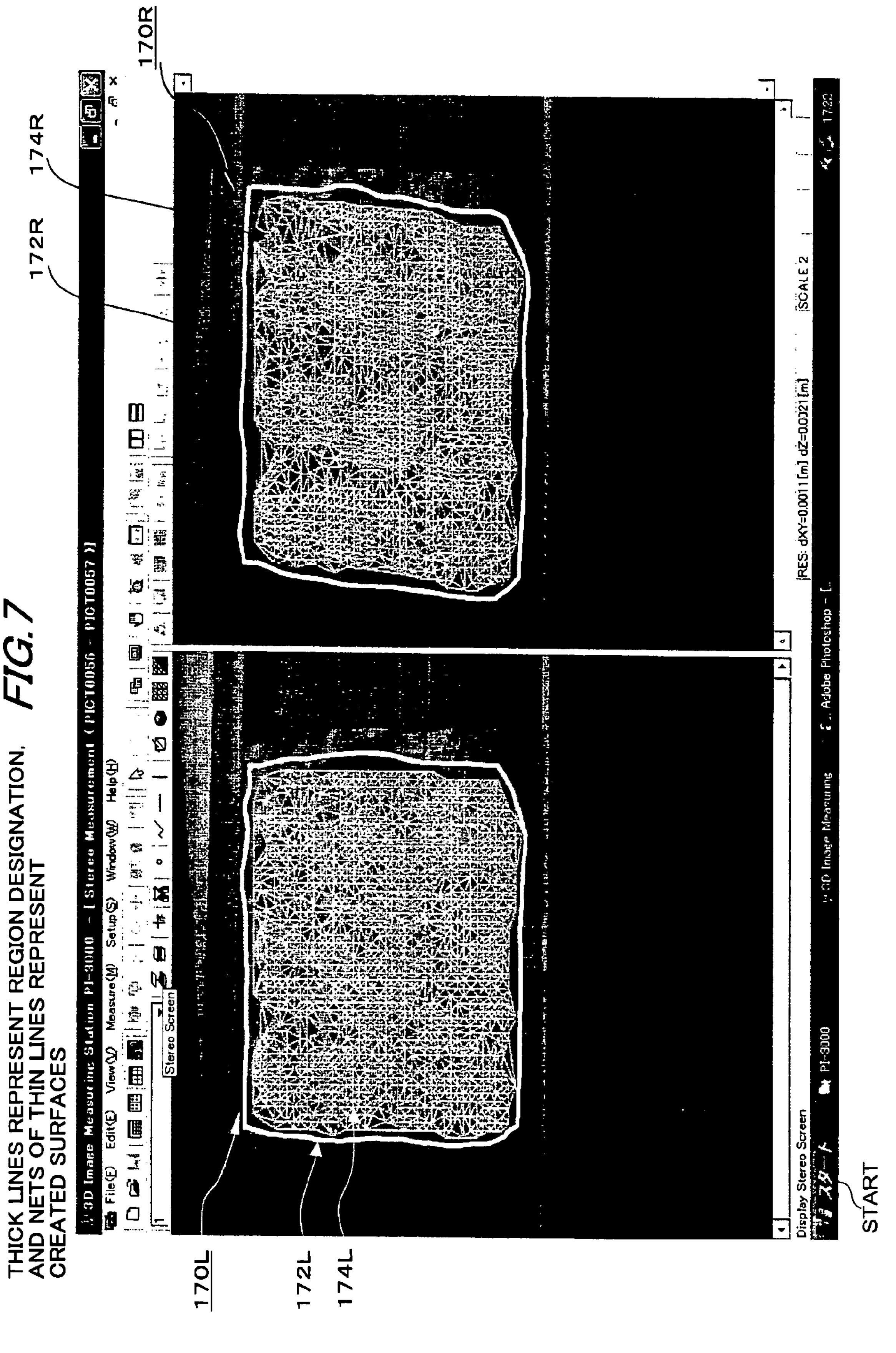
FIG. 7 is a view of an example of a model of a measuring object 1, showing its wireframe surfaces.

Returning to FIG. 2, the model forming section 32 creates a model of the measuring object 1 based on the obtained, or read, three-dimensional coordinates (step S60). FIG. 7 is a view of an example of a model of the measuring object 1, showing its wireframe surfaces. Here, a relief of water bottle carriage formed on a wall surface in ruins of a temple is taken as the measuring object 1 as a stereo image 170. A left image 170L and a right image 170R of the water bottle carriage relief are used as a stereo pair. Respective wireframe surfaces 174L and 174R are formed inside left and right region designating framelines 172L and 172R. Unit image areas constituting the wireframe surfaces 174L and 174R may selectably be, for example, triangular areas using three adjacent corresponding points or rectangular areas using four adjacent corresponding points. At this time, the posture of the model of the measuring object 1 is set to an orientation of the surface first created as its default.

Returning to FIG. 2, a surface desired to be texture-mapped is designated through the image corresponding section 34 (step S70). Texture-mapping refers to applying texture that produces a stereoscopic effect to a two-dimensional image of the measuring object 1. In cases of automatic stereo measurement, the processing in step S70 may be performed as designation of a measuring region performed in step S50. Then, the image correlating section 34 texture-maps the stereo image of the measuring object 1 and the model formed by the model forming section 32, using the relationship as to the corresponding points found by the orientation section 24 (step S72). Texture-mapping will be detailed later.

Then, the texture-mapped image is displayed on a model screen through the model display section 35 (step S80). The model screen is a two-dimensional image of the measuring object 1 as viewed perspectively, such as an image to which stereoscopic texture is applied or an image from which texture is removed, formed based on the stereo image. In step S80, a wireframe image, a group of three-dimensional dots (a dotted image obtained with a 3D scanner, for example), the photographing position of the camera and/or the position of the reference point may also be displayed, along with the texture-mapped image. Objects to be displayed on the model screen may be displayed concurrently or switched on and off, facilitating recognition of the stereo image calculation results and the photographed image of the measuring object 1.

Figure 8:
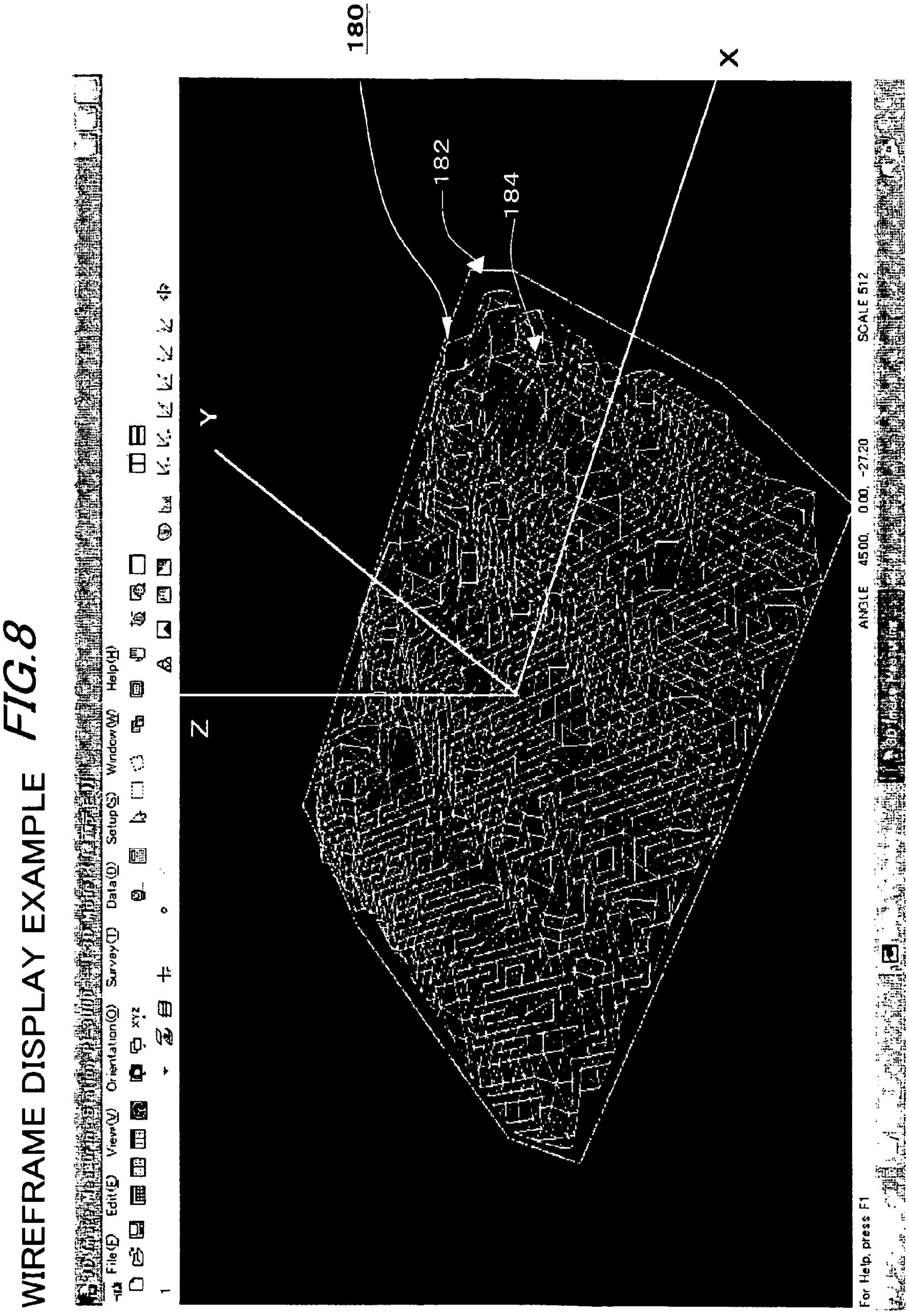
FIG. 8 is a view, representing texture that produces a stereoscopic effect with wireframes.

FIG. 8 is a view, representing texture that produces a stereoscopic effect with wireframes. A wireframe screen 180 displays, for example, a region designating frameline 182 of the measuring object 1, and a wireframe 184 of the measuring object 1. The wireframe 184 is applied to a two-dimensional image of the measuring object 1 as viewed perspectively.

Figure 9:
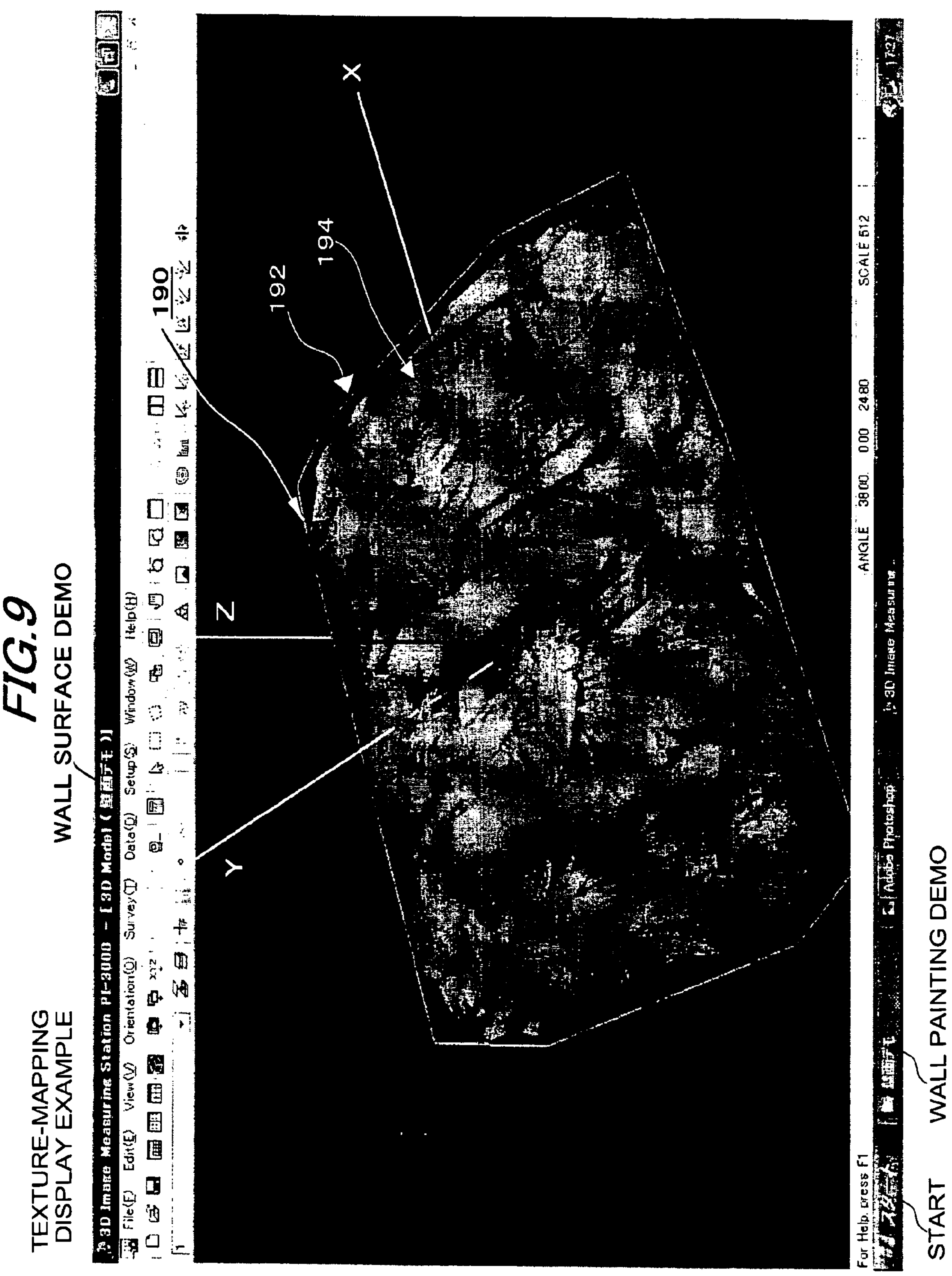
FIG. 9 shows an example of a texture-mapped display, in which the measuring object 1 is displayed as an image to which stereoscopic texture is applied.

FIG. 9 shows an example of a texture-mapped display, in which the measuring object 1 is displayed as an image to which stereoscopic texture is applied. A texture-mapping screen 190 displays, for example, a region designating frameline 192 of the measuring object 1, and a bird's-eye view image 194 of the measuring object 1 to which stereoscopic texture is mapped, through the model display section 35. The bird's-eye view image 194 of the measuring object 1 is displayed as a two-dimensional image of the measuring object 1 as viewed perspectively.

Returning to FIG. 2, the operator uses a mouse, a keyboard, and/or the like, to designate a direction in which the measuring object 1 is to be displayed on the wireframe screen 180 and/or the texture-mapping screen 190 through the posture designating section 36 (step S90). Then, the coordinate transformation section 37 transforms the direction in which the measuring object 1 is displayed on the display device 60 to that designated through the posture designating section 36, and displays the measuring object 1 on the wireframe screen 180 and/or the texture-mapping screen 190 (step S92). The operator determines whether or not there is another direction in which the measuring object 1 is to be displayed (step S94). If YES, the process returns to step S90, and if NO, the process terminates (step S96). The function of arbitrarily designating direction in which the measuring object 1 is to be displayed, as performed in steps S90 and S92, allows the measurement results and/or the measuring object 1 to be displayed on the display device 60 as viewed from any angle or viewpoint. It is therefore possible for the operator to visually recognize the measuring object 1.

[Relative Orientation]

Figure 10:
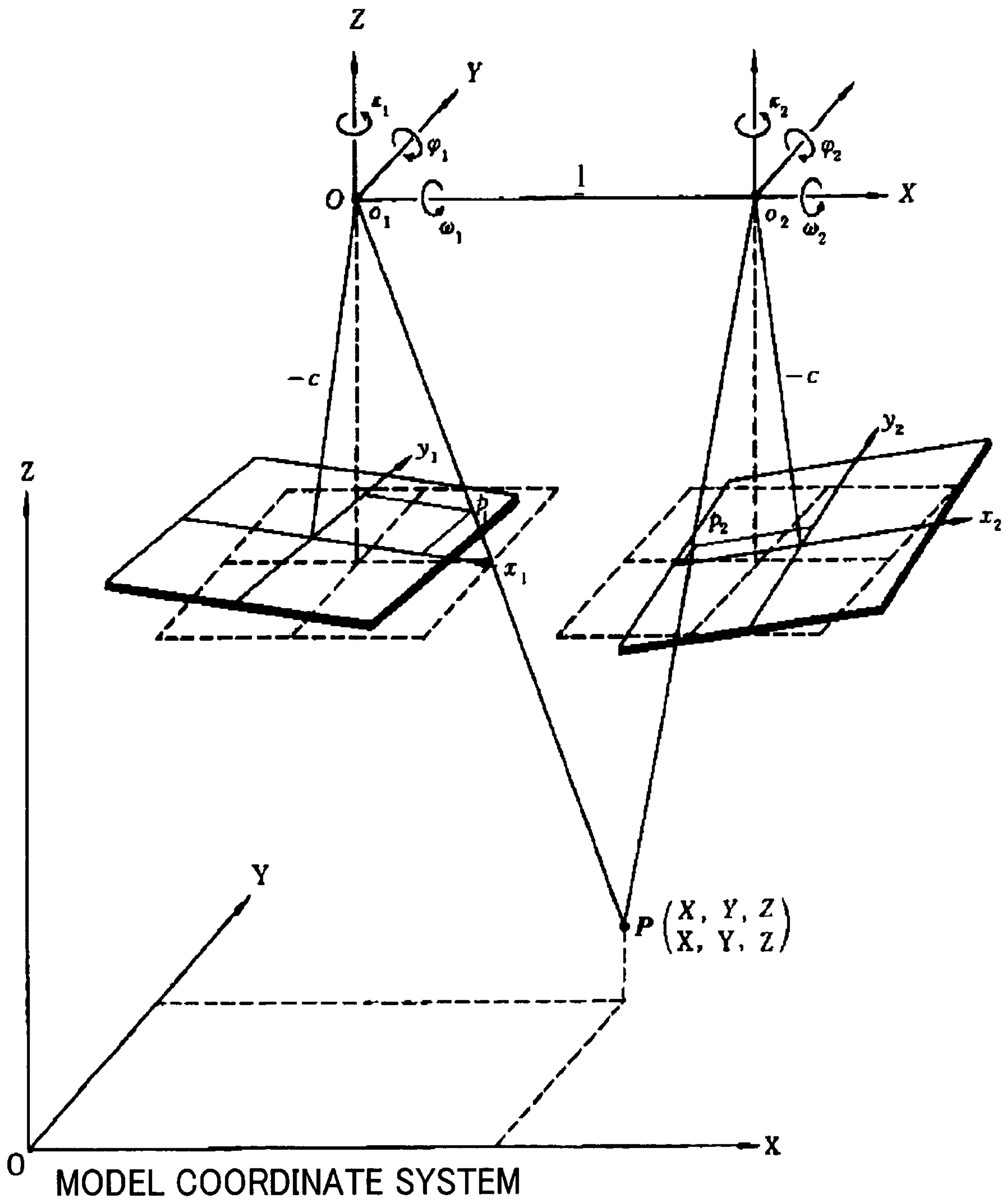
FIG. 10 is a diagram for explaining a model coordinate system XYZ and camera coordinate systems xyz in a stereo image.

A description is made of the relative orientation performed with the orientation section 24. FIG. 10 is a diagram for explaining a model coordinate system XYZ and camera coordinate systems xyz in a stereo image. An origin of the model coordinate system is used as a left projection center, and a line connecting it and a right projection center is used as an X-axis. As to the reduction scale, a base length is used as a unit length. At this time, parameters to be obtained are five rotational angles, namely a Z-axis rotational angle $\kappa_1$ and a Y-axis rotational angle $\phi_1$ of the left camera; and a Z-axis rotational angle $\kappa_2$, a Y-axis rotational angle $\phi_2$, and an X-axis rotational angle $\omega_2$ of the right camera.

First, the parameters required to decide the left and right camera positions are obtained from a coplanarity condition equation (1) as follows:

$$\begin{vmatrix} X_{01} & Y_{01} & Z_{01} & 1 \\ X_{02} & Y_{02} & Z_{02} & 1 \\ X_1 & Y_1 & Z_1 & 1 \\ X_2 & Y_2 & Z_2 & 1 \end{vmatrix} = C. \tag{1}$$

$X_{01}, Y_{01}, Z_{01}$: Projection center coordinates of left image $X_{02}, Y_{02}, Z_{02}$: Projection center coordinates of right image $X_1, Y_1, Z_1$: Image coordinates of left image $X_2, Y_2, Z_2$: Image coordinates of right image In this case, an X-axis rotational angle $\omega_1$ of the left camera is 0 and thus need not be considered.

Under the above conditions, the coplanarity condition equation (1) is transformed into an equation (2), and the respective parameters are obtained by solving the equation (2):

$$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \tag{2}$$

where coordinate conversion relations (3) and (4) as shown below hold true between the model coordinate system XYZ and the camera coordinate systems xyz:

$$\begin{pmatrix} X_1 \\ Y_1 \\ Z_1 \end{pmatrix} = \begin{pmatrix} \cos\phi_1 & 0 & \sin\phi_1 \\ 0 & 1 & 0 \\ -\sin\phi_1 & 0 & \cos\phi_1 \end{pmatrix} \begin{pmatrix} \cos\kappa_1 & -\sin\kappa_1 & 0 \\ \sin\kappa_1 & \cos\kappa_1 & 0 \\ 0 & 0 & 1 \end{pmatrix} \begin{pmatrix} x_1 \\ y_1 \\ -c \end{pmatrix} \tag{3}$$

-continued $$\begin{pmatrix} X_2 \\ Y_2 \\ Z_2 \end{pmatrix} = \begin{pmatrix} 1 & 0 & 0 \\ 0 & \cos\omega_2 & -\sin\omega_2 \\ 0 & \sin\omega_2 & \cos\omega_2 \end{pmatrix} \begin{pmatrix} \cos\phi_2 & 0 & \sin\phi_2 \\ 0 & 1 & 0 \\ -\sin\phi_2 & 0 & \cos\phi_2 \end{pmatrix} \begin{pmatrix} \cos\kappa_2 & -\sin\kappa_2 & 0 \\ \sin\kappa_2 & \cos\kappa_2 & 0 \\ 0 & 0 & 1 \end{pmatrix} \begin{pmatrix} x_2 \\ y_2 \\ -c \end{pmatrix} + \begin{pmatrix} 1 \\ 0 \\ 0 \end{pmatrix} \tag{4}$$

Using these equations, unknown parameters are obtained by following the procedures below:

(i) An initial approximation is normally set to 0.

(ii) A derivative coefficient when the coplanarity condition equation (2) is linearized, or Taylor-expanded, around the approximation is obtained from the equations (3) and (4), to formulate an observation equation.

(iii) A least squares method is applied to obtain a correction quantity with respect to the approximation.

(iv) The approximation is corrected.

(v) Using the corrected approximation, operations (ii) through (v) are repeated until a convergence is achieved.

Figure 11:
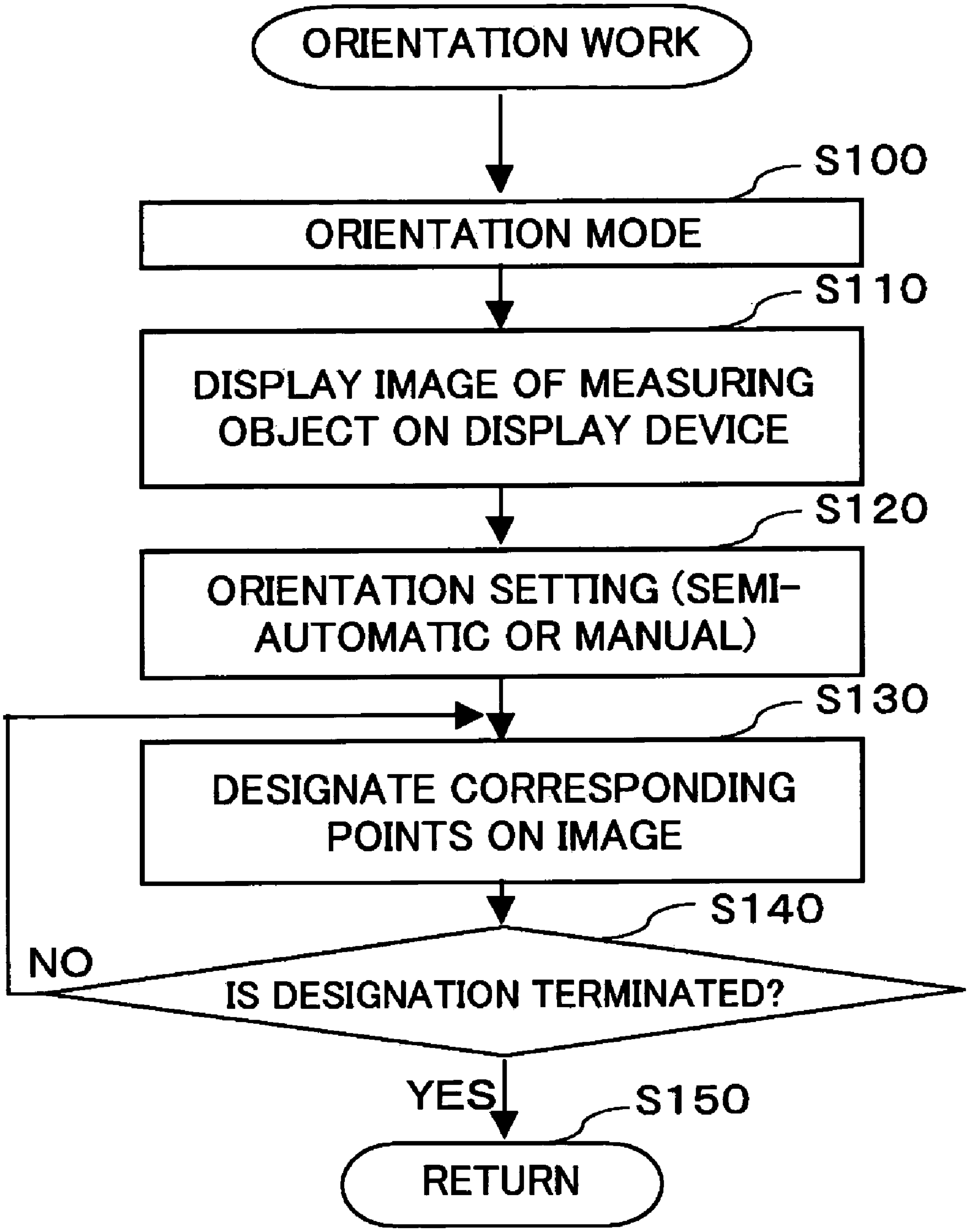
FIG. 11 is a flowchart of orientation work in manual and semi-automatic orientation modes.

Subsequently, with reference to FIG. 11, orientation work through the orientation section 24 is detailed. There are three modes of orientation, namely manual, semi-automatic, and automatic orientation modes, selectable as appropriate depending on the distribution condition of corresponding points in the orientation image. FIG. 11 is a flowchart of orientation work in the manual and semi-automatic orientation modes. First, the orientation section 24 enters an orientation mode (step S100). By this time, the operator has designated an image desired to be oriented. There is no special limitation on the number of images to be designated. Then, a measuring object image designated through the orientation section 24 is displayed on the screen of the display device 60 (step S110).

The operator selects the manual or semi-automatic orientation mode as a setting for the orientation (step S120). In this case, the manual mode may be selected as a default (presetting) for the orientation work through the orientation section 24. The semi-automatic orientation mode includes two modes, namely a gravity center detection mode and a corner detection mode, which will be detailed later. Then, the operator designates points to be used for orientation of the image, as shown for example in FIG. 5 and FIG. 6 (step S130). In this case, corresponding points on the left and right images of the measuring object 1 are designated through the corresponding point designating section 22. In the manual mode, corresponding points on the left and right images of the measuring object 1 are designated on the screen of the display device 60. In the semi-automatic measurement mode, a vicinity of corresponding points is designated so that the corresponding point designating section 22 identifies the corresponding points (gravity center or corner). Then, it is determined whether or not designation of corresponding points on the left and right images of the measuring object 1 is terminated (step S140). If NO, the process returns to step S130 to continue designation of corresponding points, and if YES, the process is returned (step S150).

Figure 12:
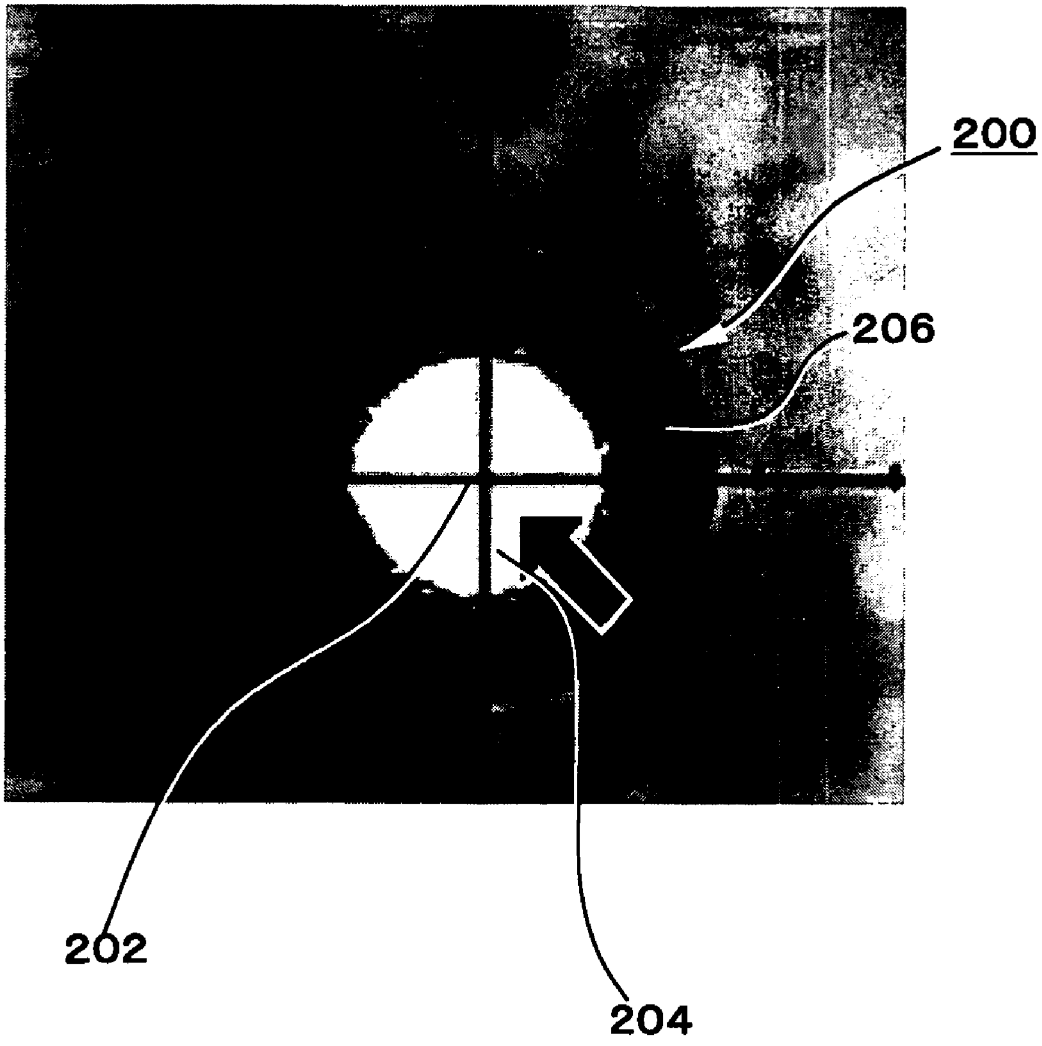
FIG. 12 is an explanatory view of a retro target affixed to the characteristic point of the measuring object.

With reference to FIG. 12 and subsequent figures, a description is made of an algorithm for the semi-automatic orientation mode. FIG. 12 is an explanatory view of a retro target affixed to the characteristic point of the measuring object. A retro target 200 is a gauge mark (target) with a clearly identifiable center position 202, and includes an inner circular portion 204 and an outer circular portion 206 formed concentrically with each other. The brightness of the inner circular portion 204 is high while that of the outer circular portion 206 is low, to improve viewability. Thus, the retro target 200 is affixed to a characteristic point particularly important for positioning, such as a gravity center or a corner of the measuring object 1. The brightness, or contrast of brightness and darkness, of the inner circular portion 204 and that of the outer circular portion may be inverse.

Figure 13:
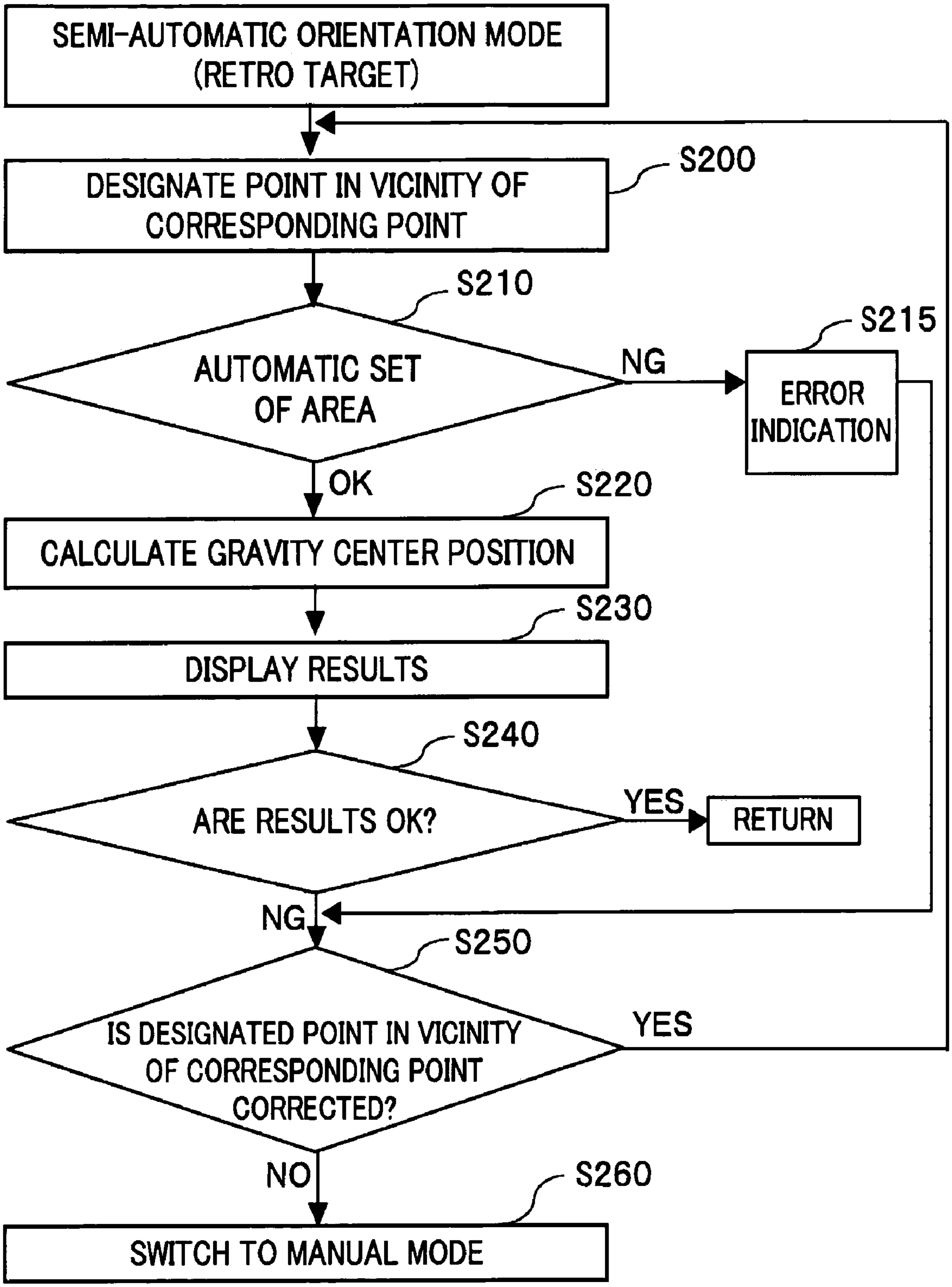
FIG. 13 is a flowchart for explaining an algorithm for gravity center detection in the semi-automatic orientation mode.

FIG. 13 is a flowchart for explaining an algorithm for gravity center detection in the semi-automatic orientation mode. First of all, the retro target 200 is affixed to a characteristic point of the measuring object 1 in advance. Alternatively, instead of using the retro target 200, a characteristic point with high brightness on the measuring object 1 may be designated through the corresponding point designating section 22. The operator designates a vicinity of a corresponding point with a mouse cursor on an image (reference image) of the measuring object 1 displayed on the screen of the display device 60 (step S200). Then, the corresponding point designating section 22 decides an area where the target lies in the vicinity of the corresponding point in the search image (step S210).

Figure 14B:
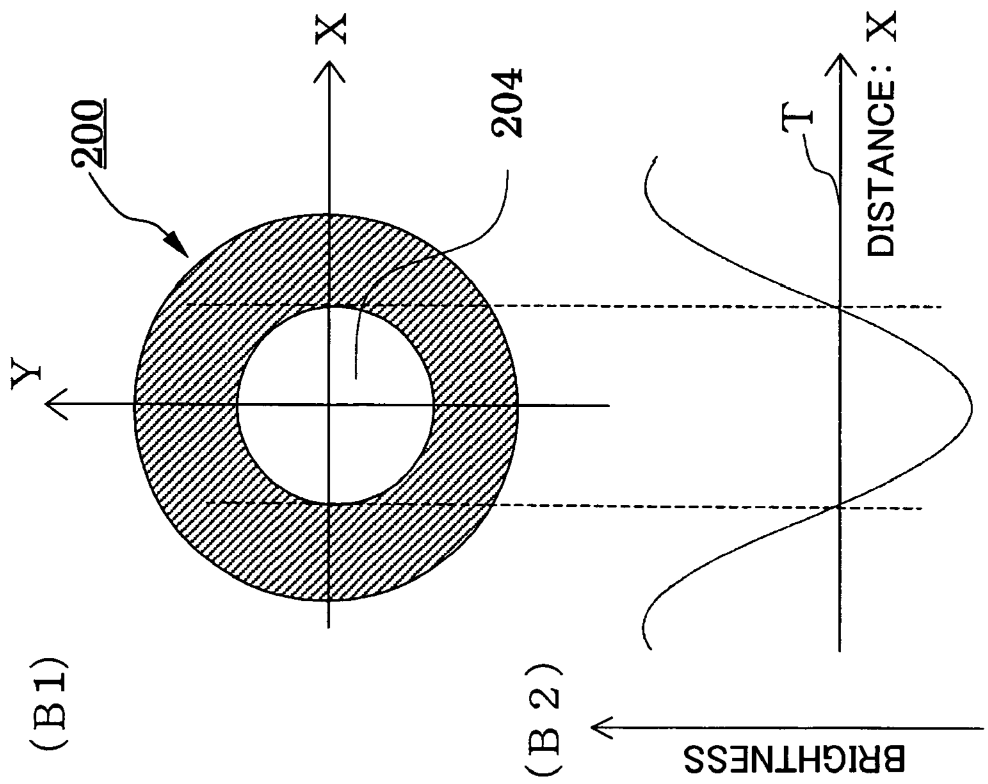
FIG. 14(B) is a diagram for explaining the gravity center position detection using another example of the retro target.
Figure 14A:
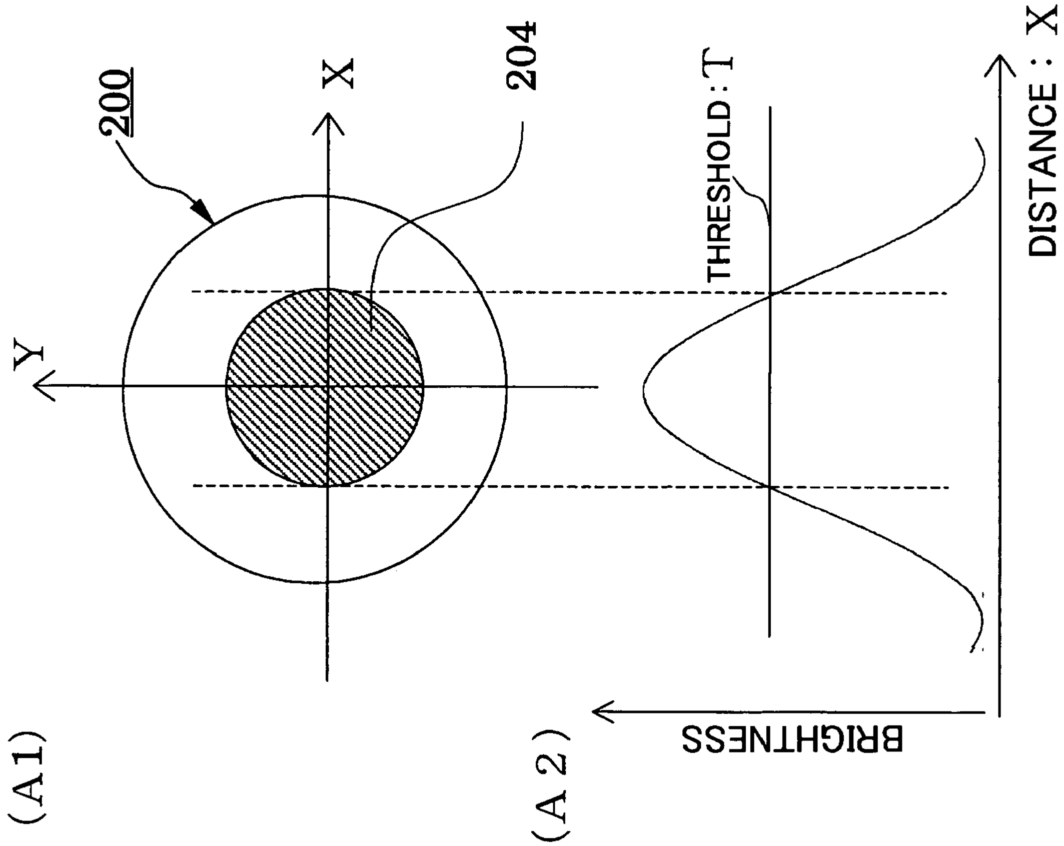
FIG. 14(A) is a diagram for explaining the gravity center position detection using one example of the retro target.

FIGS. 14(A) and (B) are a diagram for explaining the gravity center position detection using the retro target, in which: (A1) shows a retro target with a bright inner circular portion, (A2) shows a brightness distribution in a diametrical direction of the retro target of (A1), (B1) shows a retro target with a dark inner circular portion, and (B2) shows a brightness distribution in a diametrically direction of the retro target of (B1). In the figure, bright portions are shown as hatched. In cases where a retro target has a bright inner circular portion as shown in FIG. 14(A) (A1), a gravity center position in a photographed image of the measuring object 1 receives a large amount of reflected light and thus is bright. Therefore, light distribution in the image is as shown in FIG. 14(A) (A2), allowing the inner circular portion 204 and the center position 202 of the retro target to be found from a threshold T of light distribution.

Returning to FIG. 13, if the photographing condition of the measuring object 1 is poor and thus the area where the target lies cannot be calculated in step S210, gravity center position cannot be detected and an error indication is therefore displayed (step S215). Then, the process jumps from step S215 to step S250, where it is determined whether or not the designated point in the vicinity of the corresponding point is corrected (step S250). If YES, the process returns to step S200, where another measuring point is designated as a point in the vicinity of the corresponding point. If NO in step S250, the measurement mode is switched to the manual mode and another characteristic point is designated to remeasure a position of the characteristic point (step S260).

Then, the orientation section 24 or the corresponding point designating section 22 calculates a gravity center position with, for example, the moment method (step S220). For example, the retro target 200 shown in FIG. 14 (A1) is assumed to be represented by plane coordinates (x, y). Then, calculations are performed for points in x and y directions at which brightness of the retro target 200 is at the threshold T or more, using equations (6) and (7):

$$xg=\{\Sigma x\cdot f(x,y)\}/\Sigma f(x,y) \tag{6}$$

$$yg=\{\Sigma y\cdot f(x,y)\}/\Sigma f(x,y) \tag{7}$$

where (xg, yg) represents coordinates of the gravity center position, and f(x, y) represents a brightness at coordinates (x, y). In cases where the retro target 200 shown in FIG. 14 (B1) is used, calculations are performed for points in x and y directions at which brightness is at the threshold T or less, using the above equations (6) and (7).

Then, the orientation section 24 or the corresponding point designating section 22 displays the corresponding point position calculated in step S220 on the screen (step S230). If the corresponding point position displayed in step S230 matches a determination standard set by the operator or predetermined, the orientation work terminates and the process is returned (step S240). On the other hand, if the corresponding point position displayed in step S230 does not match the determination standard set by the operator or predetermined, or if gravity center position cannot be detected and an error indication is displayed, the process jumps to step S250 described above.

Figure 15:
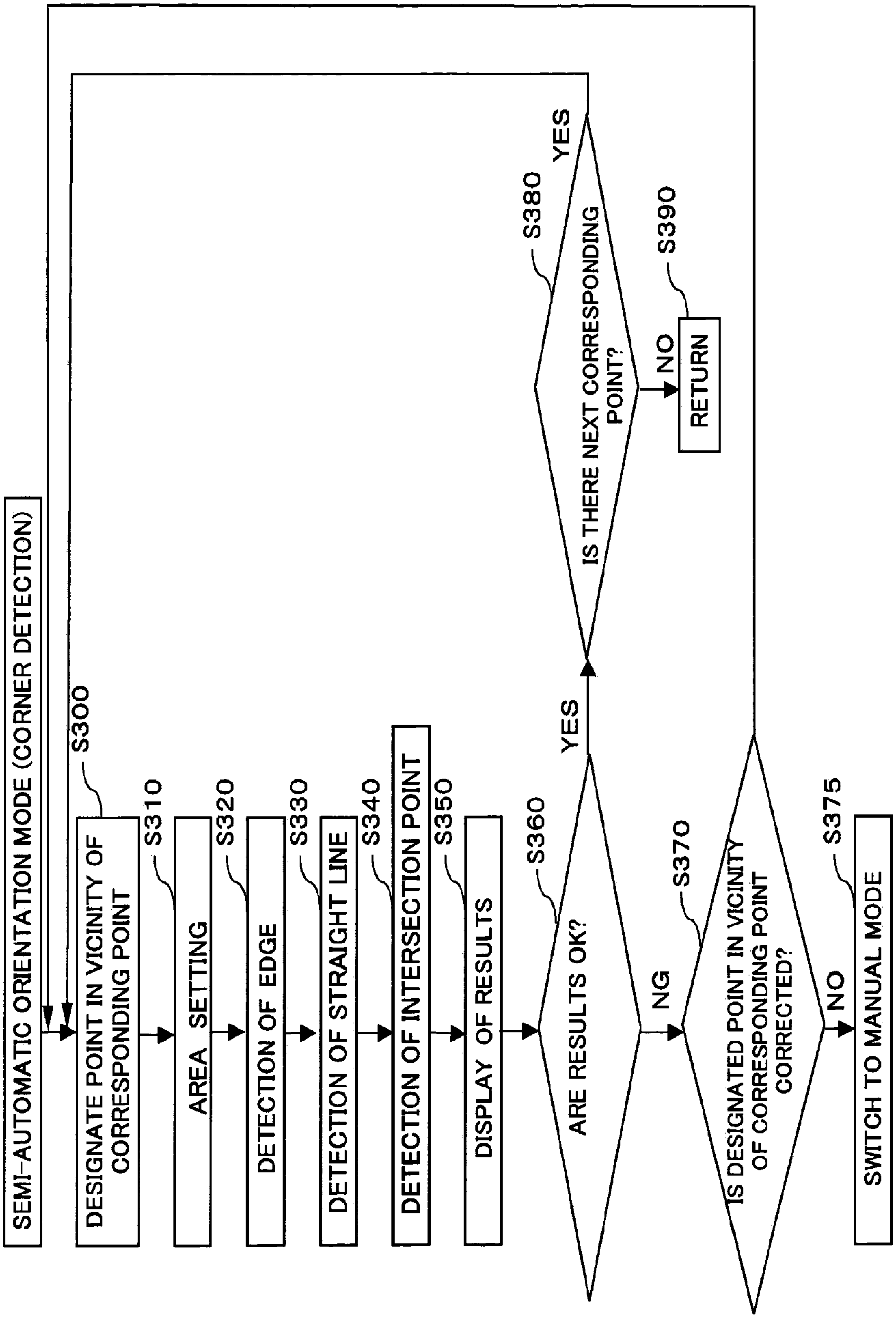
FIG. 15 is a flowchart for explaining an algorithm for corner detection in the semi-automatic orientation mode.

FIG. 15 is a flowchart for explaining an algorithm for corner detection in the semi-automatic orientation mode. The algorithm for corner detection is applied in such a case where a corner at which straight lines intersect is present on an image of the measuring object 1, or where a target including lines intersecting perpendicularly is affixed to the measuring object 1. The algorithm is extremely advantageous in cases where the measuring object 1 is a structure having a number of lines and corners such as a building.

The operator designates a vicinity of a corresponding point with a mouse cursor of the corresponding point designating section 22 on an image (reference image) of the measuring object 1 displayed on the screen of the display device 60 (step S300). Then, the corresponding point designating section 22 automatically sets a search region (area) in the vicinity of the designated point in the reference image and the corresponding point in the search image (step S310). In this case, characteristic point detection is designated as corner detection, and thus the search region is preset to a constant as its default, depending on the image reduction scale of the measuring object 1. Then, the orientation section 24 or the corresponding point designating section 22 performs edge detection in the search region (step S320). In edge detection, an edge detection filter or a LOG filter (described below), for example, may be used. In short, any detection scheme used in image processing to detect of an edge in an image will do.

An example of edge detection is described briefly below. An image of L×L pixels centered on a detection point is used as an object image. A density waveform of the object image is processed with a Laplacian-Gaussian filter (LOG filter), which is a second derivative of a Gaussian function represented in an equation (8), and two zero-crossings, in other words edges, on a curve as the calculation results are detected with sub-pixel accuracy:

$$\nabla^2\cdot G(x)=(x^2\cdot 2\sigma^2/2\pi\sigma^6)\cdot \exp(-x^2/\sigma^2) \tag{8}$$

where σ represents a parameter of the Gaussian function.

Subsequently, the corresponding point designating section 22 performs straight line detection for the detected edges (step S330). The corresponding point designating section 22 or the operator examines continuity of the edges, and fits a straight line to two edges with the highest degree of continuity. The straight line detection method is not limited thereto; any other method may be used. Then, the corresponding point designating section 22 finds an intersection point of the two detected straight lines (step S340). The corresponding point designating section 22 displays the results on the screen of the display device 60 (step S350). It is determined whether or not the characteristic point as the results of corner detection matches a determination standard set by the operator or predetermined (step S360). If YES in step S360, it is determined whether or not there is a next corresponding point (step S380). If there is a next corresponding point in step S380, the next corresponding point is designated and the process returns to step S300. If there is no next corresponding point in step S380, the corner detection processing terminates and the process returns (step S390).

If NO in step S360, it is determined whether or not the designated point in the vicinity of the corresponding point is corrected with a mouse cursor (step S370). If YES, the process returns to step S300, where another measuring point is designated as a point in the vicinity of the corresponding point. If NO in step S370, the measurement mode is switched to the manual mode for remeasurement (step S375).

Figure 16:
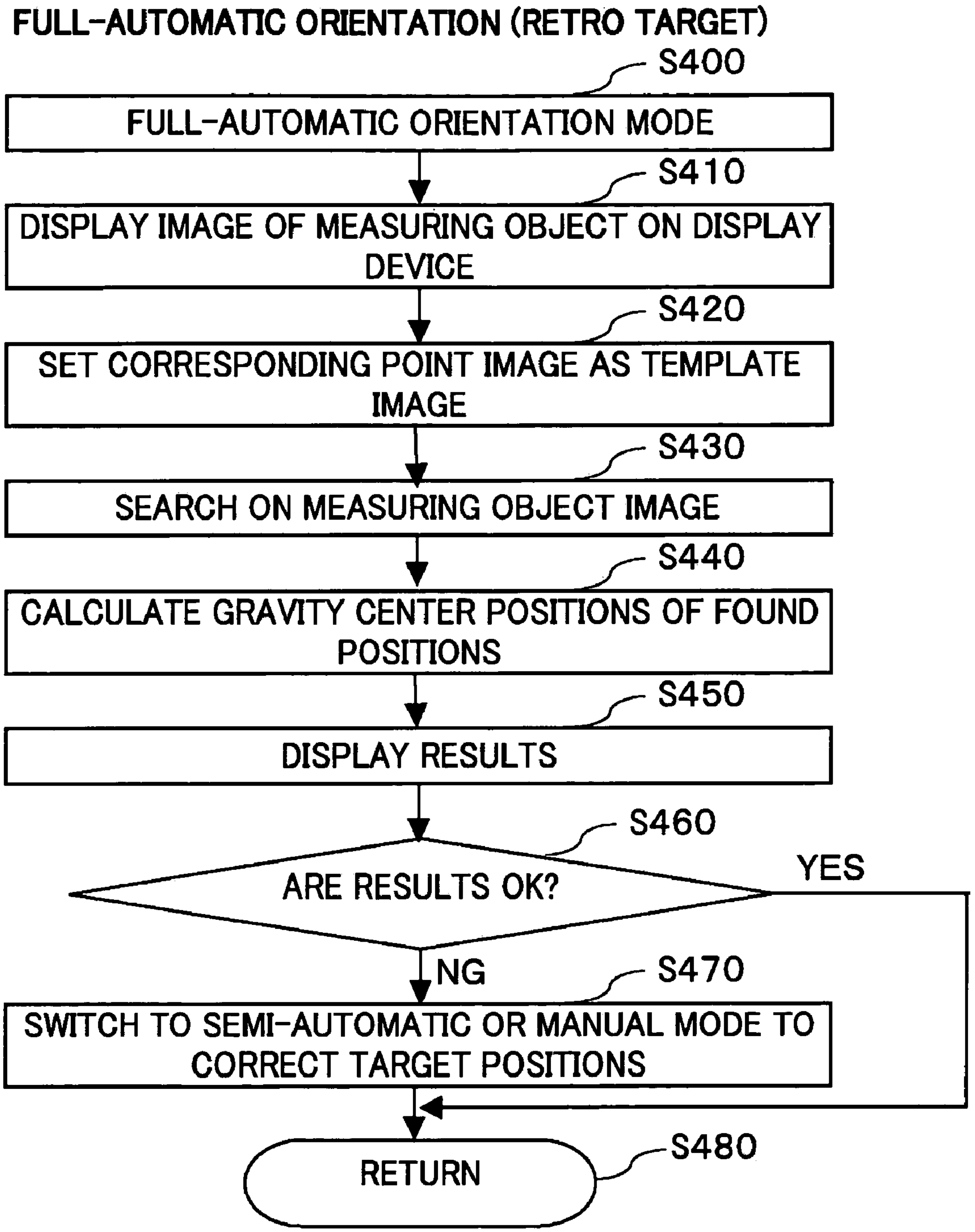
FIG. 16 is a flowchart for explaining an algorithm for an automatic orientation mode.

Next, with reference to FIG. 16, a description is made of the automatic measurement. FIG. 16 is a flowchart for explaining an algorithm for the automatic orientation mode. In the automatic orientation mode, a retro target 200 (see FIG. 12) is affixed to a characteristic point of the measuring object 1 in advance. The operator selects the automatic orientation mode through the orientation section 24 (step S400). Then, an image of the measuring object is displayed on the screen of the display device 60 (step S410). The corresponding point designating section 22 registers one corresponding point image as a template (step S420). Subsequently, the corresponding point designating section 22 searches for a retro target image that is the same as the registered template image on the measuring object image (step S430). In this case, image searching is performed by template matching.

The template matching is detailed here. There are a number of approaches to the template matching, including the normalized correlation method, the sequential similarity detection algorithm (SSDA), and others using various arithmetic principles. When the sequential similarity detection algorithm is used for template matching, processing can be performed faster. Here, the sequential similarity detection algorithm is described.

Figure 17:
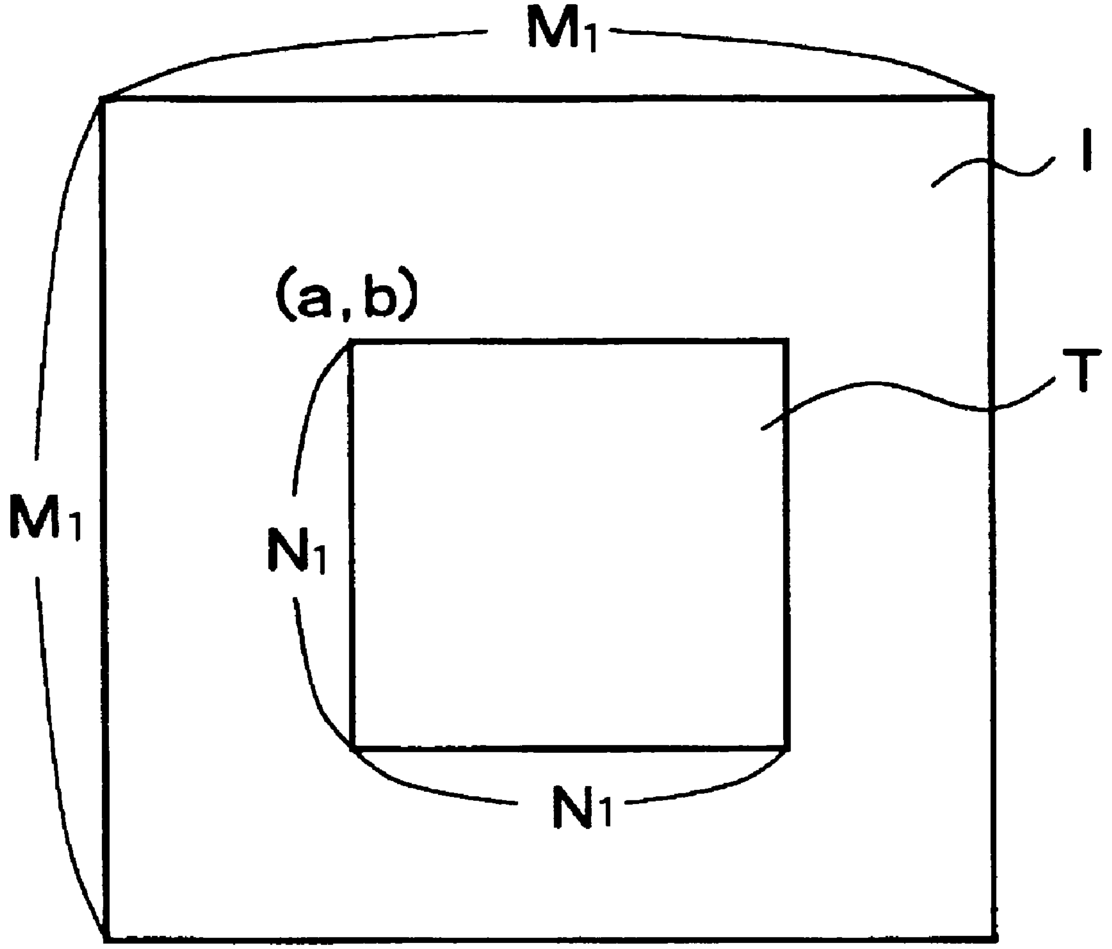
FIG. 17 is an explanatory diagram of an inputted image and a template image in a sequential similarity detection algorithm.

FIG. 17 is an explanatory diagram of an inputted image and a template image in the sequential similarity detection algorithm. The corresponding point designating section 22, provided with a function of running a sequential similarity detection algorithm, moves the template image of N1×N1 pixels on a searching area $(M1-N1+1)^2$ in the inputted image of M1×M1 pixels, which is larger than the template image. A position of the template image is represented by, for example, coordinates (a, b) of a representative point, which is provided at its upper left corner, in the inputted image. Then, the corresponding point designating section 22 calculates a residual R(a, b) represented by an equation (9), with the template image at respective movement positions, to find a movement position where the residual is smallest. The movement position where the residual R(a,b) is smallest is the image position to be found by template matching.

$$R(a, b) = \sum_{m1=0}^{N1-1} \sum_{n1=1}^{N1-1} |I_{(a,b)}(m_1, n_1) - T(m_1, n_1)| \tag{9}$$

$T(m_1,n_1)$: Template image $I_{(a,b)}(m_1,n_1)$ Partial image of object image (a, b): Upper left coordinates of template image R(a, b): Residual For faster processing, adding in the equation (9) may be stopped when the value R(a, b) has exceeded the smallest value of the previous residuals, to proceed to next pixel coordinates (a, b).

Returning to FIG. 16, for all the targets found in step S430, gravity center position detection is performed more exactly (step S440). For the gravity center detection, the above-described moment method, for example, may be advantageously used. The orientation section 24 or the corresponding point designating section 22 displays target positions calculated in step S440 on the screen (step S450). If the corresponding point positions displayed in step S450 match a determination standard set by the operator or predetermined, the orientation work terminates and the process returns (step S460). On the other hand, if the target positions displayed in step S450 do not match the determination standard set by the operator or predetermined, or if the gravity center position detection cannot be performed and an error indication is displayed, the semi-automatic orientation mode or the manual mode is selected and unmatching target positions are corrected (step S470).

[Creation of Model Image]

Figure 18:
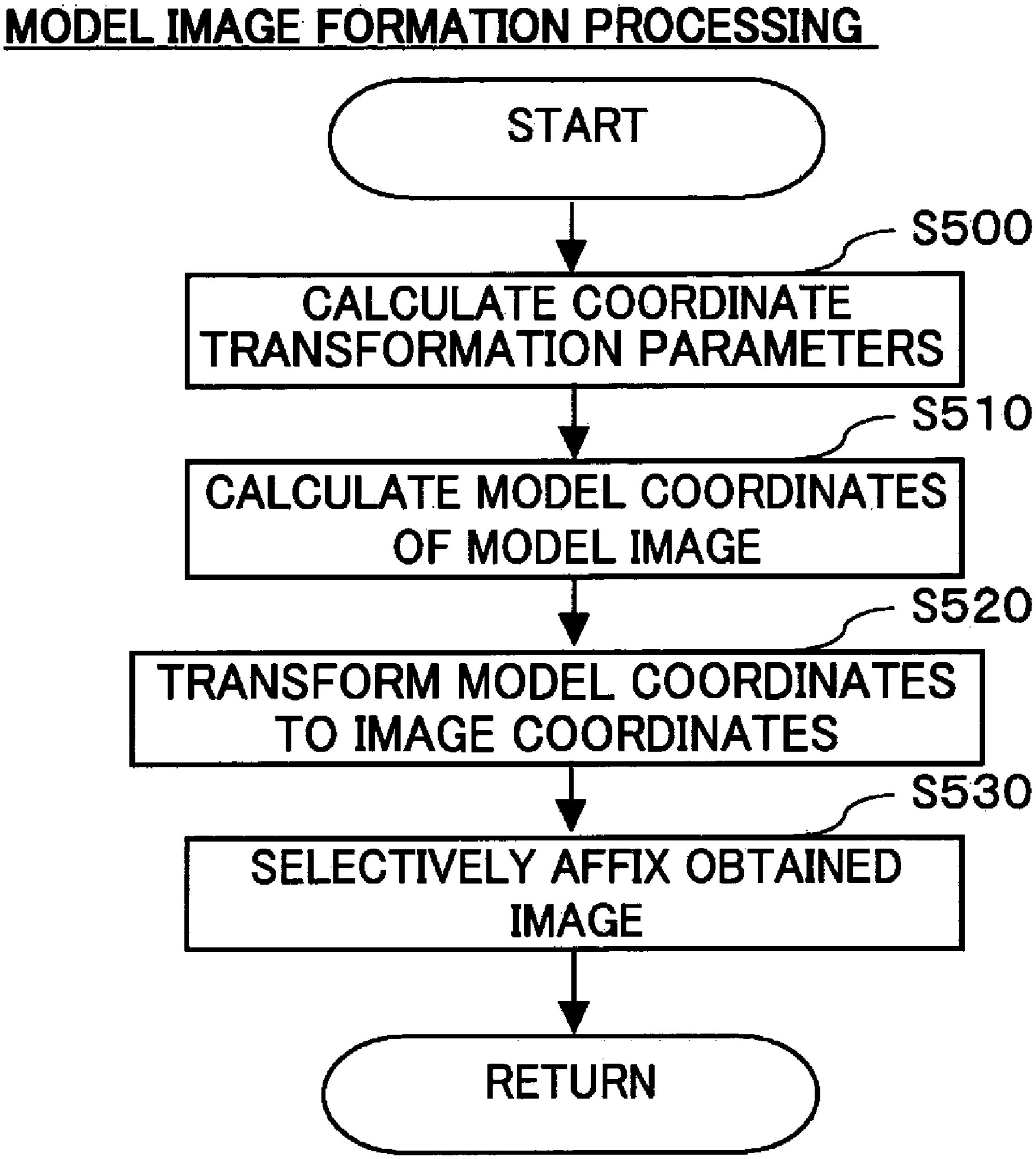
FIG. 18 is a flowchart for explaining procedures for creating a model image.

Now, with reference to FIG. 18, a description is made of a model image used in the model. The model image is used in the model forming section 32, the image correlating section 34, the model display section 35, and so on. FIG. 18 is a flowchart for explaining procedures for creating a model image. First, using coordinates obtained in the orientation work and the orientation calculation processing, coordinate conversion parameters are calculated. That is, the image coordinates measured in the orientation work are correlated with the ground coordinates calculated in the orientation calculation processing (tentatively set ground coordinates, in cases where a model coordinate system is used), to calculate coordinate conversion parameters (step S500).

The coordinate conversion parameters are obtained according to a three-dimensional projective transformation equation (10) as follows:

$$\left.\begin{aligned} x &= \frac{L_1X + L_2Y + L_3Z + L_4}{L_9X + L_{10}Y + L_{11}Z + 1} \\ y &= \frac{L_5X + L_6Y + L_7Z + L_8}{L_9X + L_{10}Y + L_{11}Z + 1} \end{aligned}\right\} \tag{10}$$

where (x, y) represents image coordinates, (X, Y, Z) represents ground coordinates, and L1-L11 represent unknown variates. By solving the three-dimensional projective transformation equation (10) based on reference point data using a least squares method, various conversion parameters that decide relationship between the image coordinates (x, y) and the three-dimensional coordinates (X, Y, Z) can be obtained.

Ground coordinates of each pixel on the model image are calculated (step S510). This process is intended to convert the image coordinates (x, y) of the model image to the ground coordinates (X, Y, Z), to create a model image. The ground coordinates (X, Y, Z) are calculated using the conversion parameters that were obtained earlier in step S500 of the coordinate conversion parameter calculation process. That is, the ground coordinates (X, Y, Z) corresponding to the image coordinates (x, y) of the model image are given by an equation

(11) as follows. In this manner, a position where each pixel on the model image is obtained can be calculated:

$$\left.\begin{aligned} X &= X_0 + x\Delta X \\ Y &= Y_0 - y\Delta Y \\ Z &= -\frac{aX + bY + d}{c} \end{aligned}\right\} \tag{11}$$

where (Xo, Yo) represents an upper left position of the model image in the ground coordinate system, (ΔX, ΔY) represents a size of a pixel (e.g. m/pixel) in the ground coordinate system, (x, y) represents image coordinates of the model image, (X, Y, Z) represents ground coordinates, and coefficients a, b, c, and d represent coefficients of a plane equation formed by plural reference points into which certain image coordinates (x, y) are interpolated.

Now, using the conversion parameters obtained in step S500, image coordinates (x, y) corresponding to the ground coordinates (X, Y, Z) obtained in step S510 are calculated according to the three-dimensional projective transformation equation (10) (step S520). Based on the thus obtained image coordinates (x, y), a density value at the ground coordinates (X, Y, Z) of the corresponding image is obtained. The density value represents density of a pixel at a two-dimensional position (X, Y) on the model image. In this manner, density of an image affixed to a position (X, Y) on the ground coordinates is obtained. The process as described above is performed for every pixel on the model image, to affix an image (step S530).

coordinate system X, Y, Z is located at coordinates P'(X', Y', Z') in a tilted coordinate system X', Y', Z' (coordinate system from different viewpoint). The coordinates P'(X', Y', Z') can be calculated according to equations (12)-(15) as follows:

$$\begin{pmatrix} Y' \\ Z' \end{pmatrix} = \Re^{-1} \begin{pmatrix} X - X_0 \\ Y - Y_0 \\ Z - Z_0 \end{pmatrix} \tag{12}$$

where a rotation matrix R satisfies equations (13) and (14) as follows:

$$\Re = \Re_{\omega} \Re_{\phi} \Re_{\kappa} \tag{13}$$

$$\Re^{-1} = \Re^{t} = \begin{pmatrix} a_{11} & a_{21} & a_{31} \\ a_{12} & a_{22} & a_{32} \\ a_{13} & a_{23} & a_{33} \end{pmatrix} \tag{14}$$

where (Xo, Yo, Zo) are coordinates of a projection center.

An element $a_{ij}$ (i=1-3, j=1-3) of the rotation matrix R is represented as an equation (15) as follows:

$$\left.\begin{aligned} &a_{31} = \sin\omega\sin\kappa - \cos\omega\cos\varphi\cos\kappa, \quad a_{32} = \sin\omega\cos\kappa + \cos\omega\sin\varphi\sin\kappa, \quad a_{33} = \cos\omega\cos\phi \\ &a_{21} = \cos\omega\sin\kappa + \sin\omega\sin\varphi\cos\kappa, \quad a_{22} = \cos\omega\cos\kappa - \sin\omega\sin\varphi\sin\kappa, \quad a_{23} = -\sin\omega\cos\varphi \\ &a_{11} = \cos\varphi\cos\kappa, \quad a_{12} = -\cos\varphi\sin\kappa, \quad a_{13} = \sin\varphi \\ &\omega, \varphi, \kappa\text{: Tilt of Camera} \end{aligned}\right\} \tag{15}$$

[Formation of Model Image from Different Viewpoint]

A description is made of a calculation principle of rotating the model image performed by the coordinate transformation section 37. As described in relation to step S92 of FIG. 2, when the posture designating section 36 designates a posture of a model of the measuring object 1, the coordinate transformation section 37 performs coordinate transformation so that the model display section 35 displays an image of the measuring object 1 to which stereoscopic texture is applied in accordance with the designated posture. That is, an image of the measuring object 1 to which stereoscopic texture is applied as viewed from an arbitrary direction can be obtained. Thus, a principle of creating a model image as viewed from a different viewpoint is described. The principle is intended to allow the coordinate transformation section 37 to rotate the coordinate system in a direction designated through the posture designating section 36, to subsequently form a model image.

Figure 19:
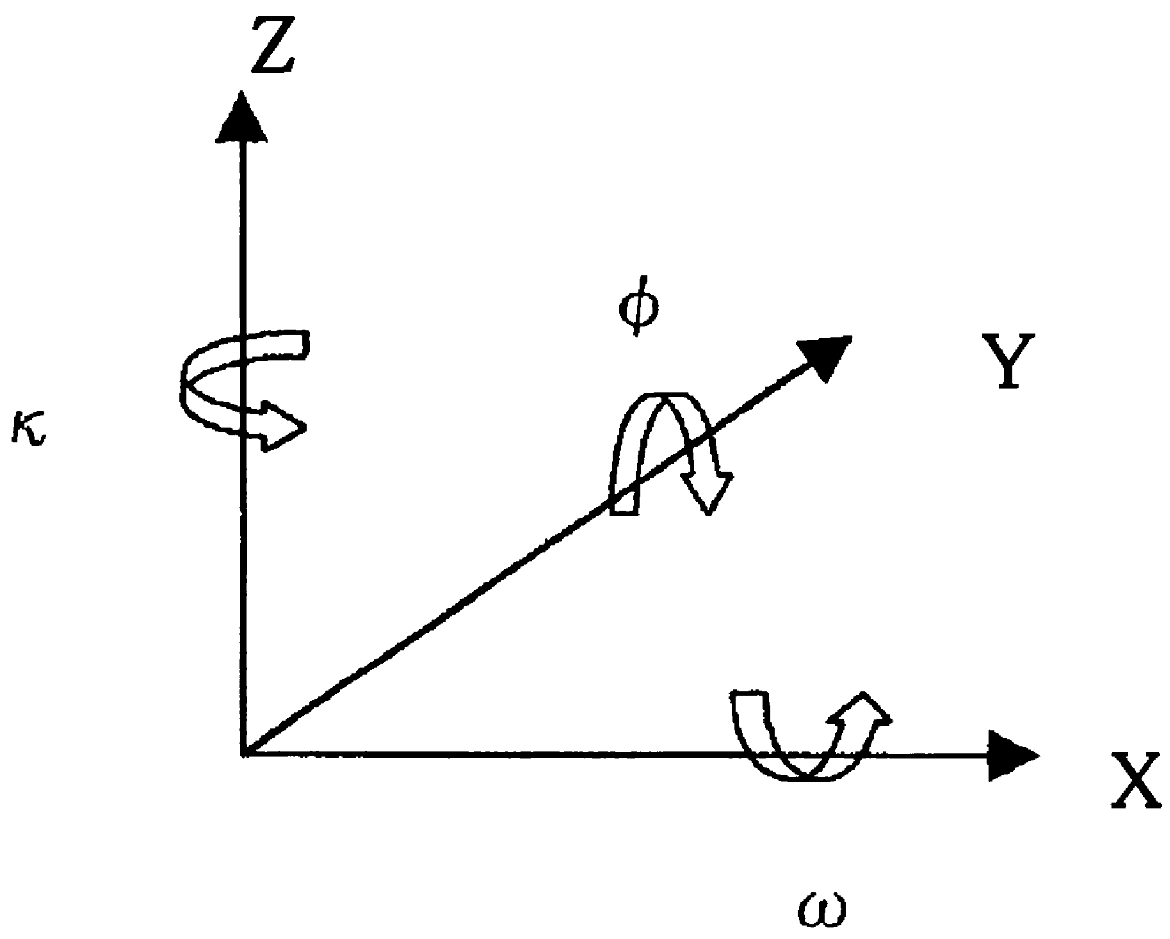
FIG. 19 is a diagram for explaining a principle of formation of a model image from a different viewpoint.

FIG. 19 is a diagram for explaining the principle of formation of a model image from a different viewpoint. As shown in FIG. 19, a ground coordinate system X, Y, Z is rotated by ω, ϕ, κ in respective axial directions, to obtain a ground coordinate system X', Y', Z' from different viewpoint. Then, an image is affixed in the ground coordinate system X', Y', Z' from different viewpoint, to create a model image.

A detailed description is made below. It is assumed, for example, that an object represented as P(X, Y, Z) in an untilted A model image from a different viewpoint can be obtained by performing a model image formation processing on the coordinates X', Y', Z' obtained as a result of the coordinate transformation.

In the three-dimensional image display apparatus according to the present invention, the image correlating section correlates a stereo image of a measuring object and a model formed by the model forming section, using relationship as to corresponding points found by the orientation section, and the model display section displays an image of the measuring object to which stereoscopic texture is applied, using the stereo image correlated with the model. With this configuration, 3D data measured in stereo and an image of the measuring object 1 can be easily recognized without viewing the 3D data using a stereoscopic system.

Also, as in the embodiment, 3D measurement data obtained from a stereo image can be integrated and visualized with an image of a measuring object to which stereoscopic texture is applied, in the presence of the three-dimensional image display apparatus implemented by a computer including an information processor such as a PC (personal computer), a display device such as an LCD (liquid crystal display) monitor, a software for the three-dimensional image display apparatus installed on the PC, and a calibrated photographing device for photographing a stereo image of the measuring object such as a digital camera. Therefore, it is possible to construct an inexpensive system using general-purpose low-priced computer and monitor device, without a need for an expensive and precise stereoscopic system conventionally required to deal with 3D data measured in stereo.

A second embodiment of the present invention is described below with reference to the figures. In the same manner as in the first embodiment, a three-dimensional image display apparatus of the present embodiment calculates a three-dimensional shape of a measuring object 1 based on plural, at least two, photographed images, with two, left and right, images constituting a stereo image as one unit. The apparatus also uses 3D data obtained externally or through 3D measurement of an entirety of the measuring object 1, to apply texture that produces a stereoscopic effect to a two-dimensional image of the measuring object 1.

Examples, principles, and the like of the orientation results and the stereo measurement described in relation to the first embodiment with reference to FIG. 3 to FIG. 19 are basically the same in the present embodiment. Thus, descriptions characteristic of the present embodiment are made with more emphasis below; redundant descriptions are not made as appropriate.

Figure 20:
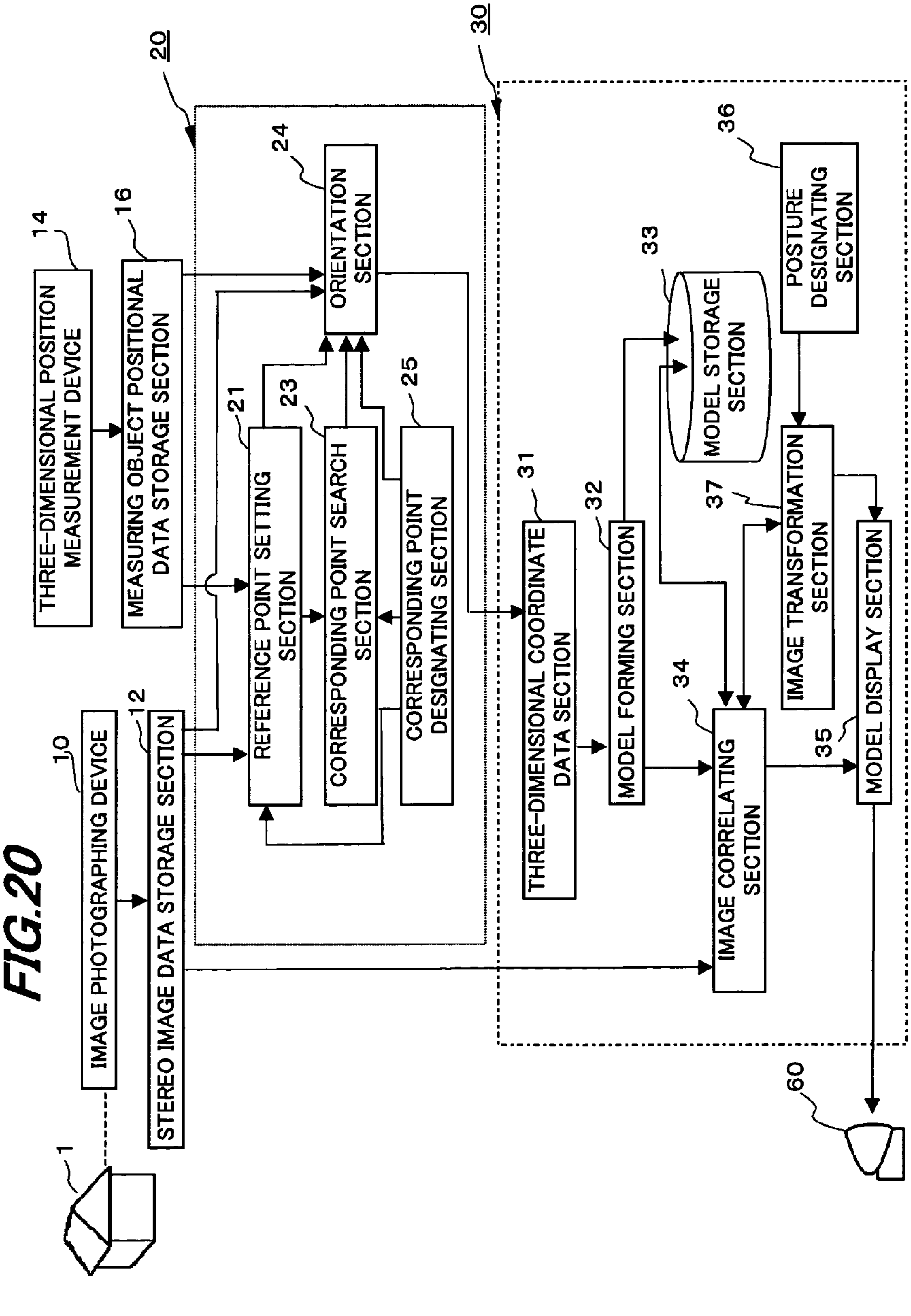
FIG. 20 is a general constitutional block diagram of a second embodiment of the present invention.

FIG. 20 is a general constitutional block diagram of the second embodiment of the present invention. The present invention includes a stereo image data storage section 12, a measuring object positional data storage section 16, a reference point setting section 21, a corresponding point search section 23, an orientation section 24, a corresponding point designating section 25, a display image forming section 30, and a display device 60, and may be implemented by, for example, a computer and a display device. Here, a reference point setting section 21, a corresponding point search section 23, an orientation section 24, and a corresponding point designating section 25 constitute an orientation processing section 20. The measuring object 1 is a tangible substance such as working object or manufacturing object. The measuring object 1 may be, for example, a workpiece of various kinds such as architecture, a person, or a landscape. An image photographing device 10 is intended to obtain a stereo image of the measuring object 1, and may be, for example, a stereo camera, or a combined device of a general-purpose digital camera and a device for compensating lens aberration between left and right images of the measuring object 1 photographed with the digital camera.

The three-dimensional position measurement device 14 may be a total station or a 3D scanner, which automatically measures positions of gauge marks as measuring objects using a laser or the like. A three-dimensional scanner is a device that irradiates a laser beam to the measuring object 1 and receives a reflected beam with a CCD camera within the device, to obtain distance data from the received beam with the aid of trigonometric distance measurement and to convert the distance data into three-dimensional data. Three-dimensional scanners are used in various applications such as industrial design, databasing of 3D images, three-dimensional CG in video production, and the like. One scanning with a laser beam running from top to bottom of the measuring object 1 can make an input of a distance image of 640×480 dots, for example, corresponding to an entire image irradiated.

The stereo image data storage section 12 and the measuring object positional data storage section 16 are the same as described with reference to FIG. 1.

The reference point setting section 21 searches for a point appropriate as a characteristic point in the vicinity of a designated point on one image (reference image) constituting a stereo image, and sets the point appropriate as the characteristic point as a reference point. The characteristic point may be, for example, a center position, a gravity center position, a corner position of the measuring object 1, and the like. The corresponding point search section 23 determines a reference point corresponding point that corresponds to the reference point set by the reference point setting section 21 on the other image (search image) constituting the stereo image. When an operator designates a point in the vicinity of a characteristic point, the characteristic point intended by the operator can be snapped at by means of the reference point setting section 21, without the operator exactly designating the characteristic point, and a reference point corresponding point in the search image can be determined by the corresponding point search section 23.

The orientation section 24 finds relationship as to corresponding points in the stereo image based on the position and the tilt at which the stereo image was photographed, using the reference point set by the reference point setting section 21 and the reference point corresponding point determined by the corresponding point search section 23.

The corresponding point designating section 25 determines a corresponding point on the search image in cases where the operator designates a point outside the vicinity of a characteristic point on the reference image. The operator can easily recognize the shape of the measuring object 1 by contrasting display positions on the display device 60 of the designated point on the reference image and the corresponding point on the search image determined by the corresponding point designating section 25. The orientation section 24 can easily perform relative orientation by using positional correspondence determined by the corresponding point designating section 25. The reference point setting section 21, the corresponding point search section 23, the orientation section 24, and the corresponding point designating section 25 will be detailed later.

The display image forming section 30, the three-dimensional coordinate data section 31, the model forming section 32, the model storage section 33, the image correlating section 34, the model display section 35, the posture designating section 36, the coordinate transformation section 37, and the display device 60 are the same as described with reference to FIG. 1.

Figure 21:
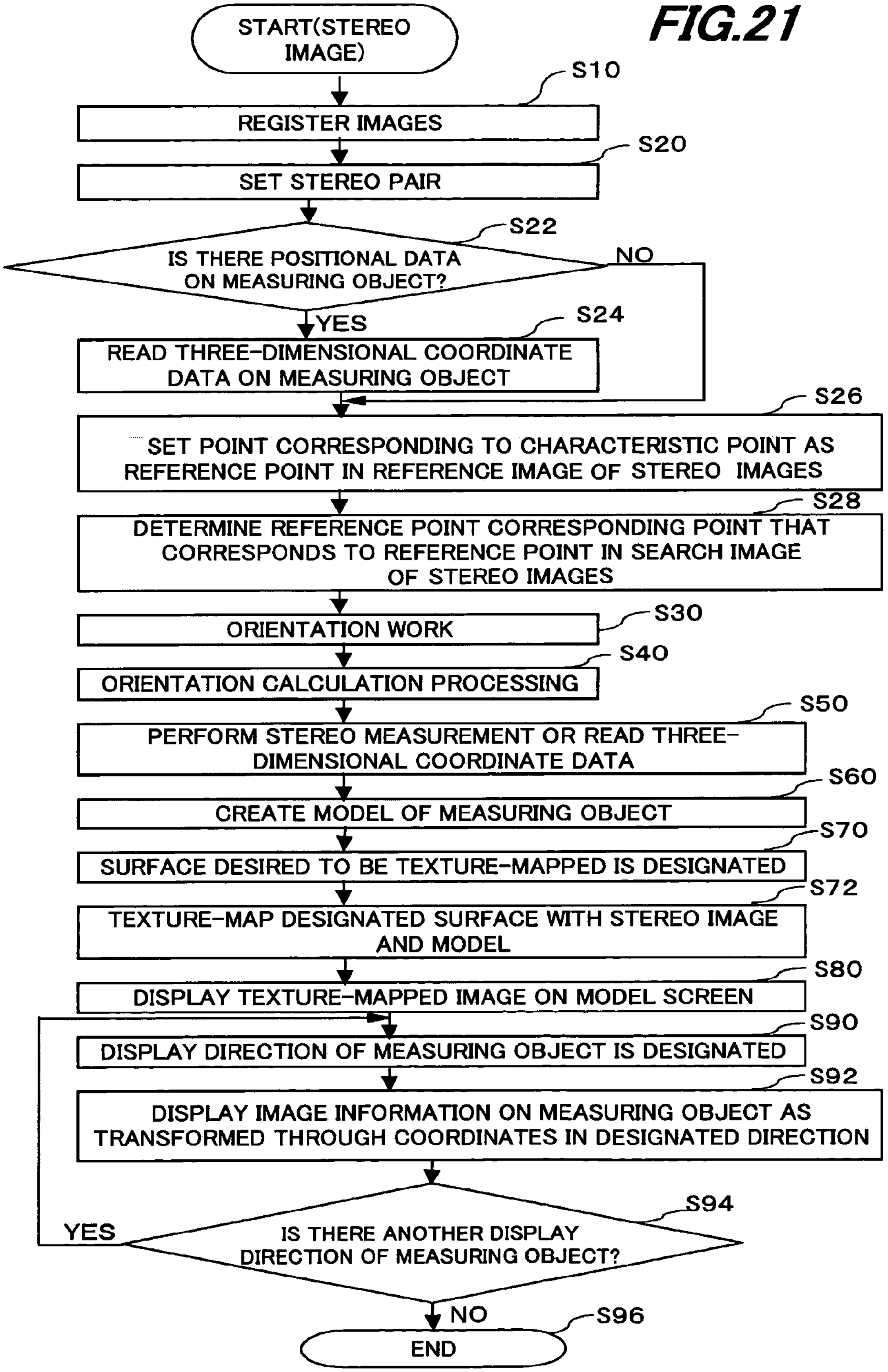
FIG. 21 is a flowchart for explaining operation of a three-dimensional image display apparatus shown in FIG. 20.

With reference to FIG. 21, a description is made of operation of the thus configured three-dimensional image display apparatus according to the present embodiment. FIG. 21 is a flowchart for explaining operation of the three-dimensional image display apparatus shown in FIG. 20. The process is the same as shown in FIG. 2, except that steps S26 and S28 are interposed between steps S24 and S30. Thus, steps S26 and S28, and connections leading or subsequent thereto are described; descriptions of the same steps as those in the first embodiment are not repeated as appropriate.

Subsequent to steps S10 and S20, it is determined whether or not there are three-dimensional coordinates of the measuring object 1 obtained using the three-dimensional position measurement device 14 (step S22). If YES in step S22, positional data represented by the three-dimensional coordinates of the measuring object 1 is read into the measuring object positional data storage section 16 (step S24). If NO in step S22, the processing can be performed with the relative coordinate system and thus step S24 can be skipped. The positional data represented by the three-dimensional coordinates of the measuring object 1 are not necessarily read after step S20. For example, the three-dimensional coordinates may be read after step S80, so that the processing can be performed with the relative coordinate system up to step S80 and with the absolute coordinate system thereafter. Calculation and measurement with the absolute coordinate system can be performed when at least three three-dimensional coordinates as the reference points exist over an entire image region desired to be measured or to which stereoscopic texture is desired to be applied.

Then, the reference point setting section 21 searches for a point appropriate as a characteristic point in the vicinity of a designated point on one image (reference image) constituting a stereo image, and sets the point appropriate as the characteristic point as a reference point (step S26). The corresponding point search section 23 determines a reference point corresponding point that corresponds to the reference point on the other image (search image) constituting the stereo image (step S28). Relation between steps S26 and S28 is described in relation to, for example, FIG. 4, FIG. 5, and FIG. 6.

Then, the orientation section 24 performs orientation work, i.e., determines relative orientation of the stereo image of the measuring object 1 stored in the stereo image data storage section 12, to find relationship as to corresponding points in the stereo image (step S30). There are three modes of performing the orientation work, namely manual, semi-automatic, and full-automatic modes, which will be detailed later. Here, the orientation work includes allowing the operator to designate points in a reference image of two or more images with a mouse cursor or the like, and allowing the reference point setting section 21 and the corresponding point search section 23 to read coordinates of a reference point appropriate as a characteristic point and those of a reference point corresponding point corresponding to the reference point with respect to the designated points, to obtain corresponding points (identical points) in the images. Six or more corresponding points are normally required for each image. In step S24, if the coordinates of the reference points are stored in the measuring object positional data storage section 16, the coordinates of the reference points and the images are correlated to perform absolute orientation.

Also in the present embodiment, the orientation section 24 performs orientation calculation processing in step S40, in the same manner as in the first embodiment. The orientation calculation processing allows calculation of the position and the tilt of the camera that photographed the images, positions of the corresponding points, and measurement accuracy. An example of the results is shown in FIG. 3.

Also in the present embodiment, examples of the stereo measurement performed on a stereo image are shown in FIG. 4 and FIG. 5.

FIG. 6 is an enlarged view of an image region 162L in the vicinity of the characteristic point and an image region 162R in the vicinity of the corresponding point, in the same manner as described in the first embodiment. When a corresponding point in a left image 160L (reference image) is designated by the operator with a mouse cursor or the like, a reference point appropriate as a characteristic point can be snapped at by means of the reference point setting section 21 and a reference point corresponding point that corresponds to the reference point in a right image 160R (search image) is determined by the corresponding point search section 23. It seems to the operator that the characteristic point in the vicinity of the designated position is pulled in, also in the right image 160R (search image), by means of the reference point setting section 21 and the corresponding point search section 23. Here, a corner position of the water bottle carriage relief is used as the characteristic point in the vicinity of the designated position.

Examples of models and images obtained through the steps of the present embodiment are the same as described in relation to FIG. 7, FIG. 8, and FIG. 9.

Relative orientation is also the same as described in the first embodiment.

Subsequent to steps S100 and S110 of FIG. 11, the operator selects the manual or semi-automatic orientation mode as a setting for the orientation (step S120). In this case, the manual mode may be selected as a default for the orientation work through the orientation section 24. The semi-automatic orientation mode includes two modes, namely a gravity center detection mode and a corner detection mode, which will be detailed later. Then, the operator designates points to be used for orientation of the image, as shown for example in FIG. 5 and FIG. 6 (step S130). In this case, corresponding points on the left and right images of the measuring object 1 are designated through the reference point setting section 21 and the corresponding point search section 23. In the manual mode, corresponding points on the left and right images of the measuring object 1 are designated on the screen of the display device 60. In the semi-automatic measurement mode, a vicinity of corresponding points is designated so that the reference point setting section 21 and the corresponding point search section 23 identify the corresponding points (gravity center or corner). Then, it is determined whether or not designation of corresponding points on the left and right images of the measuring object 1 is terminated (step S140). If NO, the process returns to step S130 to continue designation of corresponding points, and if YES, the process is returned (step S150).

FIG. 13 is a flowchart for explaining an algorithm for gravity center detection in the semi-automatic orientation mode. First of all, a retro target 200 described with reference to FIG. 12 is affixed to a characteristic point of the measuring object 1 in advance. Alternatively, instead of using the retro target 200, a characteristic point with high brightness on the measuring object 1 may be designated through the reference point setting section 21 and the corresponding point search section 23. The operator designates a vicinity of a corresponding point with a mouse cursor on an image (reference image) of the measuring object 1 displayed on the screen of the display device 60 (step S200). Then, the reference point setting section 21 and the corresponding point search section 23 decide an area where the target lies in the vicinity of the corresponding point in the search image (step S210).

Then, the orientation section 24 calculates a gravity center position with, for example, the moment method (step S220). For example, the retro target 200 shown in FIG. 14 (A1) is assumed to be represented by plane coordinates (x, y). Then, calculations are performed for points in x and y directions at which brightness of the retro target 200 is at the threshold T or more, using the foregoing equations (6) and (7).

Then, the orientation section 24 displays the corresponding point position calculated in step S220 on the screen (step S230). If the corresponding point position displayed in step S230 matches a determination standard set by the operator or predetermined, the orientation work terminates and the process is returned (step S240). On the other hand, if the corresponding point position displayed in step S230 does not match the determination standard set by the operator or predetermined, or if gravity center position cannot be detected and an error indication is displayed, the process jumps to step S250 described above.

In a flowchart of FIG. 15, the operator designates a vicinity of a corresponding point with a mouse cursor on an image (reference image) of the measuring object 1 displayed on the screen of the display device 60 (step S300). Then, the reference point setting section 21 and the corresponding point search section 23 automatically set a search region in the vicinity of the designated point in the reference image and the corresponding point in the search image (step S310). In this case, characteristic point detection is designated as corner detection, and thus the search region is preset to a constant as its default, depending on the image reduction scale of the measuring object 1. Then, the reference point setting section 21 and the corresponding point search section 23 perform edge detection in the search region (step S320). In edge detection, an edge detection filter or a LOG filter (described below), for example, may be used. In short, any detection scheme used in image processing to detect of an edge in an image will do. Edge detection is the same as described in the first embodiment with an example.

Subsequently, the reference point setting section 21 and the corresponding point search section 23 perform straight line detection for the detected edges (step S330). The reference point setting section 21 and the corresponding point search section 23, or the operator, examines continuity of the edges, and fits a straight line to two edges with the highest degree of continuity. The straight line detection method is not limited thereto; any other method may be used. Then, the reference point setting section 21 and the corresponding point search section 23 find an intersection point of the two detected straight lines (step S340). The reference point setting section 21 and the corresponding point search section 23 display the results on the screen of the display device 60 (step S350). The subsequent steps S360 through S390 are the same as those in the first embodiment.

With reference to FIG. 16, which is a flowchart for explaining an algorithm for the automatic orientation mode, a description is made of the automatic measurement. In the automatic orientation mode, a retro target 200 (see FIG. 12) is affixed to a characteristic point of the measuring object 1 in advance. The operator selects the automatic orientation mode through the orientation section 24 (step S400). Then, an image of the measuring object is displayed on the screen of the display device 60 (step S410). The reference point setting section 21 and the corresponding point search section 23 register one corresponding point image as a template (step S420). Subsequently, the reference point setting section 21 and the corresponding point search section 23 search for a retro target image that is the same as the registered template image on the measuring object image (step S430). In this case, image searching is performed by template matching described earlier.

An inputted image and a template image in the sequential similarity detection algorithm in the present embodiment are as shown in FIG. 17. The reference point setting section 21 and the corresponding point search section 23, provided with a function of running a sequential similarity detection algorithm, move the template image of $N1 \times N1$ pixels on a searching area $(M1-N1+1)^2$ in the inputted image of $M1 \times M1$ pixels, which is larger than the template image. A position of the template image is represented by, for example, coordinates (a, b) of a representative point, which is provided at its upper left corner, in the inputted image. Then, the reference point setting section 21 and the corresponding point search section 23 calculate a residual R(a, b) represented by the equation (9) (described earlier), with the template image at respective movement positions, to find a movement position where the residual is smallest. The movement position where the residual R(a,b) is smallest is the image position to be found by template matching.

Returning to FIG. 16, for all the targets found in step S430, gravity center position detection is performed more exactly (step S440). For the gravity center detection, the above-described moment method, for example, may be advantageously used. The reference point setting section 21 and the corresponding point search section 23 display target positions calculated in step S440 on the screen (step S450). If the corresponding point positions displayed in step S450 match a determination standard set by the operator or predetermined, the orientation work terminates and the process returns (step S460). On the other hand, if the target positions displayed in step S450 do not match the determination standard set by the operator or predetermined, or if the gravity center position detection cannot be performed and an error indication is displayed, the semi-automatic orientation mode or the manual mode is selected and unmatching target positions are corrected (step S470).

Creation of a model image is the same as already described with reference to FIG. 18.

The principle of formation of a model image from a different viewpoint is the same as described with reference to FIG. 19.

In the three-dimensional image display apparatus according to the present embodiment, the orientation section determines relative orientation of a stereo image of a measuring object, using a reference point set by the reference point setting section and a reference point corresponding point determined by the corresponding point search section, to find relationship as to corresponding points in the stereo image. With this configuration, positional correspondence in the stereo image can be easily determined. Also, the image correlating section correlates the stereo image of the measuring object and a model formed by the model forming section, using the relationship as to the corresponding points found by the orientation section, and the model display section displays an image of the measuring object to which stereoscopic texture is applied, using the stereo image correlated with the model. With this configuration, 3D data measured in stereo and image of the measuring object 1 can be easily recognized without viewing the 3D data using a stereoscopic system.

The present embodiment is similar to the three-dimensional image display apparatus of the first embodiment in that 3D measurement data obtained from a stereo image can be integrated and visualized with an image of a measuring object to which stereoscopic texture is applied, in the presence of a PC (personal computer), a display device such as an LCD (liquid crystal display) monitor, a software for the three-dimensional image display apparatus installed on the PC, and a calibrated photographing device such as a digital camera.

A third embodiment of the present invention is described below with reference to the figures. A three-dimensional image display apparatus of the present embodiment calculates a three-dimensional shape of a measuring object 1 using an image (single photographic image or stereo image) of the measuring object 1 and 3D data obtained externally or through 3D measurement of an entirety of the measuring object 1, to apply texture that produces a stereoscopic effect to a two-dimensional image of the measuring object 1. Here, texture is a term used in the graphics field and so on, representing what is drawn on a surface of a figure to illustrate a pattern and a feel. Photographing the measuring object 1 such that each resulting two-dimensional image includes 3D data (three-dimensional positional data) at six or more points allows orientation of the two-dimensional image by correlating the three-dimensional positional data and the two-dimensional image of the measuring object 1.

Examples, principles, and the like of the orientation results and the stereo measurement described in relation to the first embodiment with reference to FIG. 3 to FIG. 19 are basically the same in the present embodiment. Thus, descriptions characteristic of the present embodiment are made with more emphasis below; redundant descriptions are not made as appropriate.

Figure 22:
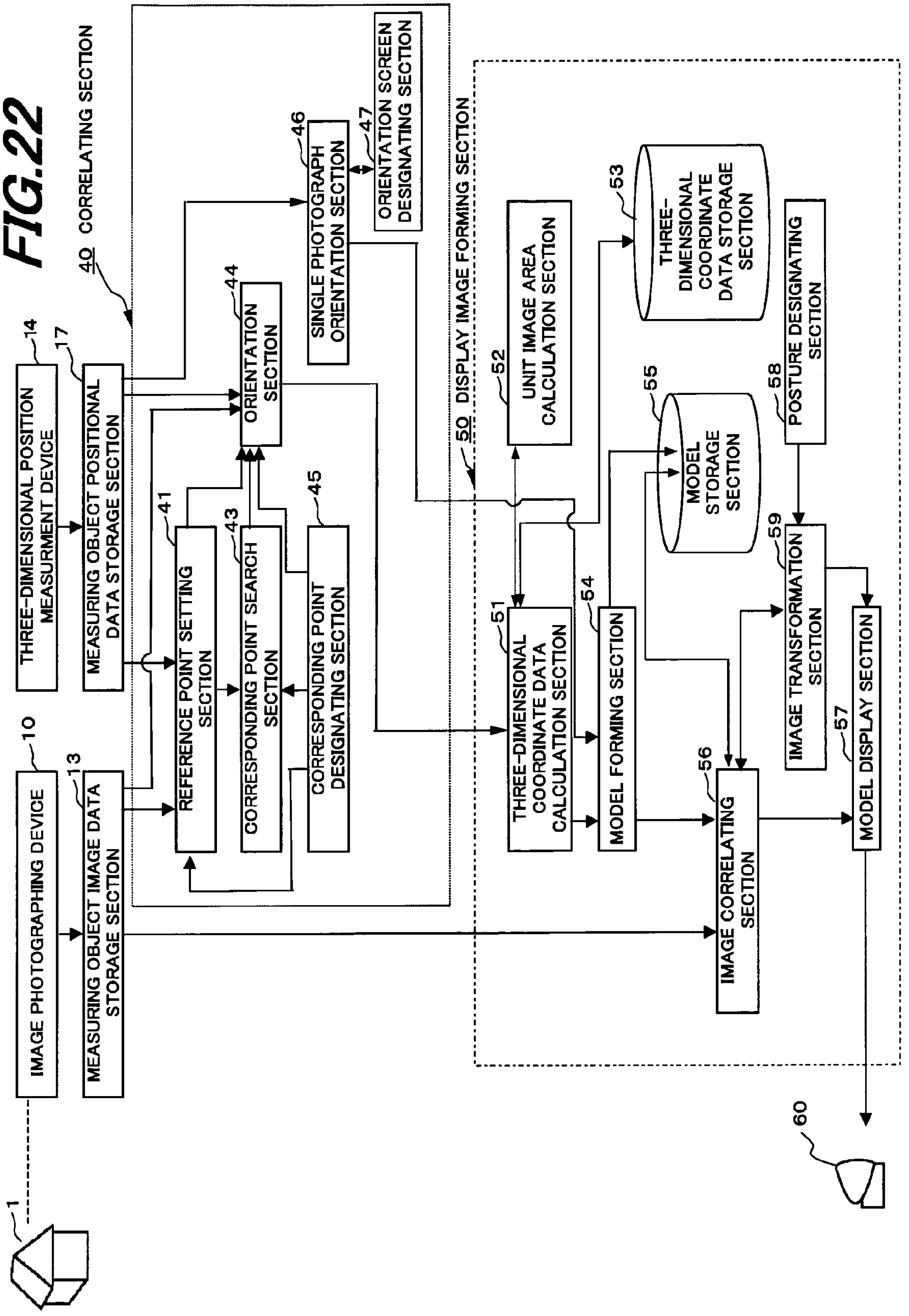
FIG. 22 is a general constitutional block diagram of a third embodiment of the present invention.

FIG. 22 is a general constitutional block diagram of the third embodiment of the present invention. The present embodiment includes a measuring object image data storage section 13, a measuring object positional data storage section 17, a correlating section 40, a display image forming section 50, and a display device 60, and may be implemented by, for example, a computer and a display device. The measuring object 1 is a tangible substance such as working object or manufacturing object. The measuring object 1 may be, for example, a workpiece of various kinds such as architecture, a person, or a landscape. An image photographing device 10 is intended to obtain an image (single photographic image or stereo image) of the measuring object 1, and may be, for example, a combined device of a general-purpose digital camera and a device for compensating lens aberration in images of the measuring object 1 photographed with the digital camera.

The three-dimensional position measurement device 14 may be a total station or a 3D scanner, which automatically measures positions of gauge marks as measuring objects using a laser or the like. A three-dimensional scanner is a device that irradiates a laser beam to the measuring object 1 and receives a reflected beam with a CCD camera within the device, to obtain distance data from the received beam with the aid of trigonometric distance measurement and to convert the distance data into three-dimensional data. Three-dimensional scanners are used in various applications such as industrial design, databasing of 3D images, three-dimensional CG in video production, and the like. One scanning with a laser beam running from top to bottom of the measuring object 1 can make an input of a distance image of 640×480 dots, for example, corresponding to an entire image irradiated.

The measuring object image data storage section 13 stores an image (single photographic image or stereo image) of the measuring object 1. It stores, for example, single photographic images and left and right images of the measuring object 1 photographed by the image photographing device 10. The measuring object positional data storage section 17 stores three-dimensional positional data on the measuring object 1 at six or more reference points, which is required for absolute orientation, for each image of the measuring object 1. It stores, for example, positional data on the reference points measured by the three-dimensional position measurement device 14.

The correlating section 40 correlates three-dimensional positional data and a two-dimensional image of the measuring object 1, and includes: a reference point setting section 41, a corresponding point search section 43, an orientation section 44, a corresponding point designating section 45, dealing with stereo images of the measuring object 1; and a single photograph orientation section 46 and an orientation screen designating section 47, dealing with single photographic images of the measuring object 1.

The reference point setting section 41 searches for a point appropriate as a characteristic point in the vicinity of a designated point on one image (reference image) constituting a stereo image, and sets the point appropriate as the characteristic point as a reference point. The characteristic point may be, for example, a center position, a gravity center position, a corner position of the measuring object 1, and the like. The corresponding point search section 43 determines a reference point corresponding point that corresponds to the reference point set by the reference point setting section 41 on the other image (search image) constituting the stereo image. When an operator designates a point in the vicinity of a characteristic point, the characteristic point intended by the operator can be snapped at by means of the reference point setting section 41, without the operator exactly designating the characteristic point, and a reference point corresponding point in the search image can be determined by the corresponding point search section 43.

The orientation section 44 finds relationship as to corresponding points in the stereo image based on the position and the tilt at which the stereo image was photographed, using the reference point set by the reference point setting section 41 and the reference point corresponding point determined by the corresponding point search section 43. The corresponding point designating section 45 determines a corresponding point on the search image in cases where the operator designates a point outside the vicinity of a characteristic point on the reference image. The operator can easily recognize the shape of the measuring object 1 by contrasting display positions on the display device 60 of the designated point on the reference image and the corresponding point on the search image determined by the corresponding point designating section 45. The orientation section 44 can easily perform relative orientation by using positional correspondence determined by the corresponding point designating section 45.

The single photograph orientation section 46 performs single photograph orientation in cases of a single photographic image of the measuring object 1. The single photograph orientation includes calculating the position and the tilt of the camera that photographs the single image using a collinearity condition that holds true for three or more reference points included in the image, to establish relationship between a photograph coordinate system and a ground coordinate system. Parameters obtained coincide with so-called exterior orientation elements. The interior orientation includes converting from a machine coordinate system to a photograph coordinate system, and parameters obtained are called interior orientation elements (interior localization). For digital cameras, the interior orientation elements include distortion, principal point position, and the like inside the camera. A DLT (Direct Linear Transformation) method, for example, may be used for the single photograph orientation. The orientation screen designating section 47 correlates the six or more reference points on the single photographic image of the measuring object 1 and the three-dimensional positional data on the measuring object 1 stored in the measuring object positional data storage section 17 as reference points.

The display image forming section 50 generates a two-dimensional image of the measuring object 1 from plural directions based on the three-dimensional positional data on the measuring object 1 and the image (single photographic image or stereo image) of the measuring object 1, and includes a three-dimensional coordinate data calculation section 51, a unit image area calculation section 52, a three-dimensional coordinate data storage section 53, a model forming section 54, a model storage section 55, an image correlating section 56, a model display section 57, a posture designating section 58, and a coordinate transformation section 59.

In cases of a stereo image of the measuring object 1, the three-dimensional coordinate data calculation section 51 obtains three-dimensional coordinate data on the corresponding points of the measuring object 1 based on the relationship as to the corresponding points found by the orientation section 44. The unit image area calculation section 52 uses unit image areas formed with a plurality of the corresponding points to correlate a model and the stereo image. The unit image areas may be, for example, triangular areas using three adjacent corresponding points or rectangular areas using four adjacent corresponding points. Here, the corresponding points in a stereo image refer to dots (pixels), on left and right images constituting the stereo image, between which corresponding relationship is established and of which three-dimensional coordinate data can be obtained by the three-dimensional data calculation section 51. Meanwhile, in cases of a single photographic image, three-dimensional coordinate data read from the three-dimensional coordinate data storage section 53 is used. The corresponding points in a single photographic image refer to dots (pixels), included in the single photographic image, of which three-dimensional positional data is known, and include reference points. The corresponding points in a single photographic image are typically a group of numerous dots (see FIG. 25) measured by the three-dimensional position measurement device 14, and are to be stored in the measuring object positional data storage section 17.

The three-dimensional coordinate data storage section 53 stores three-dimensional coordinate data on the corresponding points of the measuring object 1 calculated by the three-dimensional coordinate data calculation section 51.

The model forming section 54 forms a model of the measuring object 1 based on the three-dimensional coordinate data on the corresponding points. Here, the model is a representation of a shape of the measuring object 1 by means of three-dimensional coordinates, and is information required to, for example, make a wireframe display as shown in FIG. 8 or perform texture-mapping as shown in FIG. 9. The model storage section 55 stores the model of the measuring object 1 formed by the model forming section 54. The image correlating section 56 correlates the measuring object image (single photographic image or stereo image) stored in the measuring object image data storage section 13 and the model formed by the model forming section 54, using the relationship as to the corresponding points found by the orientation section 44. The model display section 57 displays a stereoscopic two-dimensional image of the measuring object 1 on the display device 60, using the stereo image correlated with the model by the image correlating section 56 and using an image to which stereoscopic texture such as bird's-eye view image is applied.

The posture designating section 58 designates a posture of the model of the measuring object 1. For example, the operator operates a cursor input device such as a mouse to designate the posture of the measuring object 1 displayed on the display device 60. The coordinate transformation section 59 transforms coordinates of the corresponding points depending on the posture designated to the model. The model display section 57 displays an image of the measuring object 1 to which stereoscopic texture is applied in accordance with the posture designated by the posture designating section 58. The display device 60 may be an image display device such as a liquid crystal display, a CRT, or the like.

Figure 23:
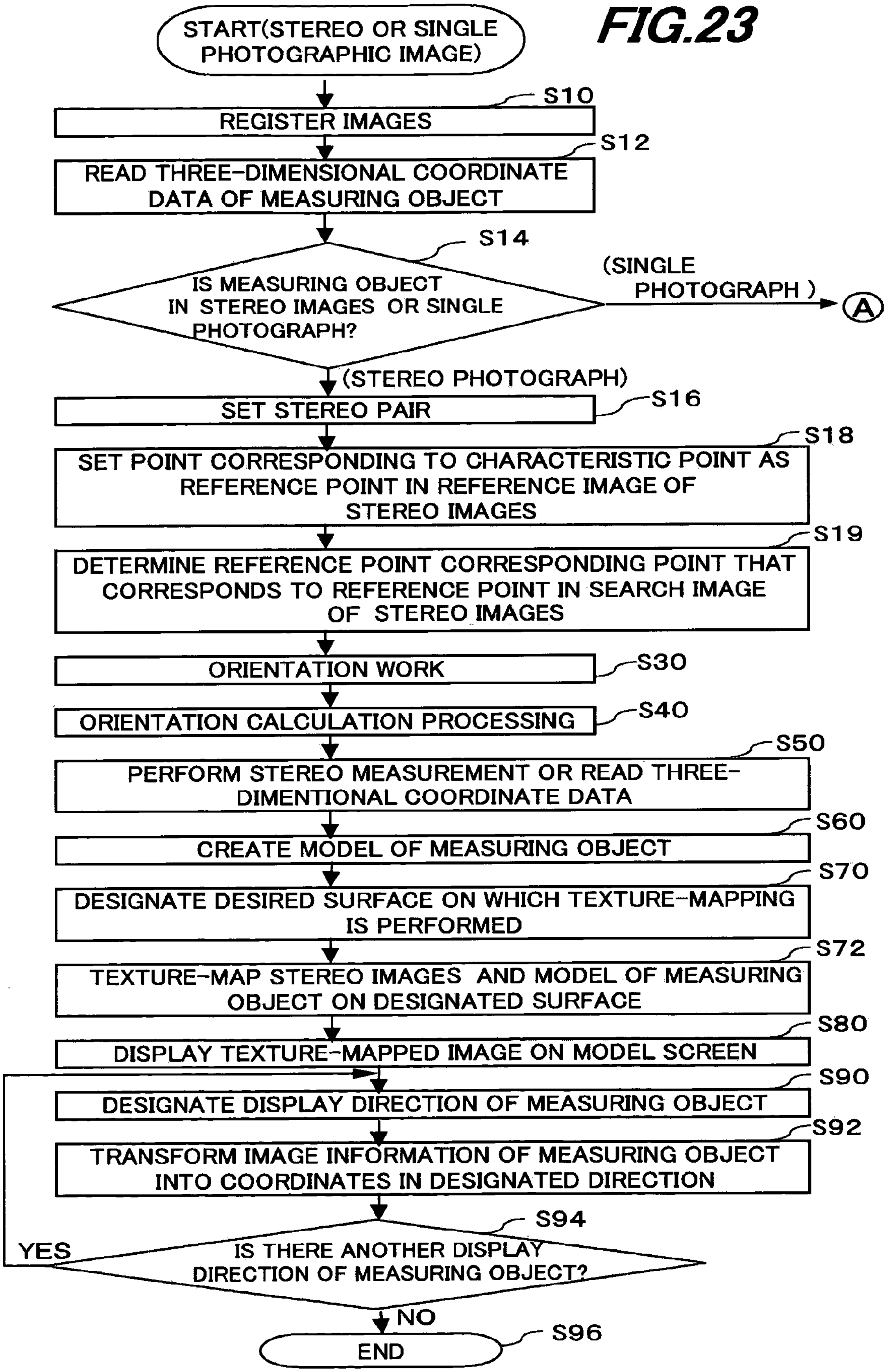
FIG. 23 is a flowchart for explaining operation of a three-dimensional image display apparatus shown in FIG. 22.

A description is made of operation of the thus configured three-dimensional image display apparatus according to the present embodiment of the invention. FIG. 23 is a flowchart for explaining operation of the three-dimensional image display apparatus shown in FIG. 22, mainly showing a case of a stereo image of the measuring object. First, an image (single photographic image or stereo image) of the measuring object 1 photographed using the image photographing device 10 such as a digital camera is registered in the measuring object image data storage section 13 (step S10). Then, positional data represented by the three-dimensional coordinates of the measuring object 1 and obtained using the three-dimensional position measurement device 14 is read into the measuring object positional data storage section 17 (step S12). The number of points included in the positional data represented by the three-dimensional coordinates of the measuring object 1 and stored in the measuring object positional data storage section 17 may preferably be decided such that each two-dimensional image includes pixel dots having three-dimensional positional data at six or more points. When a 3D scanner is used, for example, the number may reach several tens of thousands. Subsequently, it is determined whether the image of the measuring object 1 registered in the measuring object image data storage section 13 is a stereo image or a single photographic image (step S14). If the image is a single photographic image, the process jumps to step S600 shown in FIG. 24. If the image is a stereo image, the process jumps to step S16.

[Stereo Image]

In cases of a stereo image in step S14, of the images registered in the measuring object image data storage section 13, a pair of left and right images is set as a stereo pair (step S16). In step 16, all the images registered in the measuring object image data storage section 13 may not necessarily be set as a stereo pair. That is, the images may be set as a stereo pair forming a stereo image, in order from a stereo image most desired to be measured or a stereo image to which stereoscopic texture is most desired to be applied. Then, the reference point setting section 41 searches for a point appropriate as a characteristic point in the vicinity of a designated point on one image (reference image) constituting a stereo image, and sets the point appropriate as the characteristic point as a reference point (step 18). The corresponding point search section 43 determines a reference point corresponding point corresponding to the reference point on the other image (search image) constituting the stereo image (step S19). Relation between steps S18 and S19 is described in relation to, for example, FIG. 4, FIG. 5, and FIG. 6.

Then, the orientation section 44 performs orientation work, i.e., determines relative orientation of the stereo image of the measuring object 1 stored in the measuring object image data storage section 13, to find relationship as to corresponding points in the stereo image (step S30). There are three modes of performing the orientation work, namely manual, semi-automatic, and full-automatic modes, which will be detailed later. Here, the orientation work includes allowing the operator to designate points in a reference image of two or more images with a mouse cursor or the like, and allowing the reference point setting section 41 and the corresponding point search section 43 to read coordinates of a reference point appropriate as a characteristic point and those of a reference point corresponding point corresponding to the reference point with respect to the designated points, to obtain corresponding points (identical points) in the images. Six or more corresponding points are normally required for each image. If the coordinates are stored, the reference point coordinates and the images are correlated to perform absolute orientation.

Using the coordinates of the corresponding points obtained as a result of the orientation work, the orientation section 44 performs orientation calculation processing (step S40). The orientation calculation processing allows calculation of the position and the tilt of the camera that photographed the images, positions of the corresponding points, and measurement accuracy (see FIG. 3). In the orientation calculation processing, relative orientation is performed to correlate a stereo model, while bundle adjustment is performed to determine orientation between entire images. Relative orientation will be detailed later.

An example of orientation results is the same as described in relation to FIG. 3 in the first embodiment.

Returning to FIG. 23, stereo measurement is performed in the three-dimensional coordinate data calculation section 51, to obtain three-dimensional coordinates of the measuring object 1 (step S50). In cases where the stereo measurement is not performed, if three-dimensional coordinates of the corresponding points in the stereo image are read into the measuring object positional data storage section 17 in advance, the three-dimensional coordinate data calculation section 51 reads the three-dimensional coordinates of the corresponding points from the measuring object positional data storage section 17. As described earlier in the first embodiment, there are various modes of stereo measurement, namely manual, semi-automatic, and automatic measurement modes, as disclosed in JP-A-2003-284098 by the present inventors, for example. In the stereo measurement, stereo (left and right) images that can be viewed stereoscopically are created and displayed according to the orientation calculation processing results in step S40, and three-dimensional coordinates of the corresponding points are obtained utilizing the above modes. In the automatic measurement mode, a measuring region is designated before automatic measurement is performed. In the manual and semi-automatic measurement modes, measurement is performed while determining corresponding points on the left and right images, semi-automatically or manually with a mouse, and observing left and right stereo screens.

An example of the stereo measurement performed on a stereo image is the same as described earlier with reference to FIG. 4. Here, ruins of a temple are taken as the measuring object 1 as an exemplary stereo image 150, for which a left image 150L and a right image 150R are used as a stereo pair. The left image 150L is treated as a reference image, and coordinates of a characteristic point in the left image 150L are represented as (X1, Y1). In contrast, the three-dimensional coordinate data calculation section 51 treats the right image 150R as a search image, and coordinates of a point in the right image 150R corresponding to the characteristic point in the left image 150L are represented as (X2, Y2).

FIG. 5 is a view for explaining another example of the stereo measurement performed on a stereo image. The description is the same as in the first embodiment. The three-dimensional coordinate data calculation section 51 treats the left image 160L as a reference image, and the right image 160R as a search image. An image region 162L in the vicinity of a characteristic point in the left image 160L and an image region 162R in the vicinity of a corresponding point in the right image 160R are extracted, and displayed as enlarged in FIG. 6.

As described with reference to FIG. 6, which is an enlarged view of the image region 162L in the vicinity of the characteristic point and the image region 162R in the vicinity of the corresponding point, when a corresponding point in the left image 160L (reference image) is designated by the operator with a mouse cursor or the like, a reference point appropriate as a characteristic point can be snapped by means of the reference point setting section 41 and a reference point corresponding point corresponding to the reference point in the right image 160R (search image) is determined by the corresponding point search section 43. It seems to the operator that the characteristic point in the vicinity of the designated position is snapped at, also in the right image 150R (search image), by means of the reference point setting section 41 and the corresponding point search section 43. Here, a corner position of the water bottle carriage relief is used as the characteristic point in the vicinity of the designated position.

Returning to FIG. 23, the model forming section 54 creates a model of the measuring object 1 based on the three-dimensional coordinates, obtained by the three-dimensional coordinate data calculation section 51 or read from the three-dimensional coordinate date storage section 53 (step S60). As described in the first embodiment, FIG. 7 is a view of an example of a model of the measuring object 1, showing its wireframe surfaces. Here, a relief of water bottle carriage formed on a wall surface in ruins of a temple is taken as the measuring object 1 as a stereo image 170. A left image 170L and a right image 170R of the water bottle carriage relief are used as a stereo pair. Respective wireframe surfaces 174L and 174R are formed inside left and right region designating framelines 172L and 172R. Unit image areas constituting the wireframe surfaces 174L and 174R may selectably be, for example, triangular areas using three adjacent corresponding points or rectangular areas using four adjacent corresponding points. At this time, the posture of the model of the measuring object 1 is set to an orientation of the surface first created as its default.

Returning to FIG. 23, a surface desired to be texture-mapped is designated through the image corresponding section 56 (step S70). Texture-mapping refers to applying texture that produces a stereoscopic effect to a two-dimensional image of the measuring object 1. In cases of automatic stereo measurement, the processing in step S70 may be performed as designation of a measuring region performed in step S50. Then, the image correlating section 56 texture-maps the stereo image of the measuring object 1 and the model formed by the model forming section 54, using the relationship as to the corresponding points found by the orientation section 44 (step S72). Texture-mapping will be detailed later.

Then, the texture-mapped image is displayed on a model screen through the model display section 57 (step S80). The model screen is a two-dimensional image of the measuring object 1 as viewed perspectively, such as an image to which stereoscopic texture is applied or an image from which texture is removed, formed based on the stereo image. In step S80, a wireframe image, a group of three-dimensional dots (a dotted image obtained with a 3D scanner, for example), the photographing position of the camera and/or the position of the reference point may also be displayed, along with the texture-mapped image. Objects to be displayed on the model screen may be displayed concurrently or switched on and off, facilitating recognition of the stereo image calculation results and the photographed image of the measuring object 1.

As described in the first embodiment, FIG. 8 is a view representing texture that produces a stereoscopic effect with wireframes. Also in the present embodiment, a wireframe 184 is applied to the two-dimensional image of the measuring object 1 as viewed perspectively.

As described in the first embodiment, FIG. 9 shows a texture-mapped display example, in which the measuring object 1 is displayed as an image to which stereoscopic texture is applied. A texture-mapping screen 190 displays, for example, a region designating frameline 192 of the measuring object 1, and a bird's-eye view image 194 of the measuring object 1 to which stereoscopic texture is mapped, through the model display section 57. The bird's-eye view image 194 of the measuring object 1 is displayed as a two-dimensional image of the measuring object 1 as viewed perspectively.

Returning to FIG. 23, the operator uses a mouse, a keyboard, and/or the like, to designate an orientation in which the measuring object 1 is to be displayed on the wireframe screen 180 and/or the texture-mapping screen 190 through the posture designating section 58 (step S90). Then, the coordinate transformation section 59 transforms the orientation in which the measuring object 1 is displayed on the display device 60 to that designated through the posture designating section 58, and displays the measuring object 1 on the wireframe screen 180 and/or the texture-mapping screen 190 (step S92). The operator determines whether or not there is another orientation in which the measuring object 1 is to be displayed (step S94). If YES, the process returns to step S90, and if NO, the process terminates (step S96). The function of arbitrarily designating orientation in which the measuring object 1 is to be displayed, as performed in steps S90 and S92, allows the measurement results and/or the measuring object 1 to be displayed on the display device 60 as viewed from any angle or viewpoint. It is therefore possible for the operator to visually recognize the measuring object 1.

The relative orientation performed with the orientation section 44 is the same as described in the first embodiment with reference to FIG. 10.

In the same manner as in the first embodiment, there are three modes of orientation work performed by the orientation section 44, namely manual, semi-automatic, and automatic orientation modes, selectable as appropriate depending on the distribution condition of corresponding points in the orientation image. FIG. 11 is a flowchart of orientation work in the manual and semi-automatic orientation modes. First, the orientation section 44 enters an orientation mode (step S100). By this time, the operator has designated an image desired to be oriented. There is no special limitation on the number of images to be designated. Then, a measuring object image designated through the orientation section 44 is displayed on the screen of the display device 60 (step S110).

In the same manner as in the first embodiment, the operator selects the manual or semi-automatic orientation mode as a setting for the orientation (step S120). In this case, the manual mode may be selected as a default for the orientation work through the orientation section 44. The semi-automatic orientation mode includes two modes, namely a gravity center detection mode and a corner detection mode, which will be detailed later. Then, the operator designates points to be used for orientation of the image, as shown for example in FIG. 5 and FIG. 6 (step S130). In this case, corresponding points on the left and right images of the measuring object 1 are designated through the reference point setting section 41 and the corresponding point search section 43. In the manual mode, corresponding points on the left and right images of the measuring object 1 are designated on the screen of the display device 60. In the semi-automatic measurement mode, a vicinity of corresponding points is designated so that the reference point setting section 41 and the corresponding point search section 43 identify the corresponding points (gravity center or corner). Then, it is determined whether or not designation of corresponding points on the left and right images of the measuring object 1 is terminated (step S140). If NO, the process returns to step S130 to continue designation of corresponding points, and if YES, the process is returned (step S150).

As described in the first embodiment, FIG. 13 is a flowchart for explaining an algorithm for gravity center detection in the semi-automatic orientation mode. A retro target 200 as described in relation to FIG. 12 is affixed to a characteristic point of the measuring object 1 in advance. Alternatively, instead of using the retro target 200, a characteristic point with high brightness on the measuring object 1 may be designated through the reference point setting section 41 and the corresponding point search section 43. The operator designates a vicinity of a corresponding point with a mouse cursor on an image (reference image) of the measuring object 1 displayed on the screen of the display device 60 (step S200). Then, the reference point setting section 41 and the corresponding point search section 43 decide an area where the target lies in the vicinity of the corresponding point in the search image (step S210).

On the other hand, when the area where the target lies is decided in step S210, the orientation section 44 calculates a position of the center of gravity with, for example, the moment method described earlier (step S220).

Then, the orientation section 44 displays the corresponding point position calculated in step S220 on the screen (step S230). If the corresponding point position displayed in step S230 matches a determination standard set by the operator or predetermined, the orientation work terminates and the process is returned (step S240). On the other hand, if the corresponding point position displayed in step S230 does not match the determination standard set by the operator or predetermined, or if gravity center position cannot be detected and an error indication is displayed, the process jumps to step S250 described above.

An algorithm for corner detection in the semi-automatic orientation mode is the same as described in relation to FIG. 15.

The operator designates a vicinity of a corresponding point with a mouse cursor on an image (reference image) of the measuring object 1 displayed on the screen of the display device 60 (step S300). Then, the reference point setting section 41 and the corresponding point search section 43 automatically set a search region in the vicinity of the designated point in the reference image and the corresponding point in the search image (step S310). In this case, characteristic point detection is designated as corner detection, and thus the search region is preset to a constant as its default, depending on the image reduction scale of the measuring object 1. Then, the reference point setting section 41 and the corresponding point search section 43 perform edge detection in the search region (step S320). In edge detection, an edge detection filter or a LOG filter (described below), for example, may be used. In short, any detection scheme used in image processing to detect of an edge in an image will do. An example of edge detection is the same as described in the first embodiment.

Subsequently, in the same manner as in the first embodiment, the reference point setting section 41 and the corresponding point search section 43 perform straight line detection for the detected edges (step S330). The reference point setting section 41 and the corresponding point search section 43, or the operator, examines continuity of the edges, and fits a straight line to two edges with the highest degree of continuity. The straight line detection method is not limited thereto; any other method may be used. Then, the reference point setting section 41 and the corresponding point search section 43 find an intersection point of the two detected straight lines (step S340). The reference point setting section 41 and the corresponding point search section 43 display the results on the screen of the display device 60 (step S350). It is determined whether or not the characteristic point as the results of corner detection matches a determination standard set by the operator or predetermined (step S360). If YES in step S360, it is determined whether or not there is a next corresponding point (step S380). If there is a next corresponding point in step S380, the next corresponding point is designated and the process returns to step S300. If there is no next corresponding point in step S380, the corner detection processing terminates and the process returns (step S390). The processes in steps S360 to S375 are the same as those described in the first embodiment.

A description is made of the automatic measurement. As described in the first embodiment, FIG. 16 is a flowchart for explaining an algorithm for the automatic orientation mode. In the automatic orientation mode, a retro target 200 (see FIG. 12) is affixed to a characteristic point of the measuring object 1 in advance. The operator selects the automatic orientation mode through the orientation section 44 (step S400). Then, an image of the measuring object is displayed on the screen of the display device 60 (step S410). The reference point setting section 41 and the corresponding point search section 43 register one corresponding point image as a template (step S420). Subsequently, the reference point setting section 41 and the corresponding point search section 43 search for a retro target image that is the same as the registered template image on the measuring object image (step S430). In this case, image searching is performed by template matching.

As described in the first embodiment, FIG. 17 is an explanatory diagram of an inputted image and a template image in a sequential similarity detection algorithm. The reference point setting section 41 and the corresponding point search section 43, provided with a function of running a sequential similarity detection algorithm, move the template image of N1×N1 pixels on a searching area $(M1-N1+1)^2$ in the inputted image of M1×M1 pixels, which is larger than the template image. A position of the template image is represented by, for example, coordinates (a, b) of a representative point, which is provided at its upper left corner, in the inputted image. Then, the reference point setting section 41 and the corresponding point search section 43 calculate a residual R(a, b) represented by an equation (9), with the template image at respective movement positions, to find a movement position where the residual is smallest. The movement position where the residual R(a,b) is smallest is the image position to be found by template matching.

As described in the first embodiment with reference to FIG. 16, for all the targets found in step S430, gravity center position detection is performed more exactly (step S440). For the gravity center detection, the above-described moment method, for example, may be advantageously used. The reference point setting section 41 and the corresponding point search section 43 display target positions calculated in step S440 on the screen (step S450). If the corresponding point positions displayed in step S450 match a determination standard set by the operator or predetermined, the orientation work terminates and the process returns (step S460). On the other hand, if the target positions displayed in step S450 do not match the determination standard set by the operator or predetermined, or if the gravity center position detection cannot be performed and an error indication is displayed, the semi-automatic orientation mode or the manual mode is selected and unmatching target positions are corrected (step S470).

In the same manner as in the first embodiment, a model image is used by the model forming section 54, the image correlating section 56, the model display section 57, and the like. The procedures for creating a model image are the same as those described in relation to a flowchart of FIG. 18.

A method for calculating coordinate transformation parameters, a method for calculating a position where each pixel on the model image is obtained, and a method for affixing an image are the same as those described in the first embodiment.

The formation of a model image from a different viewpoint is the same as described in the first embodiment with reference to FIG. 19. A calculation principle of rotating the model image performed by the coordinate transformation section 59 is as follows. As described in relation to step S92 of FIG. 23, when the posture designating section 58 designates a posture of a model of the measuring object 1, the coordinate transformation section 59 performs coordinate transformation so that the model display section 57 displays an image of the measuring object 1 to which stereoscopic texture is applied in accordance with the designated posture. That is, an image of the measuring object 1 to which stereoscopic texture is applied as viewed from an arbitrary direction can be obtained. Thus, a principle of creating a model image as viewed from a different viewpoint is described. The principle is intended to allow the coordinate transformation section 59 to rotate the coordinate system in a direction designated through the posture designating section 58, to subsequently form a model image.

[Single Photographic Image]

Figure 24:
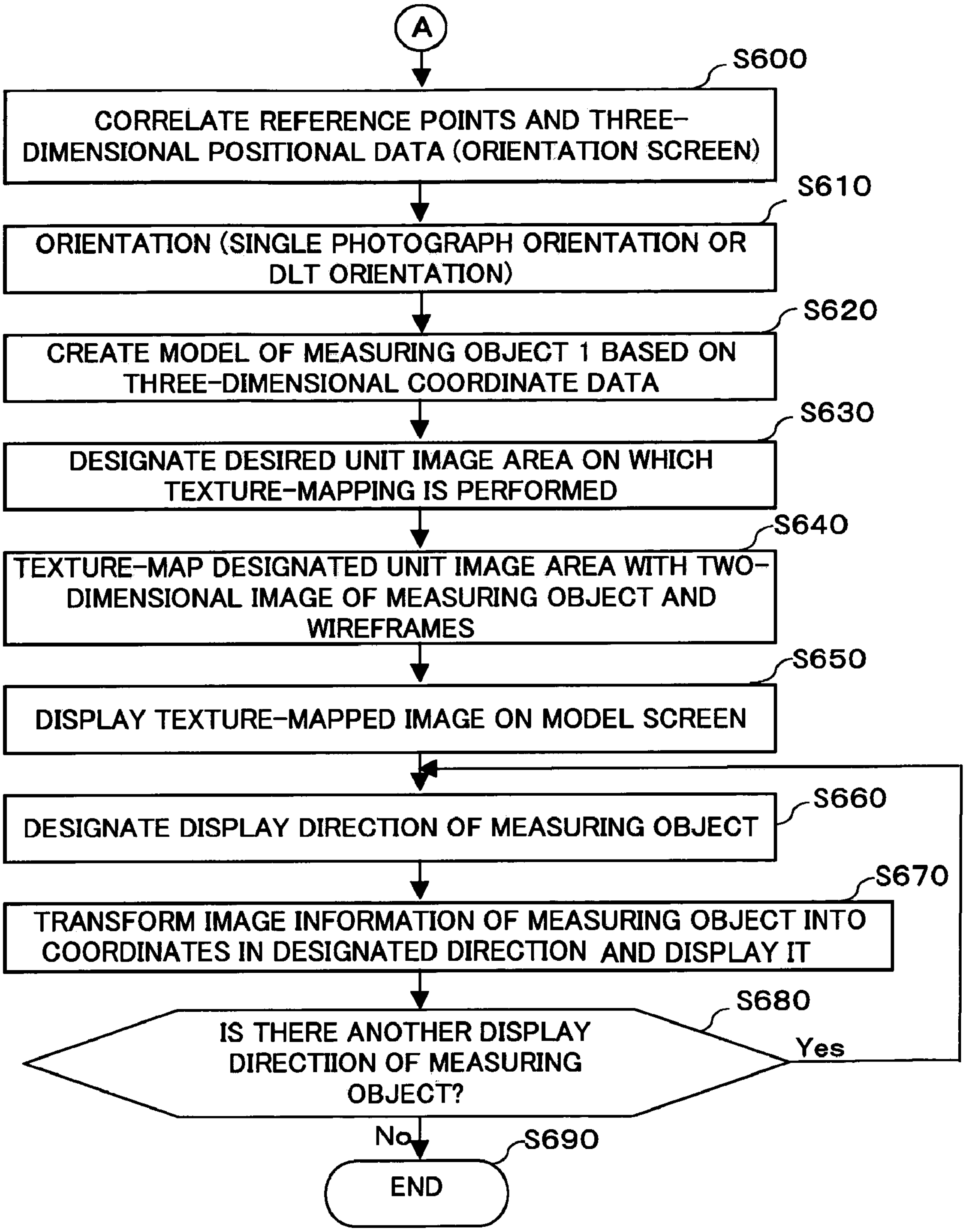
FIG. 24 is part of a flowchart for explaining operation of the three-dimensional image display apparatus shown in FIG. 22.

FIG. 24 is part of a flowchart for explaining operation of the three-dimensional image display apparatus shown in FIG. 22, mainly showing a case of a single photographic image of the measuring object. In case of a single photographic image in step S14 of FIG. 23, the orientation screen designating section 47 correlates the six or more reference points on the single photographic image of the measuring object 1 and the three-dimensional positional data on the measuring object 1 stored in the measuring object positional data storage section 17 as reference points (step S600). In case of plural single photographic images, the correlation work between the reference points and the three-dimensional positional data is processed for each image. There are three modes of correlation work between the reference points and the three-dimensional positional data, namely manual, semi-automatic, and full-automatic modes, which is the same as in the foregoing step S50 in case of a stereo image.

Then, the single photograph orientation section 46 performs orientation calculation processing according to an equation (16), using the results of the correlation work between the reference points and the three-dimensional positional data (step S610), to calculate the position and the tilt of the camera that photographs the single photographic image, positions of the corresponding points, and measurement accuracy. The orientation calculation processing uses single photograph orientation, which includes calculating the position and the tilt of the camera that photographs the image using a collinearity condition that holds true for three or more reference points included in the image, to establish relationship between an image coordinate system x, y and a ground coordinate system X, Y, Z. The equation (16) used in the single photograph orientation is obtained on the basis of a collinearity condition equation as follows:

$$\left.\begin{aligned} y &= -c\frac{a_{21}(X-X_0)+a_{22}(Y-Y_0)+a_{23}(Z-Z_0)}{a_{31}(X-X_0)+a_{32}(Y-Y_0)+a_{33}(Z-Z_0)}+\Delta y \\ x &= -c\frac{a_{11}(X-X_0)+a_{12}(Y-Y_0)+a_{13}(Z-Z_0)}{a_{31}(X-X_0)+a_{32}(Y-Y_0)+a_{33}(Z-Z_0)}+\Delta x \end{aligned}\right\} \quad (16)$$

Here, the collinearity condition equation defines relationship that the projection center, the photographic image, and the object on the ground are in alignment.

In the orientation calculation processing, six exterior orientation elements, namely Xo, Yo, Zo, ω, ϕ, and κ, included in the collinear condition equation are calculated. The single photograph orientation section 46 calculates the above six exterior orientation elements, with a successive approximation method, based on the photograph coordinates corresponding to the ground coordinates of the three or more reference points. The calculation process of the exterior orientation elements by the single photograph orientation section 46 uses, for example, a successive approximation method. In the successive approximation method, an unknown variate (exterior orientation element) is provided with an approximation, the equation is linearized, or Taylor-expanded, around the approximation, and a least squares method is used to obtain a correction quantity to correct the approximation. The same operation is repeated to obtain a converged solution.

Then, the model forming section 54 creates a model of the measuring object 1 based on the three-dimensional coordinates read from the three-dimensional coordinate data storage section 53 (step S620). The operator designates a unit image area desired to be texture-mapped (step S630). In this case, a position of an area first created is set as a default in the posture designating section 58 and the coordinate transformation section 59. Then, the unit image area calculation section 52 uses unit image areas including a plurality of the corresponding points to correlate the model and the stereo image, to texture-map the designated unit image area with the two-dimensional image of the measuring object 1 and the wireframes (step S640). The model display section 57 displays the texture-mapped image on the model screen (step S650).

The operator uses a mouse, a keyboard, or the like, to designate an orientation in which the measuring object 1 is to be displayed on the texture-mapped image through the posture designating section 58 (step S660). Then, the coordinate transformation section 59 transforms through coordinates the orientation in which the measuring object 1 is displayed on the display device 60 to that designated through the posture designating section 58, to display on the texture-mapped image (step S670). The operator determines whether or not there is another orientation in which the measuring object 1 is to be displayed (step S680). If Yes, the process returns to step S660, and if No, the process terminates (step S690). The function of allowing arbitrary designation of orientation in which the measuring object 1 is to be displayed, as performed in steps S660 and S670, allows the measurement results and/or the measuring object 1 to be displayed on the display device 60 as viewed from any angle and a varied viewpoint. This allows the operator to visually recognize the measuring object 1 in case of a single photographic image.

Figure 25:
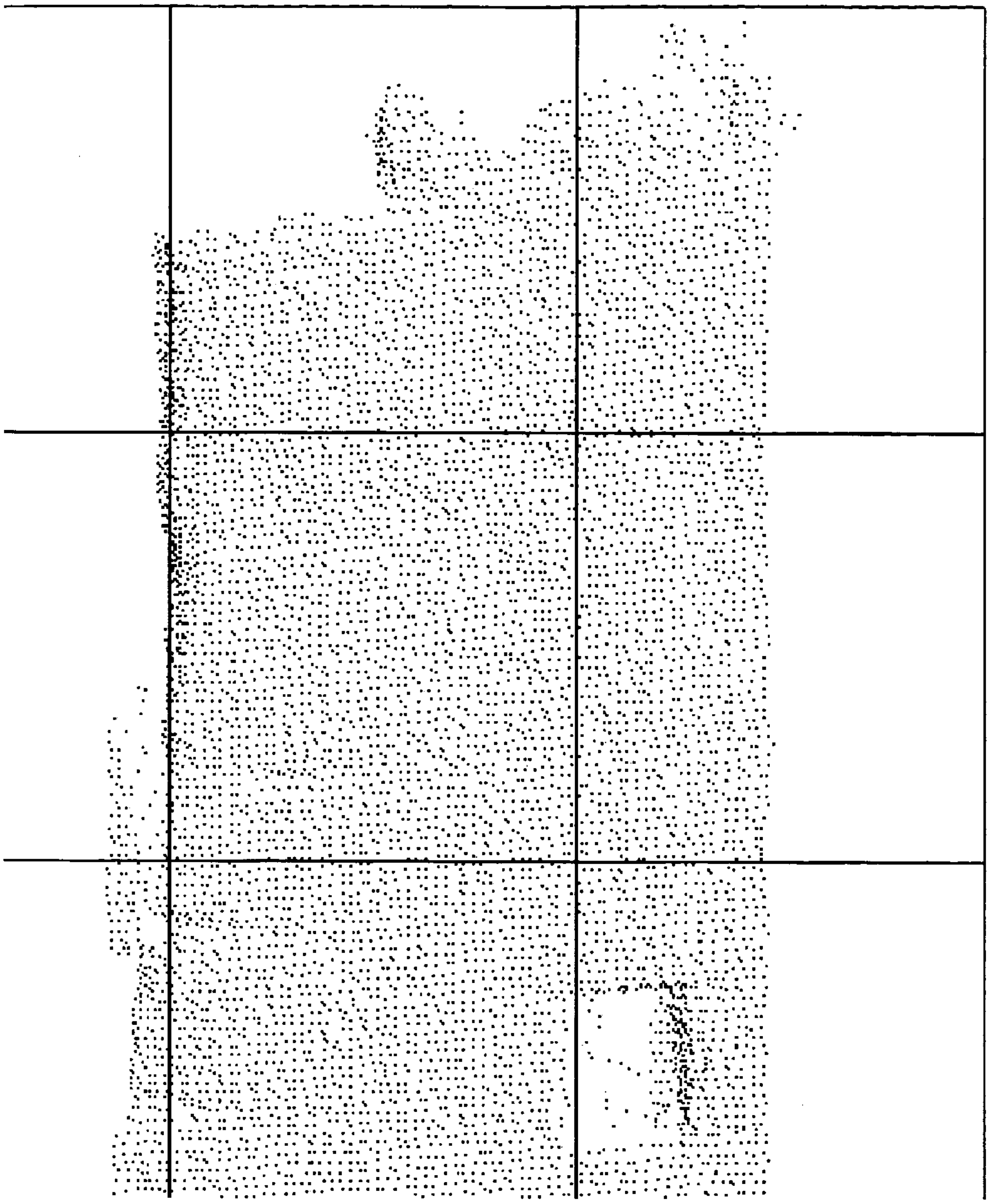
FIG. 25 is a view of an example of a group of three-dimensional dots of the measuring object.
Figure 26:
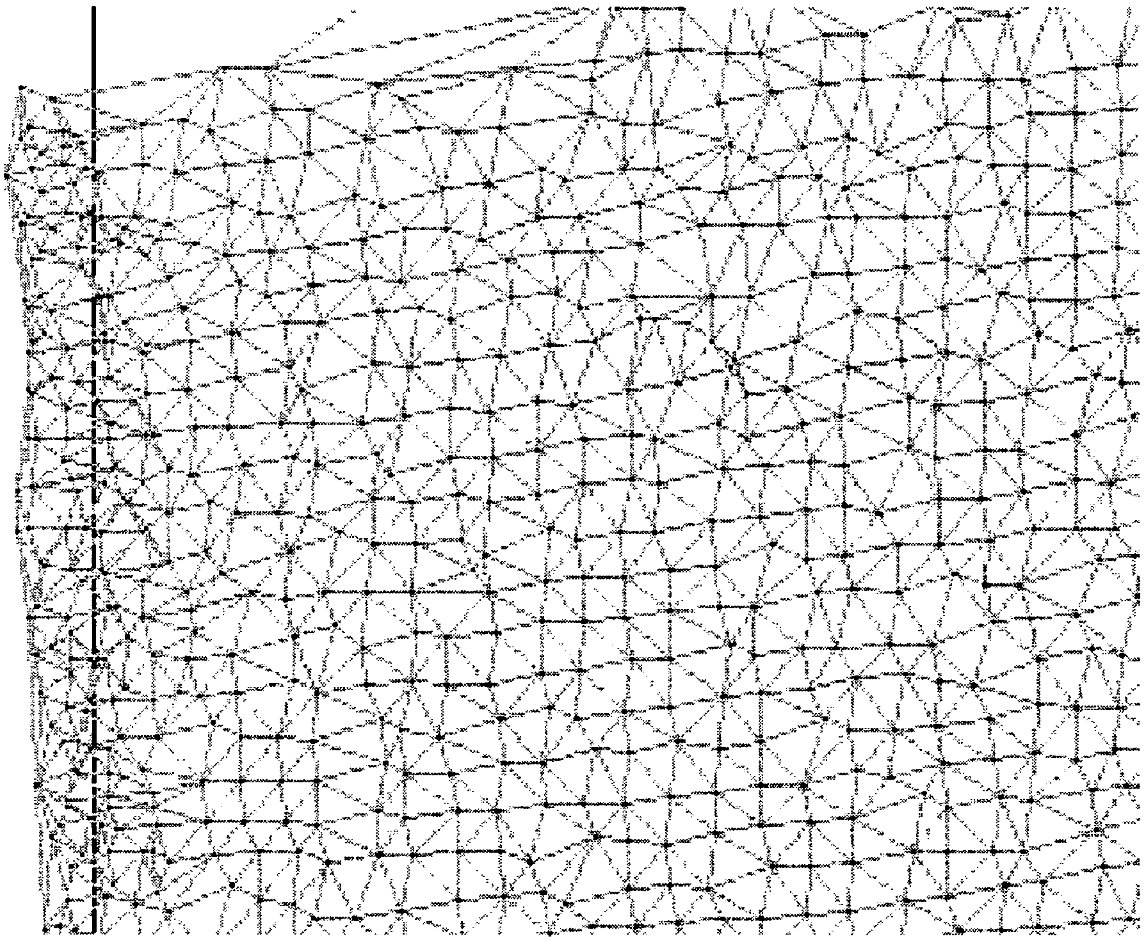
FIG. 26 is a view of a designation example of unit image areas formed using the group of three-dimensional dots.

FIG. 25 is a view of an example of a group of three-dimensional dots of the measuring object 1. The group of three-dimensional dots of the measuring object 1 are obtained with, for example, a 3D scanner. FIG. 26 is a view of a designation example of unit image areas formed using the group of three-dimensional dots. Since the number of dots obtained with a 3D scanner may reach, for example, several tens of thousands, the number of unit image areas covering the measuring object 1 may also reach several tens of thousands when each unit image area is formed using, for example, three adjacent dots among the group of dots.

Figure 27:
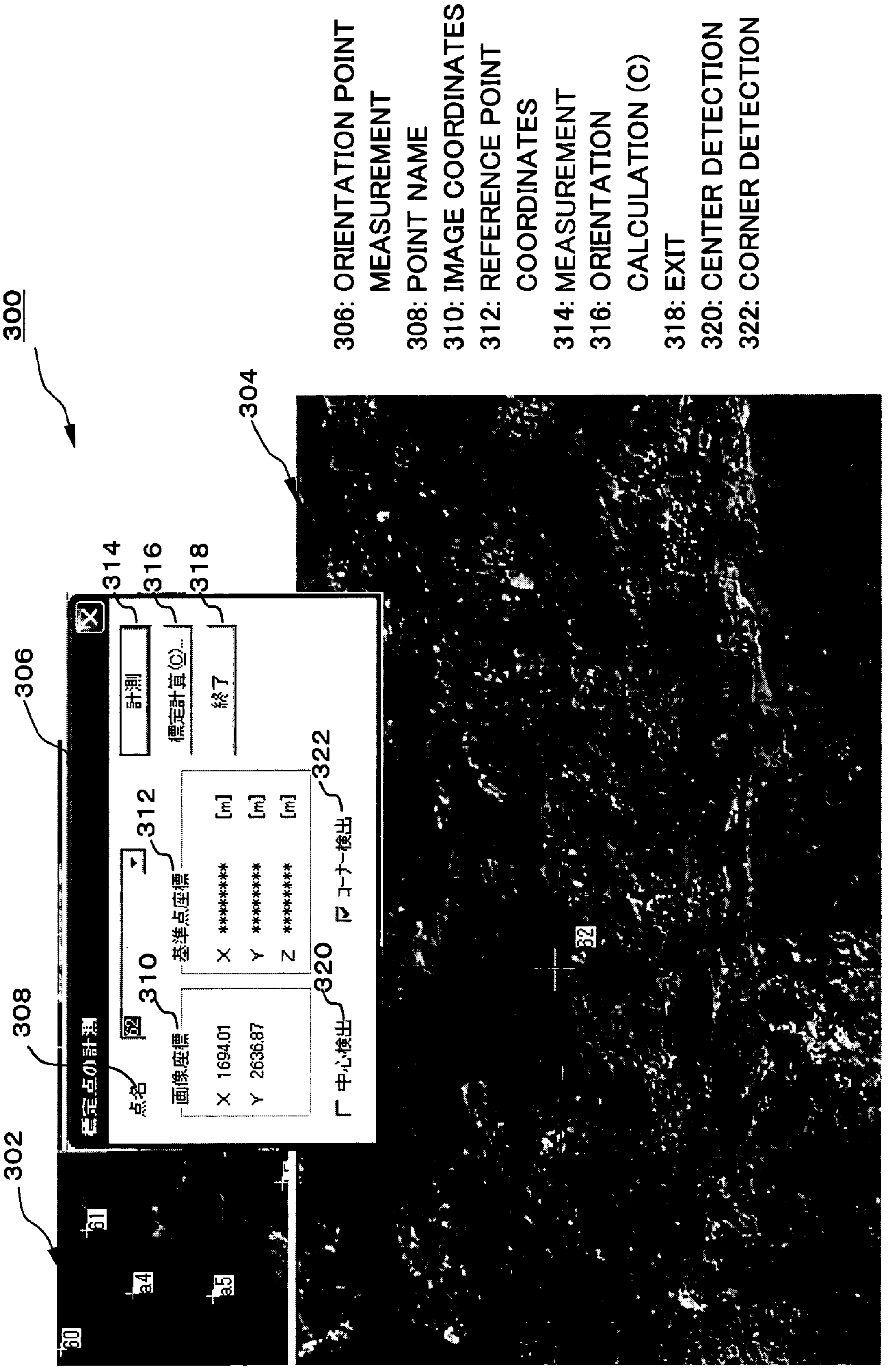
FIG. 27 is a view of an example of a single photographic image.

FIG. 27 is a view of an example of a single photographic image. A single photographic image screen 300 includes a single photographic image 302, an orientation point enlarged view 304, and an orientation point measurement diagram 306. The single photographic image 302 includes orientation points (a4, a5, 60, and so on) constituting six or more reference points, which is required absolute orientation. The orientation point enlarged view 304 shows the vicinity of an orientation point 62 as enlarged. The orientation point measurement diagram 306 is provided with an orientation point name column 308, an image coordinate column 310, a reference point coordinate column 312, a measurement start command column 314, a column 316 for designating orientation calculation specifics, a finish command column 318, a column 320 for designating center as characteristic point, and a column 322 for designating corner as characteristic point.

Figure 28:
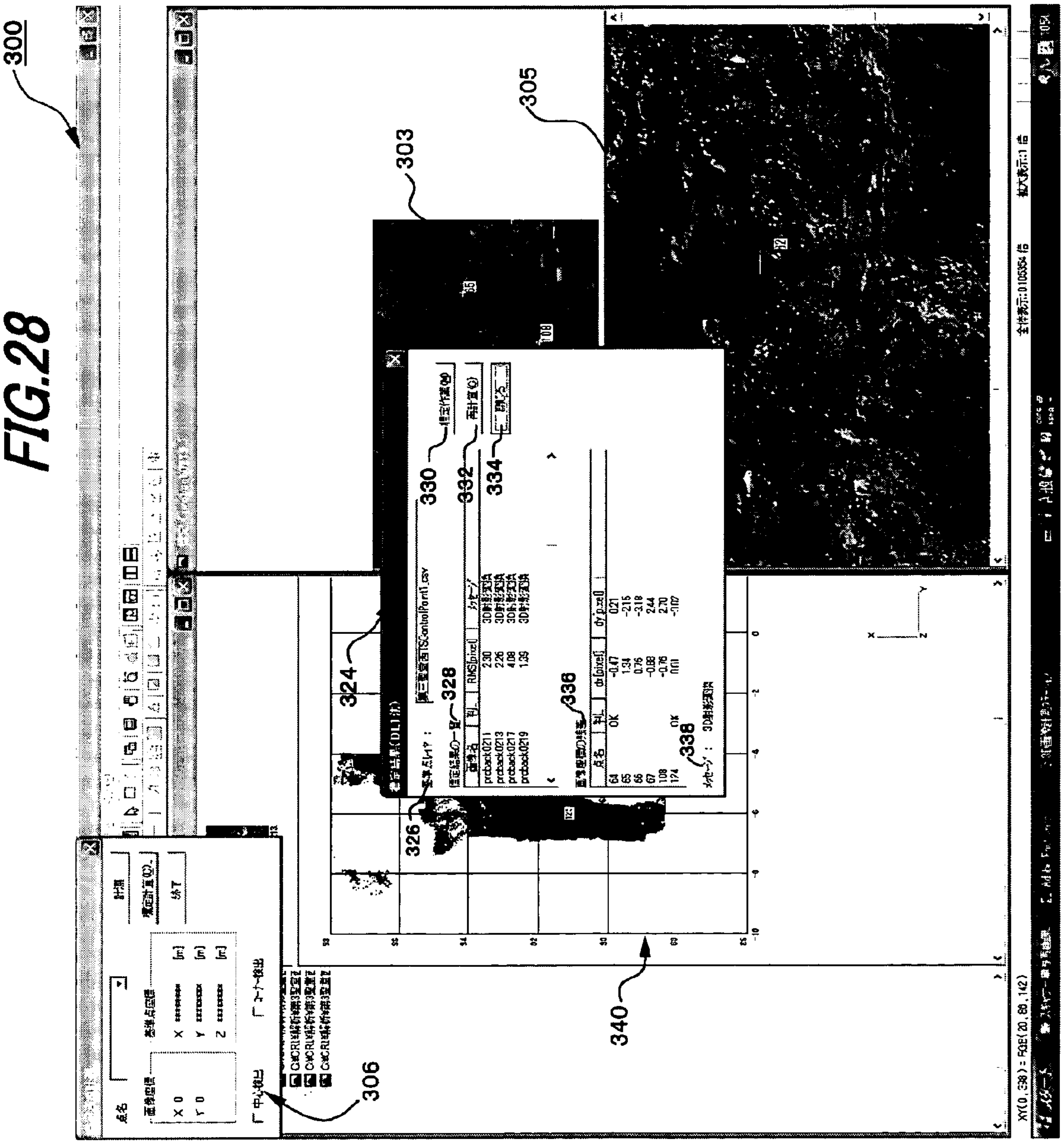
FIG. 28 is a view of another example of a single photographic image.

FIG. 28 is a view of another example of a single photographic image. A single photographic image screen 300 includes a single photographic image 303, an orientation point enlarged view 305, an orientation point measurement diagram 306, an orientation result (DLT) diagram 324, and a measuring point view 340. The single photographic image 303, part of which is hidden behind the orientation result diagram 324, shows orientation points (65 and 108) for measuring a three-dimensional shape of the measuring object (ruins) 1. The orientation point enlarged view 305, showing the vicinity of an orientation point 62 as enlarged, is different in magnification from the orientation point enlarged view 304 of FIG. 27. The orientation point measurement diagram 306 is the same as that of FIG. 27, and descriptions of the specifics in the diagram are not repeated. The orientation result (DLT) diagram 324 is provided with a reference point layer 326, an orientation result list column 328, an orientation work start command column 330, a recalculation command column 332, a column 334 for commanding to close orientation result diagram 324 window from single photographic image screen 300, an image coordinate residual column 336, and a message column 338. The orientation result list column 328 is provided with an image name, an RMS (pixel), and a message such as 3D projective transformation. The measuring point view 340 shows measuring points to be displayed in the orientation point enlarged view 305 and the like.

In the three-dimensional image display apparatus according to the present invention described in detail with the above embodiment, the display image forming section generates a two-dimensional image of a measuring object from plural directions based on three-dimensional positional data and a two-dimensional image (single photographic image or stereo image) of the measuring object. Therefore, an operator can recognize and measure the measuring object three-dimensionally. In particular, when the operator affixes an image to 3D data from a three-dimensional position measurement apparatus (total station), the 3D data and the measuring object in situ could not be correlated well conventionally. However, with the three-dimensional image display apparatus according to the present invention, they can be visually recognized and measured. In particular, with configurations where an image to which stereoscopic texture is applied is displayed on a two-dimensional image of the measuring object, 3D data measured in stereo and the image can be easily recognized without being viewed stereoscopically.

Also, as in the embodiment, 3D measurement data obtained from a stereo image can be integrated and visualized with an image of a measuring object to which stereoscopic texture is applied, in the presence of the three-dimensional image display apparatus implemented by a computer including an information processor such as a PC (personal computer), a display device such as an LCD (liquid crystal display) monitor, a software for the three-dimensional image display apparatus installed on the PC, and a calibrated photographing device for photographing a measuring object image (single photographic image or stereo image) such as a digital camera. Therefore, it is possible to construct an inexpensive system using general-purpose low-priced computer and monitor device, without a need for an expensive and precise stereoscopic system conventionally required to deal with 3D data measured in stereo.

[Description of Reference Numerals]

1: measuring object
10: measuring object image data storage section
12: stereo image data storage section
13: measuring object image data storage section
14: three-dimensional position measurement device
16: measuring object positional data storage section
17: measuring object positional data storage section
22: corresponding point designating section
24: orientation section
30: display image forming section
31: three-dimensional coordinate data section

32: model forming section
34: image correlating section
35: model display section
21: reference point setting section
23: corresponding point search section
25: corresponding point designating section
40: correlating section
41: reference point setting section
43: corresponding point search section
44: orientation section
45: corresponding point designating section
46: single photograph orientation section
47: orientation screen designating section
50: display image forming section
61: three-dimensional coordinate data calculation section
52: unit image area calculation section
54: model forming section
56: image correlating section
57: model display section
60: display device

What is claimed is:

1. A three-dimensional image display apparatus comprising:

a stereo image data storage section for storing stereo images, photographed in different angles from each other, of a measuring object;

a corresponding point designating section for designating corresponding points on the stereo images;

an orientation section for finding a relationship as to corresponding points in the stereo images based on a position and a tilt at which the stereo images are photographed, using the designated corresponding points;

a three-dimensional coordinate data section for obtaining three-dimensional coordinate data on the corresponding points of the measuring object based on the relationship as to the corresponding points found by the orientation section;

a model forming section for forming a model of the measuring object based on the three-dimensional coordinate data on the corresponding points;

an image correlating section for correlating the stereo images of the measuring object stored in the stereo image data storage section and the model formed by the model forming section, using the relationship as to the corresponding points found by the orientation section; and a model display section for displaying an image of the measuring object to which stereoscopic texture is applied, using the stereo image correlated with the model by the image correlating section, wherein the corresponding point designating section is configured to pull in a point, which is designated by an operator on each of the stereo images, to a characteristic point in a vicinity of the point designated by the operator, and to indicate the characteristic point in each of the stereo images displayed on a display device, and to make the designated corresponding point of the characteristic point, the designated corresponding point to be used by the orientation section, wherein the characteristic point is a gravity center position of a target given on the measuring object or a corner characteristic point, and an area where the target or the corner characteristic point lies is decided based on the point designated by the operator, and the gravity center position of the target or the corner characteristic point is calculated in the area.

2. The three-dimensional image display apparatus according to claim 1, further comprising:

a posture designating section for designating a posture of the model of the measuring object; and a coordinate transformation section for transforming coordinates of the corresponding points depending on the posture designated to the model, wherein the model display section is configured to display the image of the measuring object to which stereoscopic texture is applied in accordance with the posture designated by the posture designating section.

3. The three-dimensional image display apparatus according to claim 2, wherein the image correlating section is configured to cover the stereo image to be texture-mapped with unit image areas formed with a plurality of the corresponding points, to correlate the model and the stereo image using the unit image areas.

4. The three-dimensional image display apparatus according to claim 1, wherein the image correlating section is configured to cover the stereo image to be texture-mapped with unit image areas formed with a plurality of the corresponding points, to correlate the model and the stereo image using the unit image areas.

5. A three-dimensional image display method implemented on a computer, comprising the steps of:

allowing a corresponding point designating section to designate corresponding points on stereo images, photographed in different angles from each other, of a measuring object;

allowing an orientation section to find relationship as to corresponding points in the stereo image based on a position and a tilt at which the stereo images are photographed, using the designated corresponding points;

allowing a three-dimensional coordinate data section to obtain three-dimensional coordinate data on the corresponding points of the measuring object based on the relationship as to the corresponding points found by the orientation section;

allowing a model forming section to form a model of the measuring object based on the three-dimensional coordinate data on the corresponding points;

allowing an image correlating section to correlate the stereo images of the measuring object stored in the stereo image data storage section and the model formed by the model forming section, using the relationship as to the corresponding points found by the orientation section; and allowing a model display section to display an image of the measuring object to which stereoscopic texture is applied, using the stereo image correlated with the model, wherein the corresponding point designating section is configured to pull in a point, which is designated by an operator on each of the stereo images, to a characteristic point in a vicinity of the point designated by the operator, and to indicate the characteristic point in each of the stereo images displayed on a display device, and to make the designated corresponding point of the characteristic point, the designated corresponding point to be used by the orientation section, wherein the characteristic point is a gravity center position of a target given on the measuring object or a corner characteristic point, and an area where the target or the corner characteristic point lies is decided based on the point designated by the operator, and the gravity center position of the target or the corner characteristic point is calculated in the area.

6. A three-dimensional image display apparatus comprising:

a stereo image data storage section for storing stereo images, photographed in different angles from each other, of a measuring object;

a reference point setting section which is configured to pull in a point, which is designated by an operator on one image of the stereo images, to a characteristic point in a vicinity of the point designated by the operator, and for searching for the characteristic point in a vicinity of the point designated by the operator on the one image based on the point designated by the operator, and for setting the characteristic point as a reference point;

a corresponding point search section for determining a reference point corresponding point corresponding to the reference point set by the reference point setting section, on the other image of the stereo images;

an orientation section for finding relationship as to corresponding points in the stereo images based on a position and a tilt at which the stereo images are photographed, using the reference point and the reference point corresponding point;

a three-dimensional coordinate data section for obtaining three-dimensional coordinate data on the corresponding points of the measuring object based on the relationship as to the corresponding points found by the orientation section;

a model forming section for forming a model of the measuring object based on the three-dimensional coordinate data on the corresponding points;

an image correlating section for correlating the stereo images of the measuring object stored in the stereo image data storage section and the model formed by the model forming section, using the relationship as to the corresponding points found by the orientation section; and a model display section for displaying an image of the measuring object to which stereoscopic texture is applied, using the stereo images correlated with the model by the image correlating section, wherein the characteristic point is a gravity center position of a target given on the measuring object or a corner characteristic point, and an area where the target or the corner characteristic point lies is decided based on the point designated by the operator, and the gravity center position of the target or the corner characteristic point is calculated in the area.

7. The three-dimensional image display apparatus according to claim 6, wherein the target is a reference target image including at least two similar portions of different contrast.

8. The three-dimensional image display apparatus according to claim 7, further comprising:

a posture designating section for designating a posture of the model of the measuring object; and a coordinate transformation section for transforming coordinates of the corresponding points depending on the posture designated to the model, wherein the model display section is configured to display the image of the measuring object to which stereoscopic texture is applied in accordance with the posture designated by the posture designating section.

9. The three-dimensional image display apparatus according to claim 7, wherein the image correlating section is configured to cover the stereo image with unit image areas formed with a plurality of the corresponding points, to correlate the model and the stereo image, using the unit image areas.

10. The three-dimensional image display apparatus according to claim 6, wherein the corner characteristic point is an intersection point of plural generally linear components included in the one image.

11. The three-dimensional image display apparatus according to claim 10, further comprising:

a posture designating section for designating a posture of the model of the measuring object; and a coordinate transformation section for transforming coordinates of the corresponding points depending on the posture designated to the model, wherein the model display section is configured to display the image of the measuring object to which stereoscopic texture is applied in accordance with the posture designated by the posture designating section.

12. The three-dimensional image display apparatus according to claim 10, wherein the image correlating section is configured to cover the stereo image with unit image areas formed with a plurality of the corresponding points, to correlate the model and the stereo image, using the unit image areas.

13. The three-dimensional image display apparatus according to claim 6, further comprising:

a posture designating section for designating a posture of the model of the measuring object; and a coordinate transformation section for transforming coordinates of the corresponding points depending on the posture designated to the model, wherein the model display section is configured to display the image of the measuring object to which stereoscopic texture is applied in accordance with the posture designated by the posture designating section.

14. The three-dimensional image display apparatus according to claim 13, wherein the image correlating section is configured to cover the stereo image with unit image areas formed with a plurality of the corresponding points, to correlate the model and the stereo image, using the unit image areas.

15. The three-dimensional image display apparatus according to claim 6, wherein the image correlating section is configured to cover the stereo image with unit image areas formed with a plurality of the corresponding points, to correlate the model and the stereo image, using the unit image areas.

16. A three-dimensional image display method implemented on a computer, comprising the steps of:

allowing a reference point setting section which is configured to pull in a point designated by an operator on one image of stereo images, photographed in different angles from each other, of a measuring object to a characteristic point in a vicinity of the point designated by the operator, to search for the characteristic point in a vicinity of the point designated by the operator on the one image based on the point designated by the operator, and to set the characteristic point as a reference point;

allowing a corresponding point search section to determine a reference point corresponding point corresponding to the reference point, on the other image of the stereo images;

allowing an orientation section to find relationship as to corresponding points in the stereo images based on a position and a tilt at which the stereo images are photographed, using the reference point and the reference point corresponding point;

allowing a three-dimensional coordinate data section to obtain three-dimensional coordinate data on the corresponding points of the measuring object based on the relationship as to the corresponding points found by the orientation section;

allowing a model forming section to form a model of the measuring object based on the three-dimensional coordinate data on the corresponding points;

allowing an image correlating section to correlate the stereo image of the measuring object stored in the stereo image data storage section and the model formed by the model forming section, using the relationship as to the corresponding points found by the orientation section; and allowing a model display section to display an image of the measuring object to which stereoscopic texture is applied, using the stereo image correlated with the model, wherein the characteristic point is a gravity center position of a target given on the measuring object or a corner characteristic point, and an area where the target or the corner characteristic point lies is decided based on the point designated by the operator, and the gravity center position of the target or the corner characteristic point is calculated in the area.

17. The three-dimensional image display method according to claim 16, further comprising the steps of:

allowing a posture designating section to designate a posture of the model of the measuring object; and allowing a coordinate transformation section to transform coordinates of the corresponding points depending on the posture designated to the model, wherein the model display section is configured to display the image of the measuring object to which stereoscopic texture is applied in accordance with the posture designated to the model.

18. A three-dimensional image display apparatus comprising:

a measuring object positional data storage section for storing three-dimensional positional data on a measuring object;

a measuring object image data storage section for storing a two-dimensional image of the measuring object;

a correlating section for correlating the three-dimensional positional data and the two-dimensional image of the measuring object; and a display image forming section for generating two-dimensional images of the measuring object from plural directions based on the three-dimensional positional data and the two-dimensional image of the measuring object, wherein the two-dimensional images stored in the measuring object image data storage section are stereo images, photographed in different angles from each other, of the measuring object; and wherein the correlating section includes:

a reference point setting section which is configured to pull in a point, which is designated by an operator on one image of the stereo images, to a characteristic point in a vicinity of the point designated by the operator, and for searching for the characteristic point in a vicinity of the point designated by the operator on the one image based on the point designated by the operator, and for setting the characteristic point as a reference point;

a corresponding point search section for determining a reference point corresponding point corresponding to the reference point set by the reference point setting section, on the other image of the stereo images; and an orientation section for finding a relationship as to corresponding points in the stereo images based on a position and a tilt at which the stereo images are photographed, using the reference point and the reference point corresponding point, wherein the characteristic point is a gravity center position of a target given on the measuring object or a corner characteristic point, and an area where the target or the corner characteristic point lies is decided based on the point designated by the operator, and the gravity center position of the target or the corner characteristic point is calculated in the area.

19. The three-dimensional image display apparatus according to claim 18, wherein the correlating section further includes a corresponding point designating section for designating a corresponding point to be used by the orientation section; and wherein the corresponding point designating section is configured to indicate a characteristic point in a vicinity of a designated position on the measuring object displayed on a display device for displaying the stereo images.

20. The three-dimensional image display apparatus according to claim 19, wherein the display image forming section includes:

a posture designating section for designating a posture of the model of the measuring object; and a coordinate transformation section for transforming coordinates of the corresponding points depending on the posture designated to the model; and wherein a display direction of the two-dimensional image of the measuring object is determined depending on the posture designated by the posture designating section.

21. The three-dimensional image display apparatus according to claim 19, wherein the display image forming section includes:

a model forming section for forming a model of the measuring object based on three-dimensional coordinate data on the measuring object;

an image correlating section for correlating the two-dimensional display images of the measuring object based on the positional relationship as to the corresponding points in the stereo images; and a model display section for displaying the model with the two-dimensional display images correlated by the image correlating section, and displaying the model with the image.

22. The three-dimensional image display apparatus according to claim 19, wherein the display image forming section includes:

a model forming section for forming a model of the measuring object based on three-dimensional coordinate data on the measuring object;

an image correlating section for correlating the stereo image of the measuring object stored in the measuring object image data storage section and the model formed by the model forming section, using the relationship as to the corresponding points found by the orientation section; and a model display section for displaying an image of the measuring object to which stereoscopic texture is applied, using the stereo image correlated with the model by the image correlating section.

23. The three-dimensional image display apparatus according to claim 18, wherein the display image forming section further includes a unit image area calculation section for correlating the model and the stereo images using a plurality of unit image areas formed with the corresponding points of the stereo; and wherein the model display section is configured to cover the stereo image with the unit image areas.

24. The three-dimensional image display apparatus according to claim 23, wherein the display image forming section includes:

a posture designating section for designating a posture of the model of the measuring object; and a coordinate transformation section for transforming coordinates of the corresponding points depending on the posture designated to the model; and wherein a display direction of the two-dimensional image of the measuring object is determined depending on the posture designated by the posture designating section.

25. The three-dimensional image display apparatus according to claim 18, wherein the display image forming section includes:

a posture designating section for designating a posture of the model of the measuring object; and a coordinate transformation section for transforming coordinates of the corresponding points depending on the posture designated to the model; and wherein a display direction of the two-dimensional image of the measuring object is determined depending on the posture designated by the posture designating section.

26. The three-dimensional image display apparatus according to claim 18, wherein the display image forming section includes:

a model forming section for forming a model of the measuring object based on three-dimensional coordinate data on the measuring object;

an image correlating section for correlating the two-dimensional display images of the measuring object based on the positional relationship as to the corresponding points in the stereo images; and a model display section for displaying the model with the two-dimensional display images correlated by the image correlating section, and displaying the model with the image.

27. The three-dimensional image display apparatus according to claim 26, wherein the display image forming section further includes a unit image area calculation section for correlating the model and the stereo images using a plurality of unit image areas formed with the corresponding points of the stereo and wherein the model display section is configured to cover the stereo image with the unit image areas.

28. The three-dimensional image display apparatus according to claim 26, wherein the display image forming section includes:

a posture designating section for designating a posture of the model of the measuring object; and a coordinate transformation section for transforming coordinates of the corresponding points depending on the posture designated to the model; and wherein a display direction of the two-dimensional image of the measuring object is determined depending on the posture designated by the posture designating section.

29. The three-dimensional image display apparatus according to claim 18, wherein the display image forming section includes:

a model forming section for forming a model of the measuring object based on three-dimensional coordinate data on the measuring object;

an image correlating section for correlating the stereo image of the measuring object stored in the measuring object image data storage section and the model formed by the model forming section, using the relationship as to the corresponding points found by the orientation section; and a model display section for displaying an image of the measuring object to which stereoscopic texture is applied, using the stereo image correlated with the model by the image correlating section.

30. The three-dimensional image display apparatus according to claim 29, wherein the display image forming section includes:

a posture designating section for designating a posture of the model of the measuring object; and a coordinate transformation section for transforming coordinates of the corresponding points depending on the posture designated to the model; and wherein a display direction of the two-dimensional image of the measuring object is determined depending on the posture designated by the posture designating section.

31. A three-dimensional image display method implemented on a computer, comprising the steps of:

allowing a correlating section to correlate three-dimensional positional data on a measuring object and a two-dimensional image of the measuring object, using the three-dimensional positional data and the two-dimensional image;

allowing a model forming section to form a model of the measuring object, using correlation between the three-dimensional positional data and the two-dimensional image;

allowing an image correlating section to correlate the two-dimensional image of the measuring object and the model formed by the model forming section, using the correlation between the three-dimensional positional data and the two-dimensional image; and allowing a model display section to display the model with the image of the measuring object using the two-dimensional image correlated with the model, wherein the step of allowing a correlating section to correlate three-dimensional positional data on the measuring object and the two-dimensional image of the measuring object, using the three-dimensional positional data and the two-dimensional image, the two-dimensional images of the measuring object being stereo images, photographed in different angles from each other, of the measuring object, includes the steps of:

allowing a reference point setting section, which is configured to pull in a point designated by an operator on one image of the stereo images to a characteristic point in a vicinity of the point designated by the operator, to search for the characteristic point in a vicinity of the point designated by the operator on the one image based on the point designated by the operator, and to set the characteristic point as a reference point;

allowing a corresponding point search section to determine a reference point corresponding point corresponding to the reference point on the other image of the stereo images; and allowing an orientation section to find relationship as to corresponding points in the stereo images based on a position and a tilt at which the stereo images are photographed, using the reference point and the reference point corresponding point, wherein the characteristic point is a gravity center position of a target given on the measuring object or a corner characteristic point, and an area where the target or the corner characteristic point lies is decided based on the point designated by the operator, and the gravity center position of the target or the corner characteristic point is calculated in the area.

32. The three-dimensional image display method according to claim 31, further including the steps of:

allowing a posture designating section to designate a posture of the model of the measuring object; and allowing a coordinate transformation section to transform coordinates of the corresponding points depending on the posture designated to the model, wherein the model display section displays the model image provided with the image of the measuring object in accordance with the posture designated to the model.

* * * * *